(12) United States Patent
Yoshioka et al.

(10) Patent No.: US 7,672,777 B2
(45) Date of Patent: Mar. 2, 2010

(54) MOVING HISTORY CONVERSION APPARATUS AND MOVING HISTORY CONVERSION METHOD

(75) Inventors: Mototaka Yoshioka, Osaka (JP); Jun Ozawa, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 11/504,004

(22) Filed: Aug. 15, 2006

(65) Prior Publication Data

US 2006/0276962 A1 Dec. 7, 2006

Related U.S. Application Data

(63) Continuation of application No. PCT/JP2006/302009, filed on Feb. 6, 2006.

(30) Foreign Application Priority Data

Feb. 17, 2005 (JP) ............................. 2005-041352

(51) Int. Cl.
*G01C 21/30* (2006.01)
*G01C 21/32* (2006.01)
(52) U.S. Cl. ..................................... 701/208
(58) Field of Classification Search ............ 340/995.12, 340/995.14, 995.27; 342/357.09; 701/100, 701/206, 208, 213
See application file for complete search history.

(56) References Cited

U.S. PATENT DOCUMENTS

| 6,377,890 | B1 * | 4/2002 | Doi ............................ 701/211 |
| 6,393,149 | B2 * | 5/2002 | Friederich et al. ........... 382/173 |
| 6,404,352 | B1 * | 6/2002 | Ichikawa et al. ............ 340/988 |
| 6,515,595 | B1 * | 2/2003 | Obradovich et al. ........ 340/905 |
| 6,687,611 | B1 * | 2/2004 | Hessing et al. .............. 701/208 |
| 7,047,247 | B1 * | 5/2006 | Petzold et al. .............. 707/101 |
| 2002/0188399 | A1 * | 12/2002 | Odagawa et al. ........... 701/202 |
| 2005/0049781 | A1 * | 3/2005 | Oesterling .................. 701/207 |
| 2007/0043504 | A1 * | 2/2007 | Dorfman et al. ............ 701/213 |

FOREIGN PATENT DOCUMENTS

| JP | 10-267676 | 10/1998 |
| JP | 2000-266562 | 9/2000 |
| JP | 2001-59734 | 3/2001 |

(Continued)

*Primary Examiner*—Khoi Tran
*Assistant Examiner*—Nicholas Kiswanto
(74) *Attorney, Agent, or Firm*—Wenderoth, Lind & Ponack, L.L.P.

(57) ABSTRACT

Moving history conversion apparatus making moving history accumulated in an apparatus available in other different-type apparatuses. The moving history conversion apparatus includes: a first map information accumulation unit which accumulates first map information representing a map using a series of first-type IDs for identifying geographical positions; a first moving history accumulation unit accumulating moving history represented as the series of first-type IDs accumulated in the first map information accumulation unit; the first moving history conversion unit converting, into latitude and longitude information, the series of IDs included in the moving history accumulated in the first moving history accumulation unit; a second map information accumulation unit accumulating the second map information which represents a map using a second-type IDs for identifying geographical positions; a second moving history conversion unit converting latitude and longitude information into the series of IDs included in the second map information accumulated in the second map information accumulation unit.

18 Claims, 66 Drawing Sheets

FOREIGN PATENT DOCUMENTS

| | | |
|---|---|---|
| JP | 2001-208552 | 8/2001 |
| JP | 2003-42783 | 2/2003 |
| JP | 2003-187387 | 7/2003 |
| JP | 2005-257666 | 9/2005 |
| WO | 01/18768 | 3/2001 |

* cited by examiner

FIG. 8

| Moving history ID | Date | Departure place | Destination | Route | | | | | |
|---|---|---|---|---|---|---|---|---|---|
| 001 | September 20, 2004 | N100 (Home) | N51 (Maruyama golf course) | N100 8:45 | N11 8:50 | ... | N14 9:50 | N15 9:58 | N51 10:00 |
| 002 | September 27, 2004 | N100 (Home) | N51 (Maruyama golf course) | N100 8:45 | ... | ... | ... | | |
| 003 | September 28, 2004 | N100 (Home) | N51 (Maruyama golf course) | N100 8:45 | ... | ... | ... | | |
| 004 | October 8, 2004 | N100 (Home) | N51 (Maruyama golf course) | N100 8:45 | ... | ... | ... | | |
| ... | | | | ... | | | | | |

FIG. 12

| Date and time | East longitude | North latitude | |
|---|---|---|---|
| September 20, 2004, 8:45 | 135 deg. 00 min. 00 sec. | 34 deg. 00 min. 00 sec. | } Latitude and longitude information of Node ID "N100 (Home)" |
| : | : | : | |
| : | : | : | |
| : | : | : | |
| : | : | : | |
| September 20, 2004, 9:50 | 135 deg. 34 min. 00 sec. | 35 deg. 36 min. 00 sec. | Latitude and longitude information of Node ID "N14 (Midori 1 junction)" |
| September 20, 2004, 9:58 | 135 deg. 34 min. 30 sec. | 34 deg. 36 min. 15 sec. | Latitude and longitude information of Node ID "N15 (Maruyama junction)" |
| September 20, 2004, 10:00 | 135 deg. 34 min. 30 sec. | 34 deg. 36 min. 05 sec. | Latitude and longitude information of Node ID "N51 (Maruyama golf course)" |

FIG. 15

| Moving history ID | Date | Departure place | Destination | Route | | | | | | | |
|---|---|---|---|---|---|---|---|---|---|---|---|
| 001 | September 20, 2004 | C100 (Home) | C61 (Maruyama golf course) | C100 | ... | ... | C24 | C25 | C51 | | |
| | | | | 8:45 | | | 9:50 | 9:58 | 10:00 | | |
| 002 | September 27, 2004 | C100 (Home) | C61 (Maruyama golf course) | C100 | ... | ... | ... | ... | ... | | |
| | | | | 8:45 | | | | | | | |
| 003 | September 28, 2004 | C100 (Home) | C61 (Maruyama golf course) | C100 | ... | ... | ... | ... | ... | | |
| | | | | 8:45 | | | | | | | |
| 004 | October 8, 2004 | C100 (Home) | C61 (Maruyama golf course) | C100 | ... | ... | ... | ... | ... | | |
| | | | | 8:45 | | | | | | | |
| ... | ... | ... | ... | ... | | | | | | | |

| First Navi | Second Navi | Third Navi |
|---|---|---|
| N11 | C21 | : |
| N12 | C22 | : |
| : | : | : |
| N51 | C61 | : |
| : | : | : |

FIG. 21

| Moving history ID | Date | Departure place | Destination | Route | | | | | | | | | |
|---|---|---|---|---|---|---|---|---|---|---|---|---|---|
| | | | | ... | N31 | N32 | N33 | N34 | N35 | N36 | N37 | N38 | N103 |
| 010 | September 20, 2003 | N100 (Home) | N103 (Osaka land) | ... | 9:50 | 9:58 | 10:00 | 10:15 | 9:56 | 9:56 | 9:56 | 9:56 | 10:15 |
| | | | | ... | ○ | ○ | × | × | × | ○ | ○ | ○ | ○ |
| ... | ... | ... | ... | ... | ... | ... | ... | ... | ... | ... | ... | ... | ... |
| ... | ... | ... | ... | ... | ... | ... | ... | ... | ... | ... | ... | ... | ... |
| ... | ... | ... | ... | ... | ... | ... | ... | ... | ... | ... | ... | ... | ... |

FIG. 22

| Registered point | Registered date | Node ID | Arrival frequency (number of times) | Image information |
|---|---|---|---|---|
| 001 | September 20, 2004 | N100 (Home) | 51 | jitaku.jpg |
| 002 | September 27, 2004 | N101 (Company) | 10 | kaisya.jpg |
| 003 | September 28, 2004 | N51 (Maruyama golf course) | 10 | golf.jpg |
| ... | ... | ... | ... | ... |

→

| Registered point | Registered date | Longitude | Latitude | Arrival frequency (number of times) | Image information |
|---|---|---|---|---|---|
| 001 | September 20, 2004 | 135 deg. 00 min. | 34 deg. 00 min. | 51 | jitaku.jpg |
| 002 | September 27, 2004 | 135 deg. 00 min. | 34 deg. 00 min. | 10 | kaisya.jpg |
| 003 | September 28, 2004 | 135 deg. 00 min. | 34 deg. 00 min. | 10 | golf.jpg |
| ... | ... | ... | ... | ... | ... |

FIG. 38

| Date and time | East longitude | North latitude | |
|---|---|---|---|
| September 20, 2004, 8:45 | 135 deg. 00 min. 00 sec. | 34 deg. 00 min. 00 sec. | ← Latitude and longitude information of Node ID "N100 (Home)" |
| : | : | : | |
| : | : | : | |
| : | : | : | |
| : | : | : | |
| September 20, 2004, 9:50 | 135 deg. 34 min. 00 sec. | 35 deg. 36 min. 00 sec. | ← Latitude and longitude information of Node ID "N14 (Midori 1 junction)" |
| September 20, 2004, 9:52 | 135 deg. 34 min. 10 sec. | 34 deg. 36 min. 05 sec. | ← Interpolated latitude and longitude information |
| September 20, 2004, 9:54 | 135 deg. 34 min. 15 sec. | 34 deg. 36 min. 11 sec. | |
| September 20, 2004, 9:56 | 135 deg. 34 min. 20 sec. | 34 deg. 36 min. 12 sec. | |
| September 20, 2004, 9:57 | 135 deg. 34 min. 25 sec. | 34 deg. 36 min. 13 sec. | ← Latitude and longitude information of Node ID "N15 (Maruyama junction)" |
| September 20, 2004, 9:58 | 135 deg. 34 min. 30 sec. | 34 deg. 36 min. 15 sec. | ← Interpolated latitude and longitude information |
| September 20, 2004, 9:59 | 135 deg. 34 min. 30 sec. | 34 deg. 36 min. 10 sec. | |
| September 20, 2004, 10:00 | 135 deg. 34 min. 30 sec. | 34 deg. 36 min. 05 sec. | ← Latitude and longitude information of Node ID "N51 (Maruyama golf course)" |

FIG. 42

| Moving history ID | Date | Departure place | Destination | Route | | | | | | | | | |
|---|---|---|---|---|---|---|---|---|---|---|---|---|---|
| 001 | September 20, 2004 | C100 (Home) | C51 (Maruyama golf course) | C100 8:45 | ... | C24 9:50 | ... | C26 9:56 | C25 9:58 | C61 10:00 | ... | ... | ... |
| 002 | September 27, 2004 | C100 (Home) | C51 (Maruyama golf course) | C100 8:45 | ... | ... | ... | ... | ... | ... | ... | ... | ... |
| 003 | September 28, 2004 | C100 (Home) | C51 (Maruyama golf course) | C100 8:45 | ... | ... | ... | ... | ... | ... | ... | ... | ... |
| 004 | October 8, 2004 | C100 (Home) | C51 (Maruyama golf course) | C100 8:45 | ... | ... | ... | ... | ... | ... | ... | ... | ... |
| ... | ... | ... | ... | ... | | | | | | | | | |

FIG. 47

| Moving history ID | Date | Departure place | Destination | Route | | | | | | | | | |
|---|---|---|---|---|---|---|---|---|---|---|---|---|---|
| 001 | September 20, 2004 | C100 (Home) | C51 (Maruyama golf course) | ... | ... | ... | R43 | R41 | R40 | C61 | ... | ... | ... |
| | | | | | | | 9:50 | 9:56 | 9:58 | 10:00 | | | |
| 002 | September 27, 2004 | C100 (Home) | C51 (Maruyama golf course) | ... | ... | ... | ... | ... | ... | ... | ... | ... | ... |
| 003 | September 28, 2004 | C100 (Home) | C51 (Maruyama golf course) | ... | ... | ... | ... | ... | ... | ... | ... | ... | ... |
| 004 | October 8, 2004 | C100 (Home) | C51 (Maruyama golf course) | ... | ... | ... | ... | ... | ... | ... | ... | ... | ... |
| ... | | | | | | | | | | | | | |

FIG. 55

| Date and time | Communication base station ID |
|---|---|
| : | : |
| September 20, 2004, 9:46 | CS02 |
| September 20, 2004, 9:47 | CS04 |
| September 20, 2004, 9:48 | CS07 |
| September 20, 2004, 9:49 | CS06 |
| : | : |

FIG. 56

| Communication base station ID | Longitude | Latitude | Covered area |
|---|---|---|---|
| : | : | : | : |
| CS02 | 135. 01 | 34. 00 | 200 m radius |
| CS03 | 135. 02 | 34. 00 | 200 m radius |
| CS04 | 135. 03 | 34. 00 | 300 m radius |
| CS05 | 135. 04 | 34. 00 | 300 m radius |
| : | : | : | : |

FIG. 57

| Date and time | Longitude | Latitude | Covered area |
|---|---|---|---|
| : | : | : | : |
| September 20, 2004, 9:46 | 135. 01 | 34. 00 | 200 m radius |
| September 20, 2004, 9:47 | 135. 02 | 34. 00 | 200 m radius |
| September 20, 2004, 9:48 | 135. 03 | 34. 00 | 300 m radius |
| September 20, 2004, 9:49 | 135. 04 | 34. 00 | 300 m radius |
| : | : | : | : |

FIG. 60

| Date and time | Communication base station ID |
|---|---|
| ⋮ | ⋮ |
| September 20, 2004, 9:46 | CS-N02 |
| September 20, 2004, 9:47 | CS-N04 |
| September 20, 2004, 9:48 | CS-N07 |
| September 20, 2004, 9:49 | CS-N11 |
| September 20, 2004, 9:50 | CS-N10 |
| ⋮ | ⋮ |

FIG. 68

| History ID | Date | Departure place | Destination | Route | | | | | | |
|---|---|---|---|---|---|---|---|---|---|---|
| 001 | September 20, 2004 | N100 (Home) | N110 (Minami Bookstore) | N100 (Home) | N11 (Kyo 1 junction) | N12 (Kyo 2 junction) | N11 (Kyo 1 junction) | N110 (Minami Bookstore) | | |
| | | | | 18:50 | 18:50 | 18:51 | 18:51 | 18:52 | | |
| ⋮ | ⋮ | ⋮ | ⋮ | ⋮ | ⋮ | ⋮ | ⋮ | ⋮ | | |
| 010 | October 13, 2004 | N140 (Hanamachi university) | N40 (Ruson) | N140 (Hanamachi university) | N11 (Kyo 1 junction) | N12 (Kyo 2 junction) | N11 (Kyo 1 junction) | N11 (Kyo 1 junction) | N40 (Ruson) | |
| | | | | 19:20 | 19:20 | 19:22 | 19:23 | 19:25 | 19:25 | |
| ⋮ | ⋮ | ⋮ | ⋮ | ⋮ | ⋮ | ⋮ | ⋮ | ⋮ | ⋮ | |
| 011 | October 20, 2004 | N121 (Minami station) | N100 (Home) | N20 (Minami station) | N20 (Minami station front) | N21 (Hana street 1) | N22 (Hana street 2) | N24 (Midori 4 junction) | N11 (Kyo 1 junction)  | N100 (Home) |
| | | | | 23:29 | 23:30 | 23:35 | 23:40 | 23:42 | | 23:45 |
| ⋮ | ⋮ | ⋮ | ⋮ | ⋮ | ⋮ | ⋮ | ⋮ | ⋮ | | ⋮ |

→

| History ID | Date | Departure place | Destination | Route | | | | |
|---|---|---|---|---|---|---|---|---|
| 011 | October 20, 2004 | N121 (Minami station) | N100 (Home) | N20 (Minami station) | N20 (Minami station front) | N21 (Hana street 1) | N22 (Hana street 2) | N24 (Midori 4 junction) | N100 (Home) |
| | | | | 23:29 | 23:30 | 23:35 | 23:40 | 23:42 | 23:45 |

MOVING HISTORY CONVERSION APPARATUS AND MOVING HISTORY CONVERSION METHOD

CROSS REFERENCE TO RELATED APPLICATION

This is a continuation application of PCT application No. PCT/JP2006/302009 filed Feb. 6, 2006, designating the United States of America.

BACKGROUND OF THE INVENTION (1) Field of the Invention

The present invention relates to an apparatus which converts a representation form of moving history to be accumulated in a car navigation system and other systems, and in particular relates to a technique which allows even a second apparatus to use moving history accumulated in a first apparatus.

(2) Description of the Related Art

In recent years, in a Car Navigation System (hereafter abbreviated as "Car Navi"), it is possible to display prerecorded travel routes when they are called by a user operation, or to register some travel routes as registered points from among past travel routes. On the other hand, there is a conventional apparatus which passes down map information and information relating to navigation stored in a first Car Navi to another new car navigation apparatus, that is a second Car Navi, and allows the information to be used in the second Car Navi (See Patent Reference 1 and other documents).

FIG. 1 is a block diagram of a conventional navigation apparatus included in the above-mentioned Patent Reference 1. A map information storage unit 26 in a first navigation apparatus 1 stores map information. Additionally, a navigation information storage unit 27 stores information relating to navigation. This system makes it possible to pass down such information to a second navigation apparatus 2 so as to be used. The passing down of moving history, for example, is performed by connecting the first navigation apparatus 1 and the second navigation apparatus 2. Whether the first navigation apparatus 1 and the second navigation apparatus 2 are connected is recognized in an external connection recognition unit 3 and such information is transmitted via information transmitting/receiving unit 11. The transmitted information is stored in an information storage unit 12 in the second navigation apparatus 2. Then, map information and other information stored in the information storage unit 12 also becomes available in the second navigation apparatus 2. In addition, it is disclosed that in the conventional technology, a range of map information to be passed down is inputted through an input unit 24 and information to be partially passed down is selected through an information selection setting unit 5.

Patent Reference Japanese Laid-Open Patent Application No. 2001-208552

DISCLOSURE OF THE INVENTION

Problem that the Invention is to Solve

However, there is the problem that in the above-mentioned conventional technology, information to be passed down from the first navigation apparatus to the second navigation apparatus is map information and route information, and user's moving history is not passed down.

Generally, on-vehicle equipment such as a Car Navi is equipped with a GPS or the like which detects its position and the detected position is used for route guidance and the like. Additionally, this position to be detected as needed is stored as user's moving history in a predetermined format based on map information, and the moving history can be searched by a user or used for the registration of a destination, or the like. Position information obtained by a GPS antenna is longitude and latitude values, and moving history can be configured by accumulating values obtained at each time point. However, when a user passes through the same junction at a different date and time, the accumulation of moving history based on longitude and latitude values in a predetermined time interval is not always the accumulation of longitude and latitude values at the junction because of differences in accuracy of position according to a GPS antenna or the time sampling interval. Because of this, in many Car Navis, the data accumulated as longitude and latitude values are converted into an easily-accessible format which is in accordance with map information to be used. For example, the data are converted into the ID information of nodes defined by a map using the information of time-series values of longitude and latitude, or into road link information. This allows easy calculation of the number and time points of the passing through of junctions and predetermined roads.

However, these node IDs and link information often depend on a map to be used and a Car Navi model. This causes an inconvenience that these IDs and link information cannot be mutually used in the case where different map information and a Car Navi are used.

Moving history is a piece of very important information because it can be used for understanding of a user's activity tendency and destination estimation as mentioned above. For example, extracting frequent moving patterns from moving history allows provision of information unique to a user and estimating a destination makes it possible to provide important information regarding security in advance. To this end, it is extremely convenient that moving history accumulated in one apparatus can be used in another apparatus.

Therefore, the present invention has been achieved in consideration of such situation, and aims to provide a moving history conversion apparatus which makes it possible that moving history accumulated in a certain apparatus is also used in a different type of apparatus, as well as to provide its conversion method.

SUMMARY OF THE INVENTION

Means to Solve the Problem

In order to achieve the above object, the moving history conversion apparatus according to the present invention converts the representation format of moving history of a mobile object. The moving history conversion apparatus includes a first map information accumulation unit which accumulates first map information which represents a map using a series of first-type IDs for identifying geographical positions; a first moving history accumulation unit which accumulates first moving history represented as the series of first-type IDs included in the first map information accumulated in the first map information accumulation unit; a second map information accumulation unit which accumulates second map information which represents a map using a series of second-type IDs for identifying geographical positions; a second moving history accumulation unit which accumulates second moving history represented as the series of second-type IDs included in the second map information accumulated in the second map information accumulation unit; and a conversion unit which converts the series of first-type IDs included in the first moving history accumulated in the first moving history accumulation unit into the series of second-type IDs included in the second map information accumulated in the second map information accumulation unit, and to accumulate the series of second-type IDs obtained through the conversion into the second moving history accumulation unit as the second moving history.

Note that the present invention can be realized not only as the moving history conversion apparatus, but also as a moving history conversion method which includes the steps corresponding to the processing units configuring the moving history conversion apparatus, the program causing a computer to execute the steps, and a computer-readable recording medium on which the program is stored.

Effect of the Invention

The present invention allows the mutual use of moving history between different apparatuses. For example, when an old car navigation apparatus is replaced with a newly purchased one or a navigation apparatus is replaced due to car replacement, the continuous use of moving history accumulated until then is possible without wasting it.

Moreover, it is extremely convenient for a user to be able to save the trouble of accumulating moving history again and repeating the same setting by passing down not only such moving history but also time information along with the moving history, registered points set by a user, map display information, or the like.

Further Information about Technical Background to this Application

The disclosure of Japanese Patent Application No. 2005-041352 filed on Feb. 17, 2005 including specification, drawings and claims is incorporated herein by reference in its entirety.

The disclosure of PCT application No. PCT/JP2006/302009 filed, Feb. 6, 2006, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 8 is a diagram showing moving history;

FIG. 12 is a diagram showing an example of the history information accumulated in the history information accumulation unit;

FIG. 15 is a diagram showing the conversion of the moving history;

FIG. 21 is a diagram showing route setting information;

FIG. 22 is a diagram showing a conversion of registered points;

FIG. 38 is a diagram showing an example of history information accumulated in the history information accumulation unit;

FIG. 42 is a diagram showing an example of history information accumulated in the history information accumulation unit;

FIG. 47 is a diagram showing an example of moving history accumulated in the moving history accumulation unit;

FIG. 55 is a diagram showing a conversion table of moving history;

FIG. 56 is a diagram showing a conversion table of the communication base stations;

FIG. 57 is a diagram showing a conversion example of the moving history;

FIG. 60 is a diagram showing an example of moving history accumulated in the second moving history accumulation unit;

FIG. 68 is a diagram showing a conversion example of the moving history.

Figure 1:
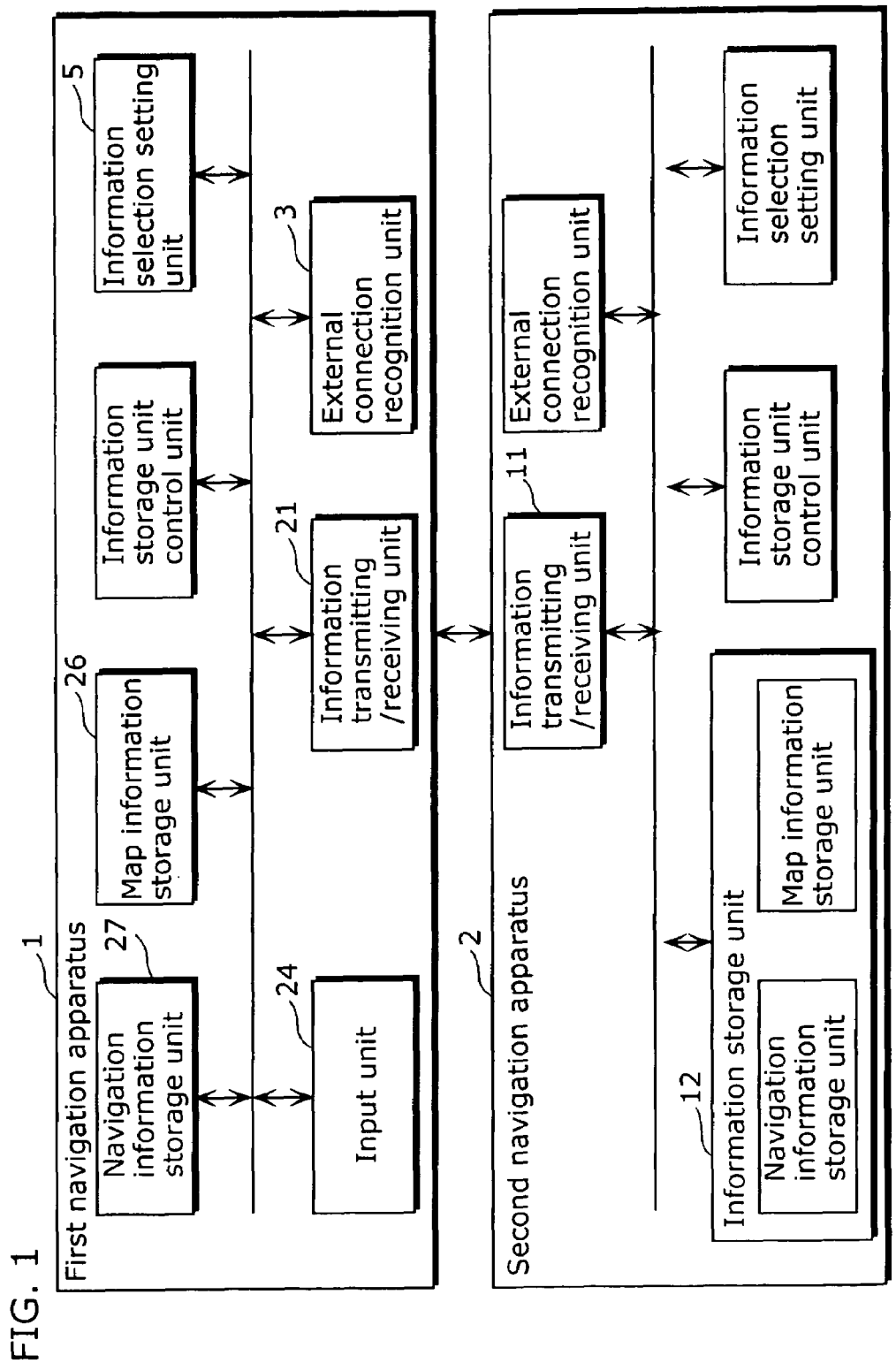
FIG. 1 is a diagram showing a configuration of a conventional moving history accumulation apparatus.

DESCRIPTION OF THE PREFERRED
EMBODIMENT(S)

In order to achieve the above object, the moving history conversion apparatus according to the present invention converts the representation format of moving history of a mobile object. The moving history conversion apparatus first map information accumulation unit which accumulates first map information which represents a map using a series of first-type IDs for identifying geographical positions; a first moving history accumulation unit which accumulates first moving history represented as the series of first-type IDs included in the first map information accumulated in the first map information accumulation unit; a second map information accumulation unit which accumulates second map information which represents a map using a series of second-type IDs for identifying geographical positions; a second moving history accumulation unit which accumulates second moving history represented as the series of second-type IDs included in the second map information accumulated in the second map information accumulation unit; and a conversion unit which converts the series of first-type IDs included in the first moving history accumulated in the first moving history accumulation unit into the series of second-type IDs included in the second map information accumulated in the second map information accumulation unit, and to accumulate the series of second-type IDs obtained through the conversion into the second moving history accumulation unit as the second moving history.

This converts the moving history represented as a format which depends on the first map information into a format of the second map information, allowing different apparatuses to mutually use the moving history.

Here, first and second map information may be expressed in any of a node form, a link form and a mix of them. Since moving history is converted based on the sameness in latitude and longitude, any of the following conversions is possible: a node form from a node form; a link form from a node form; a link form from a link form; and a node form from a link form.

Additionally, latitude and longitude information and time information can be interpolated, and then moving history can be converted based on the interpolated latitude and longitude information and time information. This allows the moving history to be converted more accurately.

Moreover, when there are plural candidates of moving history records to be converted in an apparatus to which moving history is passed down, it is desirable to convert them into moving history records which seem to be more probable candidates by referring to: moving history actually accumulated in the apparatus to which moving history is passed down; the information of the traffic information obtainment points such as VICS accompanied with the moving history; and information indicating whether or not the preset routes were passed through.

Then, as a conversion method, conversion may be performed not only via latitude and longitude information but also by referring to an association table of a first type ID and a second type ID of geographical positions which indicate that the identified positions are the same or close to each other.

Moreover, along with the conversion of moving history, accessory information can be passed down including time information in the moving history, the obtainment status of traffic information such as VICS, the information indicating whether or not the preset routes are passed through, and registered points set by a user. This is because such information is extremely useful if it can be also used in a new apparatus in addition to the moving history.

Furthermore, such moving history can be represented not only as the series of node IDs and link IDs in map information, but also the series of IDs of the communication base stations of which positions have been registered by a mobile phone. This allows different communication service companies to mutually use a user's moving history.

The moving history conversion apparatus according to the present invention is described below with reference to the drawings.

First Embodiment

Figure 2:
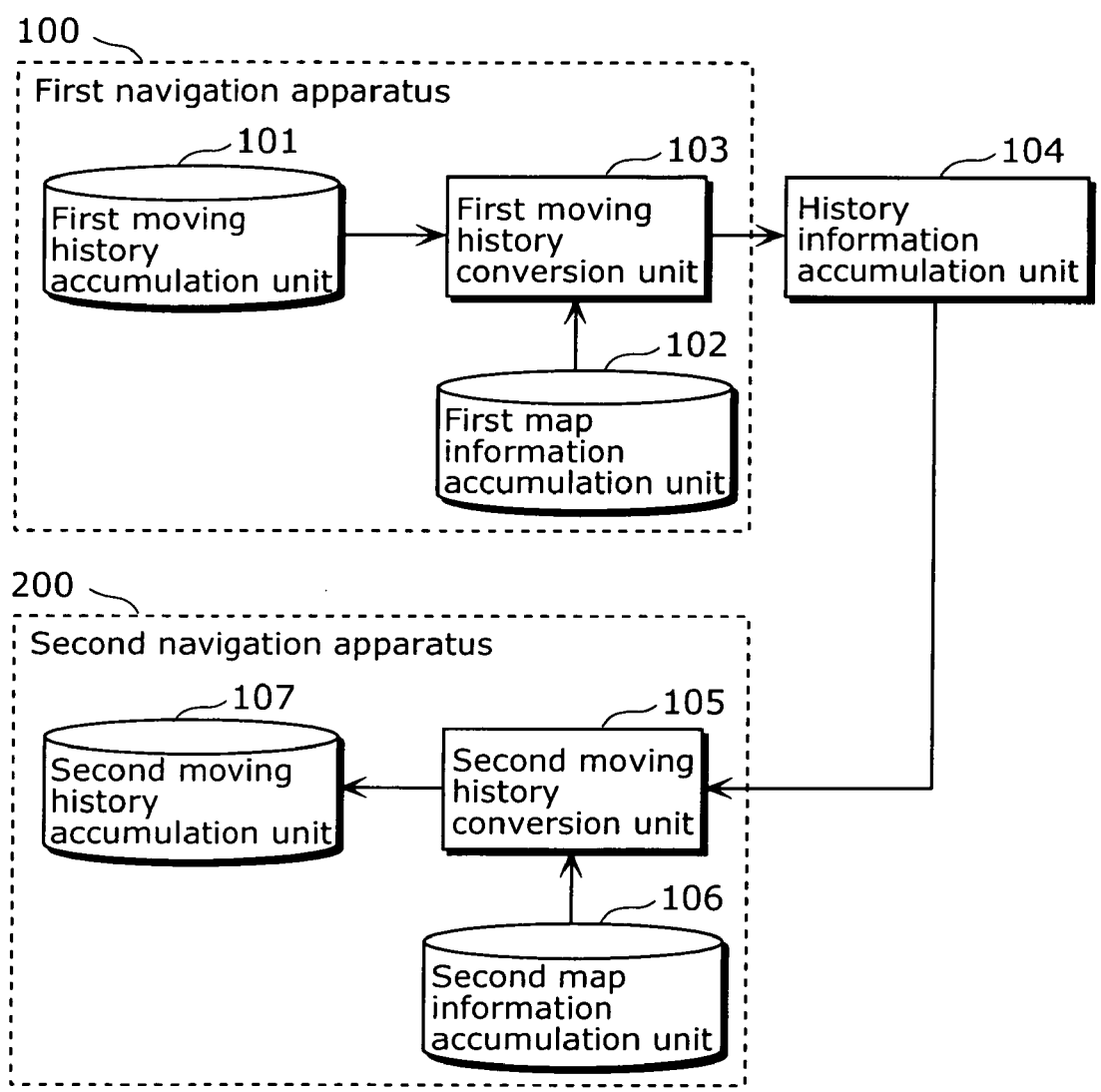
FIG. 2 is a functional block diagram of the moving history conversion apparatus in a first embodiment of the present invention.

FIG. 2 is a block diagram showing the entire configuration of the moving history conversion apparatus in the first embodiment of the present invention. This moving history conversion apparatus is configured with a first navigation apparatus 100, a history information accumulation unit 104 and a second navigation apparatus 200, and converts moving history accumulated in the first navigation apparatus 100 for use in the second navigation apparatus 200.

The first navigation apparatus 100 is a first mobile terminal, for example, a Car Navi, or the like, and has the following units: a first moving history accumulation unit 101 which accumulates moving history in a format unique to this apparatus; a first map information accumulation unit 102 which accumulates map information; and a first moving history conversion unit 103 which converts the moving history accumulated in the first moving history accumulation unit 101 referring to the map information accumulated in the first map information accumulation unit 102 into a common format (latitude and longitude information) and stores the converted moving history into the history information accumulation unit 104. This allows the moving history to be converted more accurately.

The second navigation apparatus 200 is a second mobile terminal, for example, a Car Navi, or the like, and has the following units: a second map information accumulation unit 106 which accumulates map information; a second moving history conversion unit 105 which converts history information (latitude and longitude information) accumulated in the history information accumulation unit 104 referring to map information accumulated in the second map information accumulation unit 106 into a format unique to this apparatus and stores the converted history information in the second map information accumulation unit 107; and the second moving history accumulation unit 107 which accumulates moving history obtained through the conversion in the second moving history conversion unit 105.

The history information accumulation unit 104 is a recording medium such as a memory card, or the like, to temporarily accumulate moving history (latitude and longitude information) to transfer the moving history in the first navigation apparatus 100 to the second navigation apparatus 200.

Figure 3:
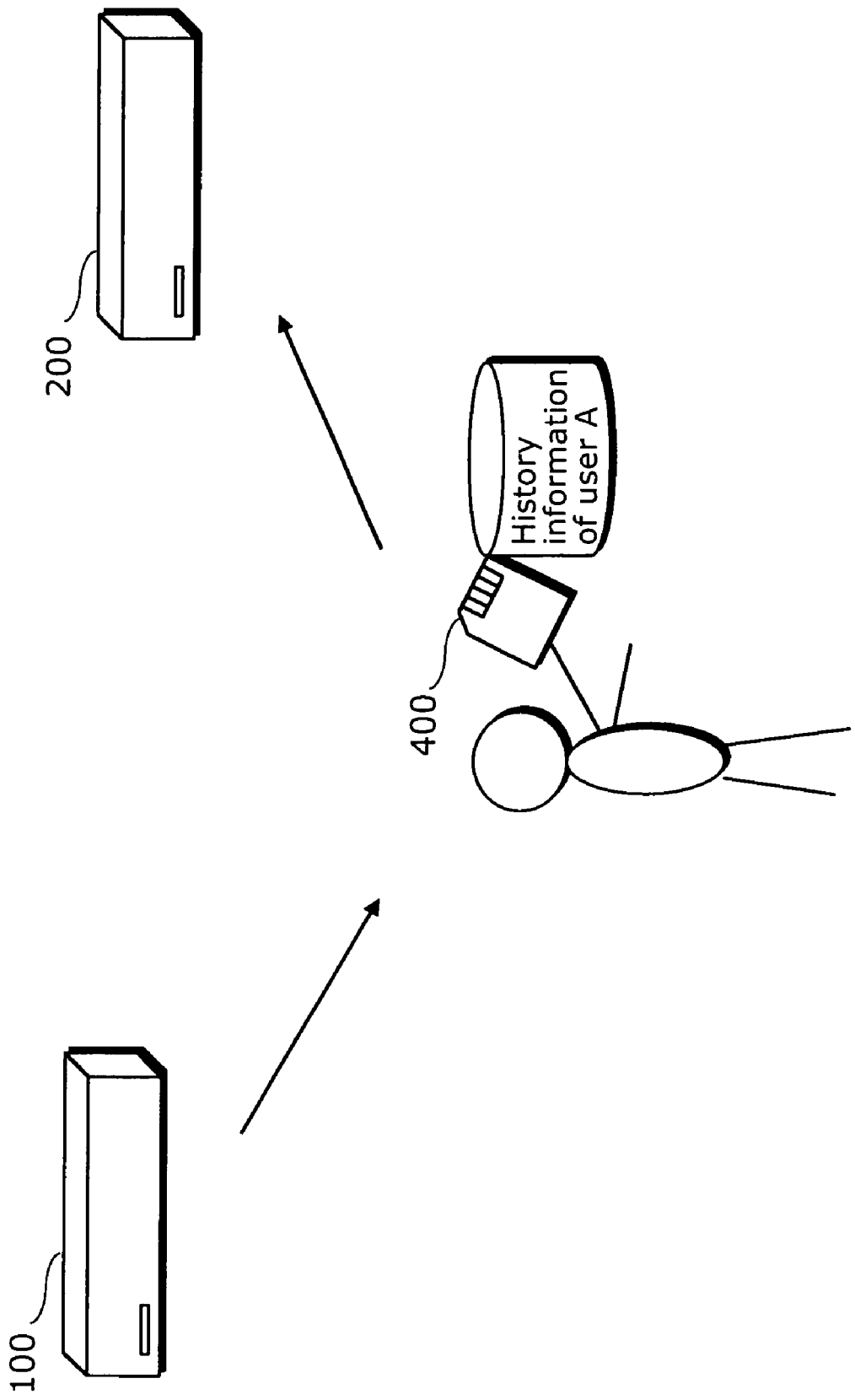
FIG. 3 is a diagram showing the hardware configuration of the moving history conversion apparatus.

FIG. 3 is a diagram showing an external view of the hardware configuration of the moving history conversion apparatus in FIG. 2. Here, it is shown that how moving history accumulated in the first navigation apparatus 100 is passed down to the second navigation apparatus 200 via the history information accumulation unit 104 configured with a recording medium and other functions.

Constituent elements of this moving history conversion apparatus are described below in detail.

Figure 4:
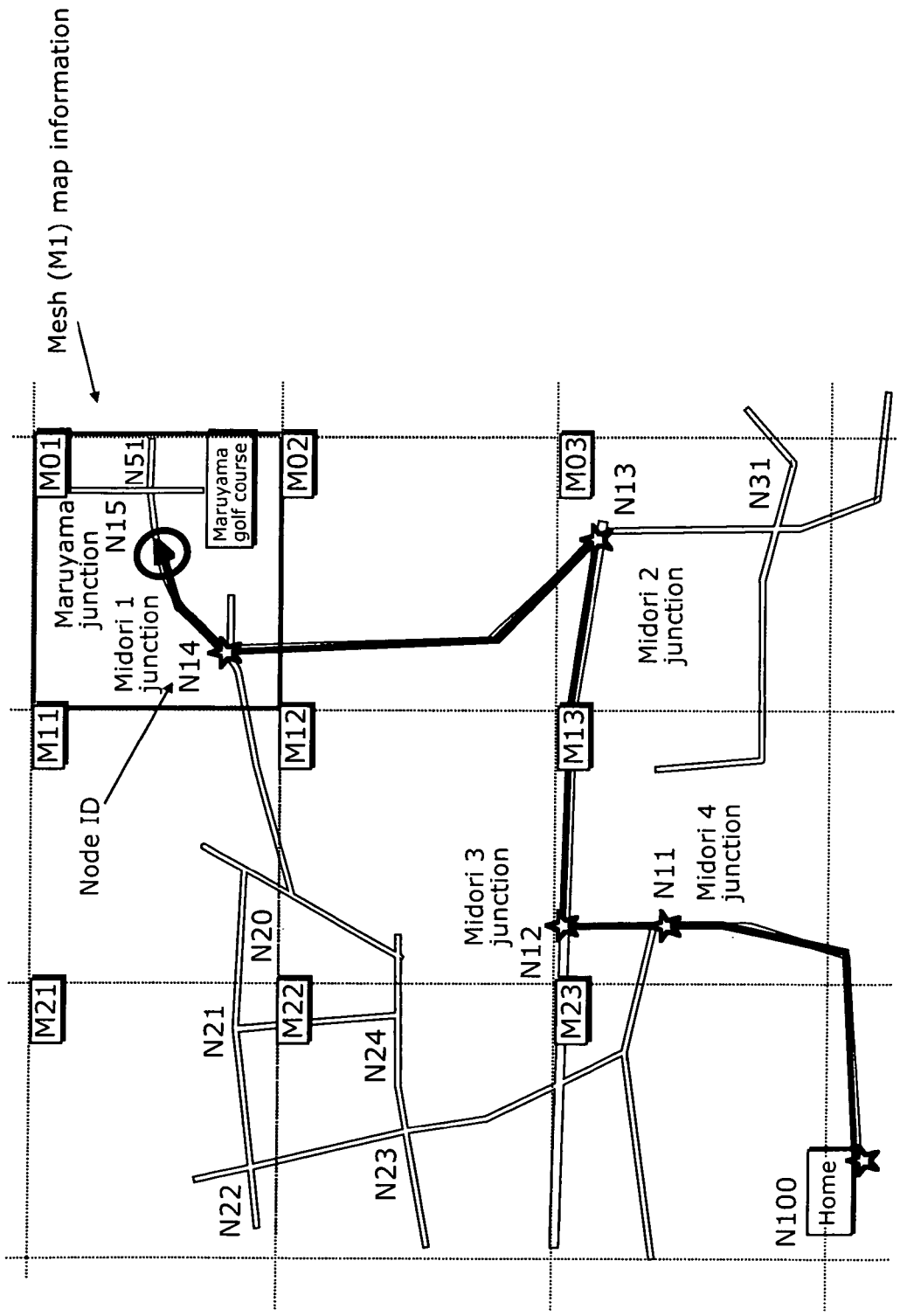
FIG. 4 is a diagram showing map information and moving history.

The first map information accumulation unit 102 is a hard disk, or the like, to store map information equipped in the first navigation apparatus 100 (hereafter also called "first map information"). Generally, map information is used for displaying a user's present position detected by a GPS or the like, and navigating a route, for example. In addition, generally, such map information is divided into predetermined areas in mesh form or the like as shown in FIG. 4 and accumulated as a hierarchical structure, including nodes of junctions or the like which are present on the mesh and detailed information of these nodes, for example. The format and information type depend on each map information record. The following is a detailed description of the first map information in this embodiment.

The first map information is divided into a mesh as shown in FIG. 4 and is provided with reference numerals such as a mesh ID "M01", "M02", etc.

Figure 5:
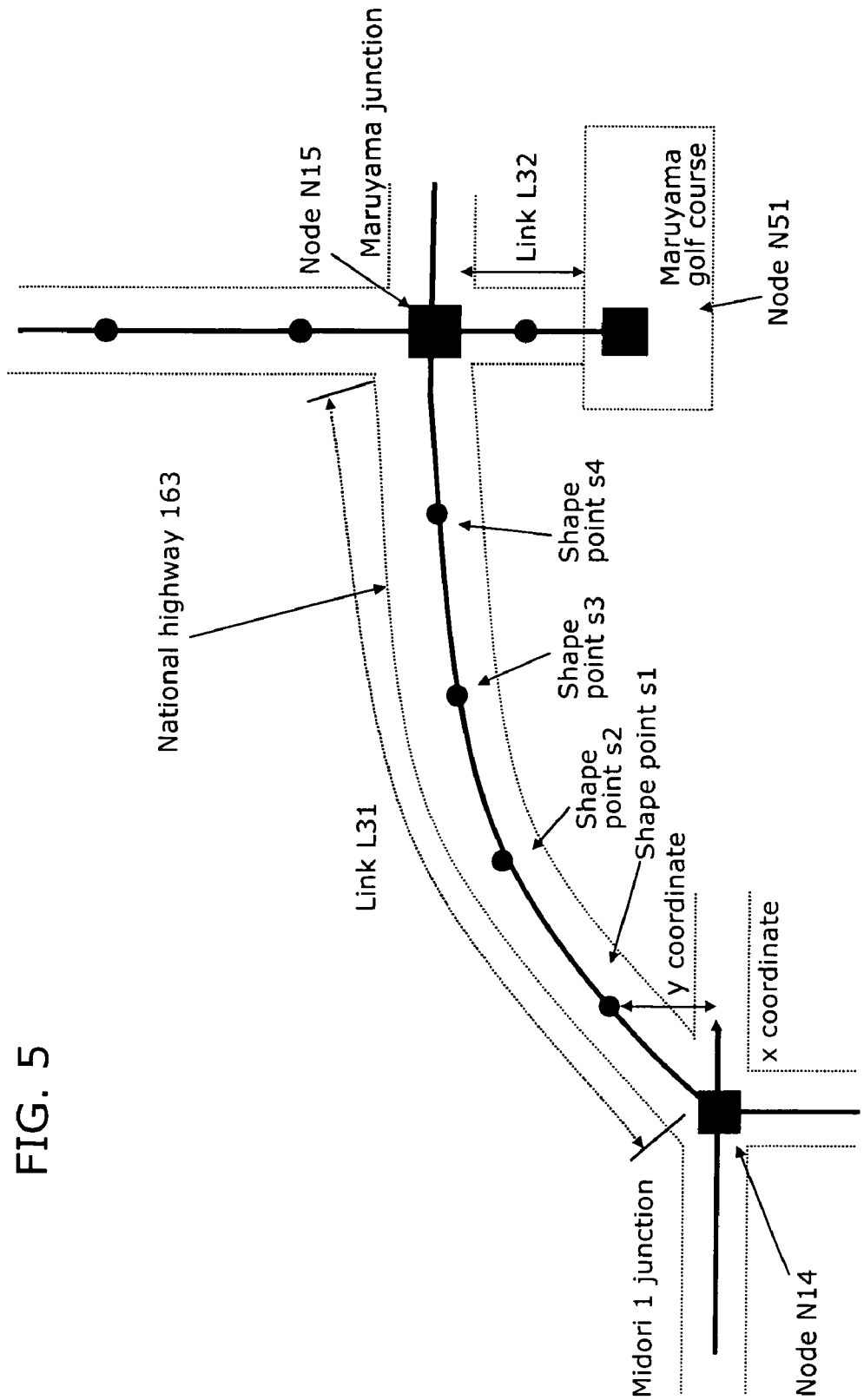
FIG. 5 is a diagram showing the first map information.

FIG. 5 is a diagram showing the enlarged view of the mesh ID "M01". FIG. 5 shows the junction "Midori 1 junction" which is present on the mesh ID "M01", the landmark "Maruyama golf course" and the road "National highway 163". This first map information has a network structure indicating such road information as nodes, links, and the like.

In other words, junctions and landmarks are represented as nodes (square marks in FIG. 5). In FIG. 5, for example, the junction "Midori 1 junction" is represented as the node ID "N (node) 14" and the landmark "Maruyama golf course" is represented as the node ID "N51".

Moreover, bold black lines in FIG. 5 are links connecting these nodes and follow the center lines of the roads. For example, in FIG. 5 the road "National highway 163" connecting the node IDs "N14 (Midori 1 junction)" and "N15 (Maruyama junction)" is represented as the link ID "L (link) 31". This link has "shape points" which define the shape. Each shape point has coordinates (x-coordinate and y-coordinate) (for example, the coordinates of absolute values based on one end of a node) and the number of shape points varies depending on the link length and complexity. For example, the link ID "L31 (National highway 163)" has four shape points including shape points: "s (Shape) 1", "s2", "s3" and "s4" which represent the curve of the link ID "L31".

Figure 6:
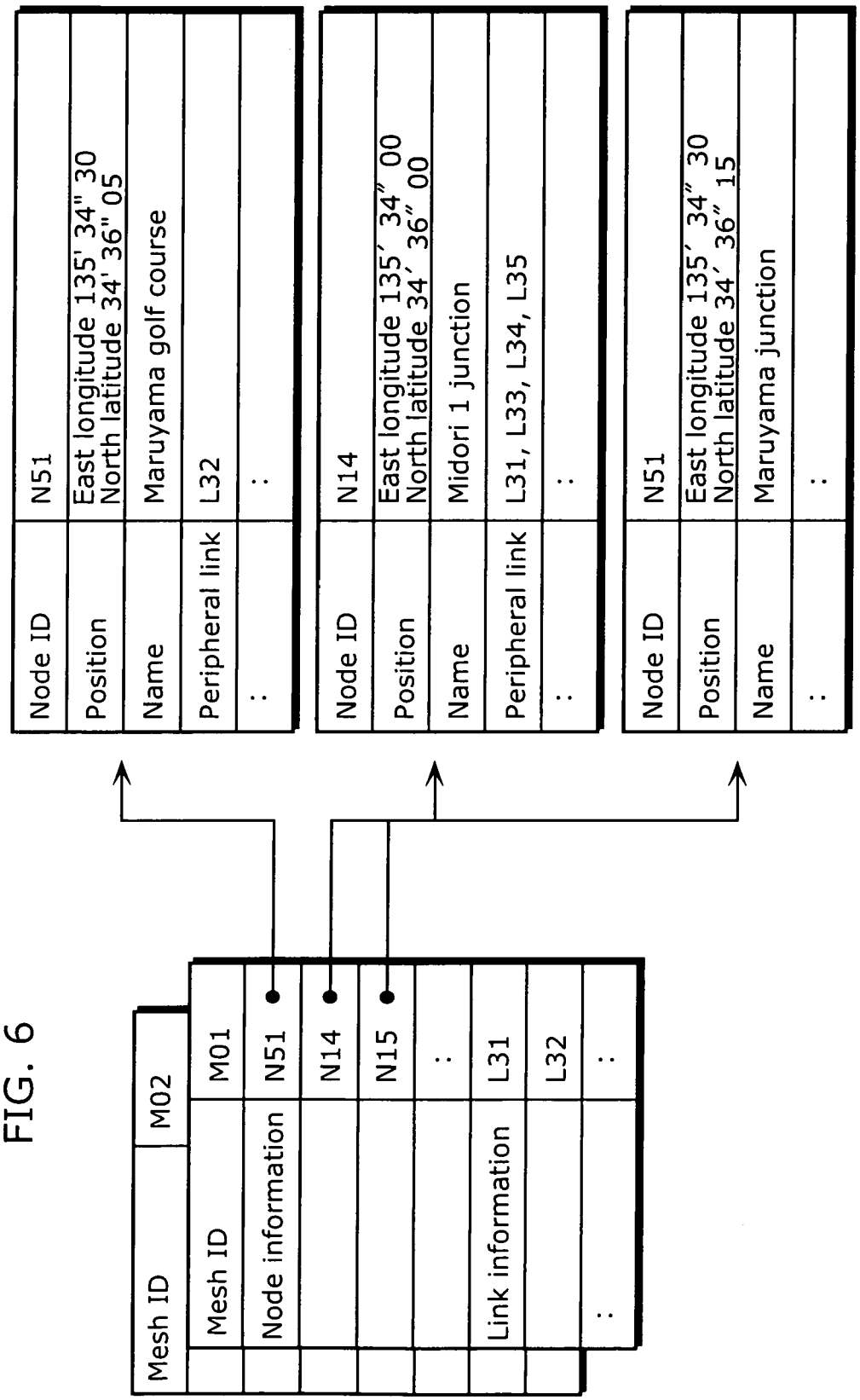
FIG. 6 is a diagram showing the first map information.

FIG. 6 is a diagram showing detailed information in the mesh ID "M01". In the mesh ID "M01", the following have been accumulated in list form (as shown with the arrows in FIG. 6): the node IDs "N51", "N14", "N15", etc. and detailed information of each node such as "Maruyama golf course" which is the name of the node ID "N51", the position "longitude 135 degrees 34 minutes 34 seconds east and latitude 34 degrees 36 minutes 05 seconds north" and the peripheral link "L32", and the like.

Figure 7:
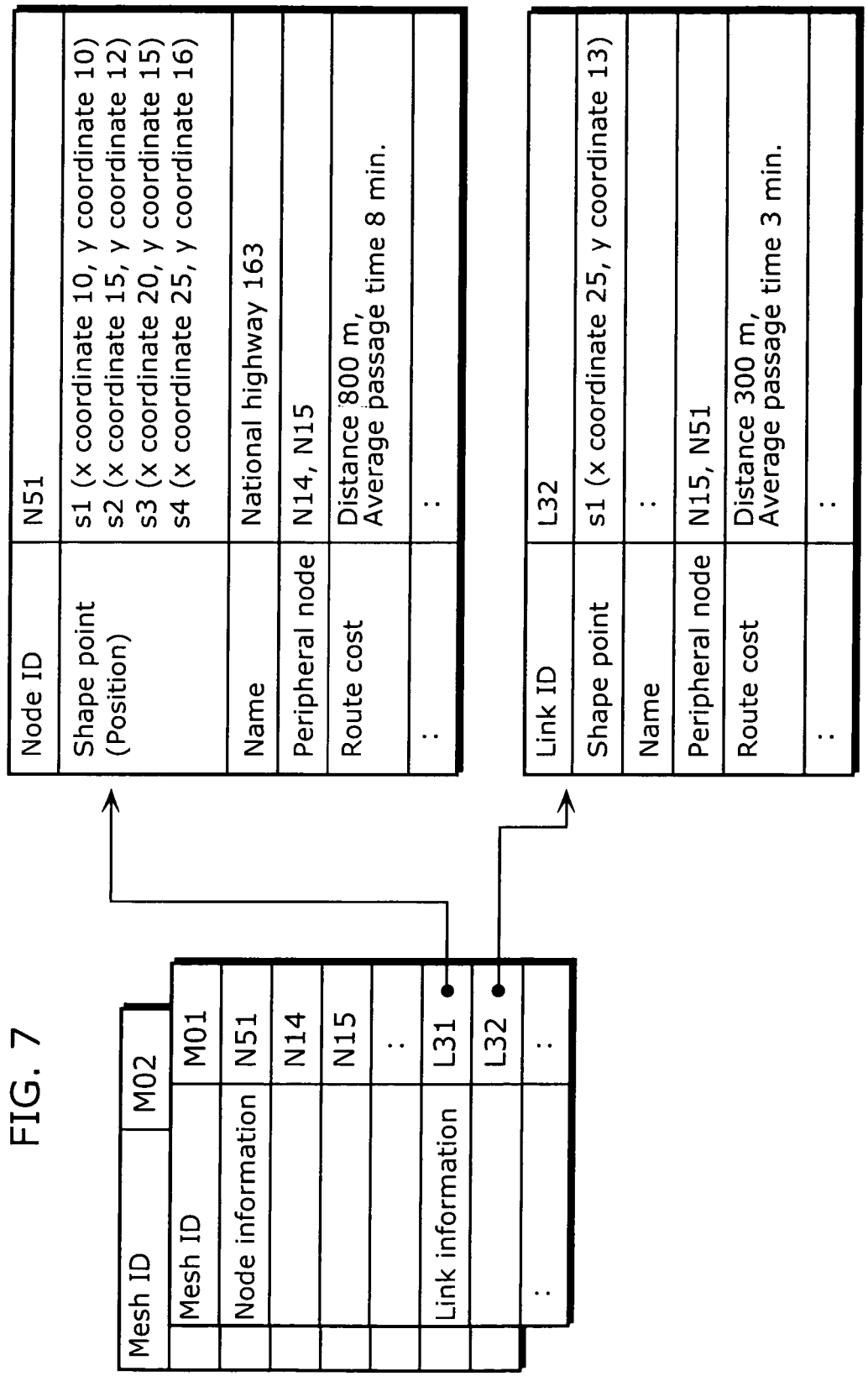
FIG. 7 is a diagram showing the first map information.

FIG. 7 is a diagram showing detailed link information. There are shown the link IDs "L31" and "L32" as link information. In addition, detailed information of each link is shown including "National highway 163" which is the name of the link ID "L31", the shape point and its coordinates "s1 (x-coordinate 10, y-coordinate 10)" and the peripheral nodes "N14", "N15" which are both the ends of the link, for example. Moreover, as route cost information used for route search, the entire link distance "800 m" and the average time of "8 minutes" required for passing through the link are accumulated. Generally, this map information is accumulated as node IDs and a link structure connecting the respective nodes. Additionally, the IDs and formats vary depending on respective map information.

The first moving history accumulation unit 101 is memory and the like which accumulate a user's moving history. Generally, a vehicle with a Car Navi is equipped with a GPS to detect its position and the detected position is used for route guidance. In recent years, mobile phones with a GPS are also emerging, for example. This position to be detected as needed can be accumulated as a user's moving history and it allows a user to search a route and register a destination based on a past moving history. Furthermore, moving history is a piece of very important information because it can be used for understanding a user's activity tendency and destination estimation. For example, customized information can be provided to a user by extracting frequent patterns from the moving history and important information relating to security can be provided in advance by estimating a destination.

On the other hand, moving history accumulation formats vary depending on each apparatus. For example, moving history can be accumulated as the series of the node IDs of the routes and junctions included in the above-mentioned map information as well as the series of the communications communication base station IDs in the case of mobile phones and the like as follows.

For example, position information obtained by a GPS antenna is latitude and longitude information and moving history can be configured by accumulating the values obtained at each time point. However, if moving history is accumulated as the latitude and longitude information values at a predetermined time interval, when a user passes through the same junction at different date and time, the latitude and longitude (the same latitude and longitude) values of the junction have not been always accumulated because of differences in the position accuracy by a GPS antenna or depending on a time sampling interval. Therefore, data accumulated as latitude and longitude information is converted into an easily accessible format in accordance with map information to be used. For example, time-series data of latitude and longitude information is converted into the ID information of the nodes and the road link information defined by a map to be used. This allows easy calculation of the number and time point of a user's passing-through of the junctions and predetermined roads.

In this embodiment, moving history is accumulated as the series of node IDs shown in the above-mentioned first map information. In FIG. 4 bold black lines indicate a user's traveling route (moving history). It shows that the user left home (N100) and passed through the node ID "N11 (Midori 4 junction)", "N12 (Midori 3 junction)", "N13 (Midori 2 junction)" and "N14 (Midori 1 junction)" in this order. Then, it is assumed that the user made a right turn at "N15 (Maruyama junction)" and moved to the destination "Maruyama golf course". The first moving history accumulation unit 101 accumulates this traveling route of the user as the series of the node IDs (asterisks in FIG. 4).

FIG. 8 is a diagram showing a user's moving history accumulated in the first moving history accumulation unit 101. For example, it is assumed that a node where the engine is started is a starting point and a node where the engine is stopped is a destination. Further, a series of such nodes are accumulated by extracting node information such as the junctions passed through by the user from the first map information. The above-mentioned traveling route is the moving history ID "001" in FIG. 8. The starting point "home (N100)", the destination "Maruyama golf course (N51)" as well as the node IDs "N11" and "N12" in the passed-through route are accumulated as the series of nodes.

In addition, passage time and moving date and time may be accumulated by using time points and other information obtained by a GPS. In this case, the moving history ID "001" is accumulated in the date "Sep. 20, 2004", and the passing-through time of the node ID "N11" is 8:50.

Figure 9:
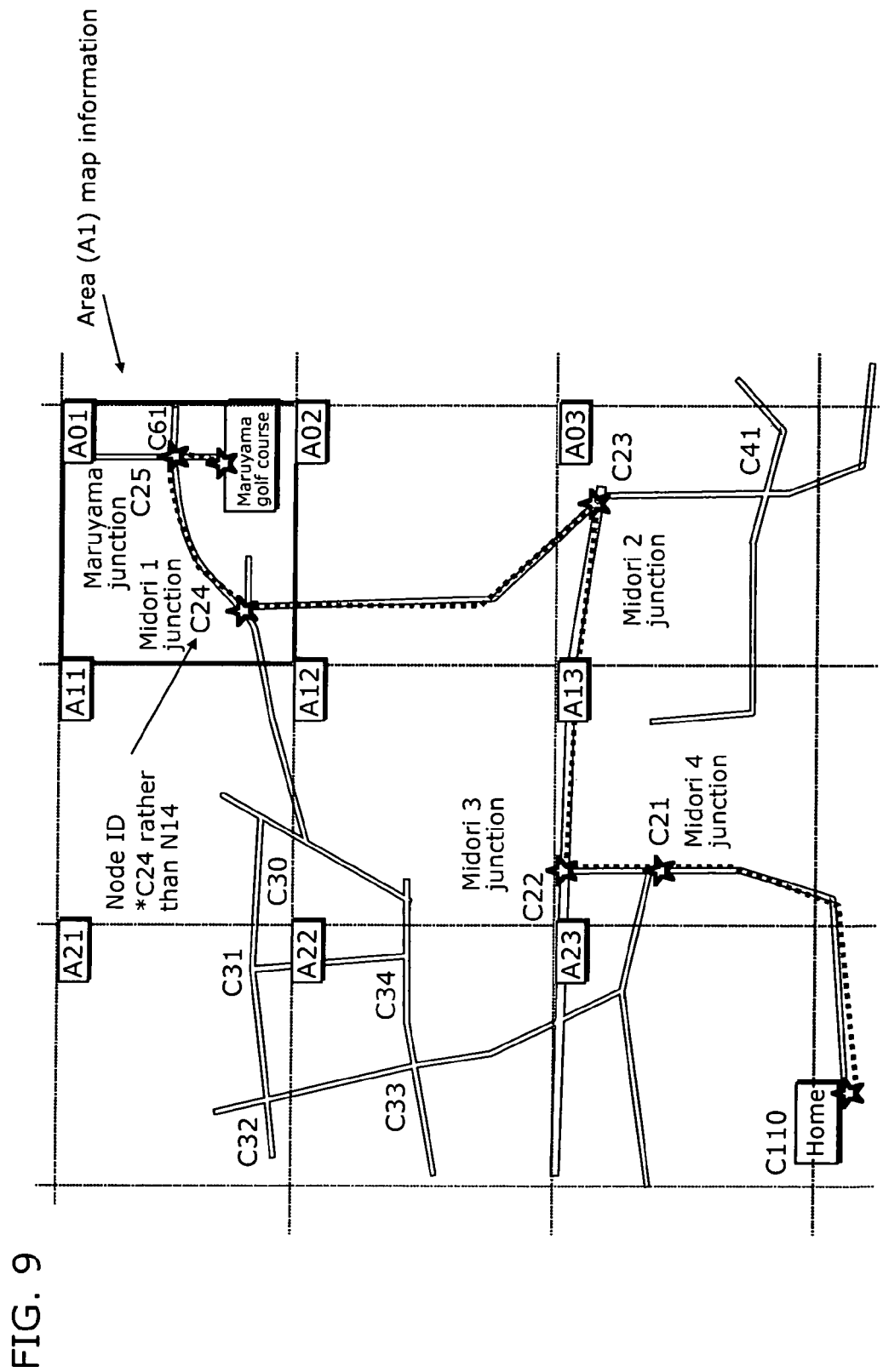
FIG. 9 is a diagram showing the second map information.
Figure 10:
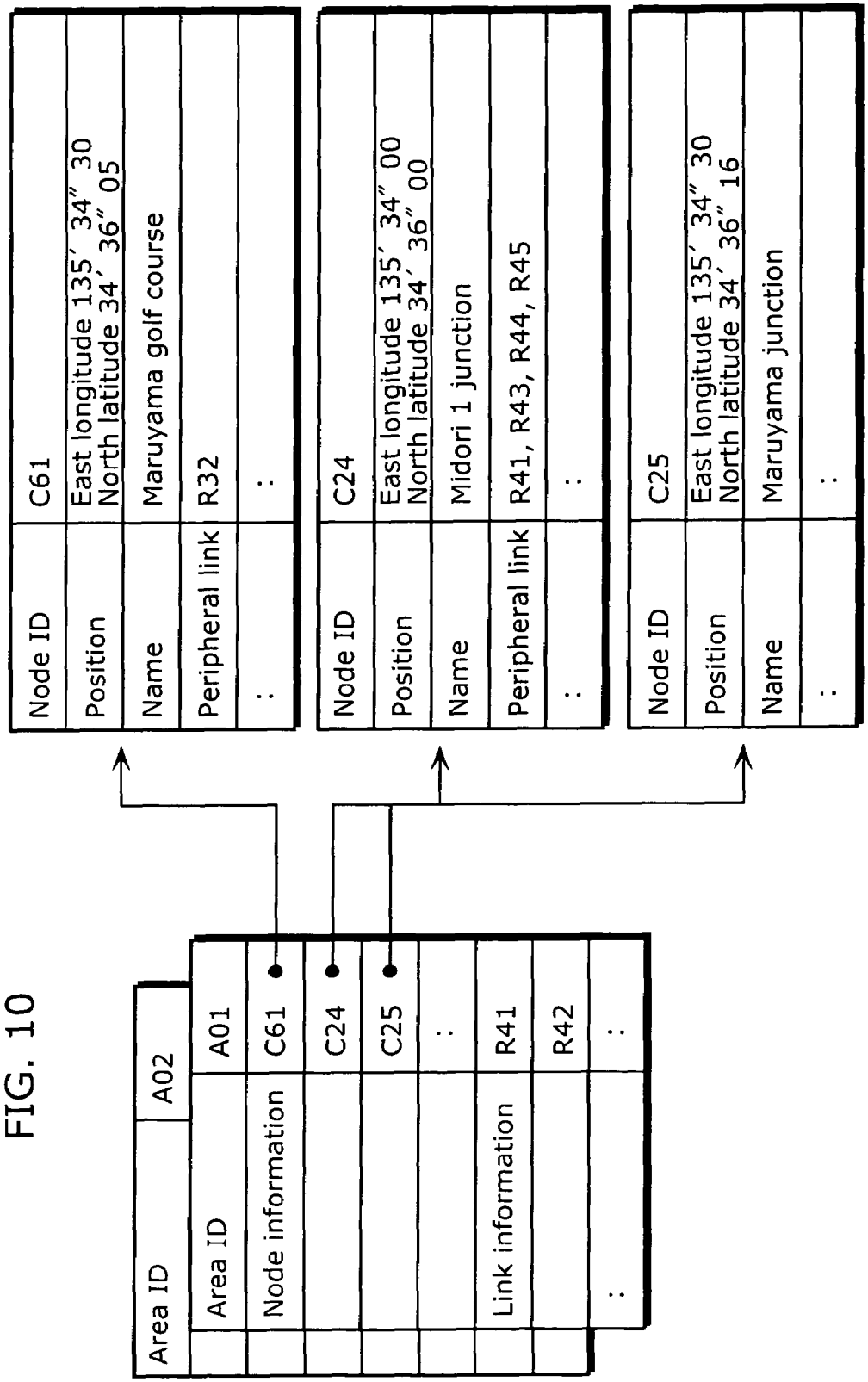
FIG. 10 is a diagram showing the second map information.

FIG. 9 is a diagram showing map information accumulated in the second map information accumulation unit 106 in the second navigation apparatus 200. The second map information is the geographically the same as that of FIG. 3, but the system of the map information is different. For example, the area ID "A (area) 01" and "A02" on the mesh in FIG. 9 are different from "M (mesh)" of the first map information. Additionally, detailed information in the area is different from that of the first map information. FIG. 10 is a diagram showing the area "A01" node information in the second map information. There are the node IDs including "C (Cross point) 24 (Midori 1 junction)", "C25 (Maruyama junction)", the landmark "C61 (Maruyama golf course)" assigned to the respective junctions. Moreover, as detailed information of each node, node information is listed (as shown with the arrows) and accumulated. The list, for example, shows that the node ID "C61" represents a golf course named "Maruyama golf course" located at "longitude 135 degrees 34 minutes 39 seconds east and latitude 34 degrees 36 minutes 06 seconds north". Moreover, it is assumed that a link connecting these nodes is indicated as R (route) in the second map information.

As mentioned above, even the same map information has a different format depending on a map (for example, a type or a maker of the map). The IDs which are described in this embodiment are totally different between the first map information where a node is "N (node)" and a link is "L (link)" and the second map information where a node is "C (cross point)" and a link is "R (route)".

Under this environment, when the above-mentioned moving history is passed down from the first navigation apparatus 100 to the second navigation apparatus 200, inconsistency occurs in the history. For example, in the moving history ID "001"; that is, the moving history from "home" to "Maruyama golf course" accumulated in the first moving history accumulation unit 101, the route starts with the node ID "N100" and ends with "N51" via "N11", "N12", etc. On the other hand, since the second map information has no corresponding IDs (because it has "C (cross point)" rather than "N (node)"), inconsistency occurs and the information cannot be used in the same format.

Therefore, in this embodiment, moving history accumulated in a format unique to equipment is converted into a generic format to be used in another apparatus. For example, numeric data of latitude and longitude are generally used as common values even between map information items each having a different format. The node IDs of "Maruyama golf course" are "N51" and "C61", which are totally different, in the respective map information items shown in FIG. 6 and FIG. 10. At the same time, "position" indicating "Maruyama golf course" is represented by latitude and longitude information and the values of "longitude 135 degrees 34 minutes 30 seconds east and latitude 34 degrees 36 minutes 05 seconds north" are the same. Therefore, in this embodiment, moving history accumulated as the series of node IDs unique to the equipment is converted via the latitude and longitude information with generic formats.

The first moving history conversion 103 is a processing unit which converts, based on the first map information, the moving history accumulated as the series of node IDs accumulated in the first moving history accumulation unit 101 into such latitude and longitude information.

Figure 11:
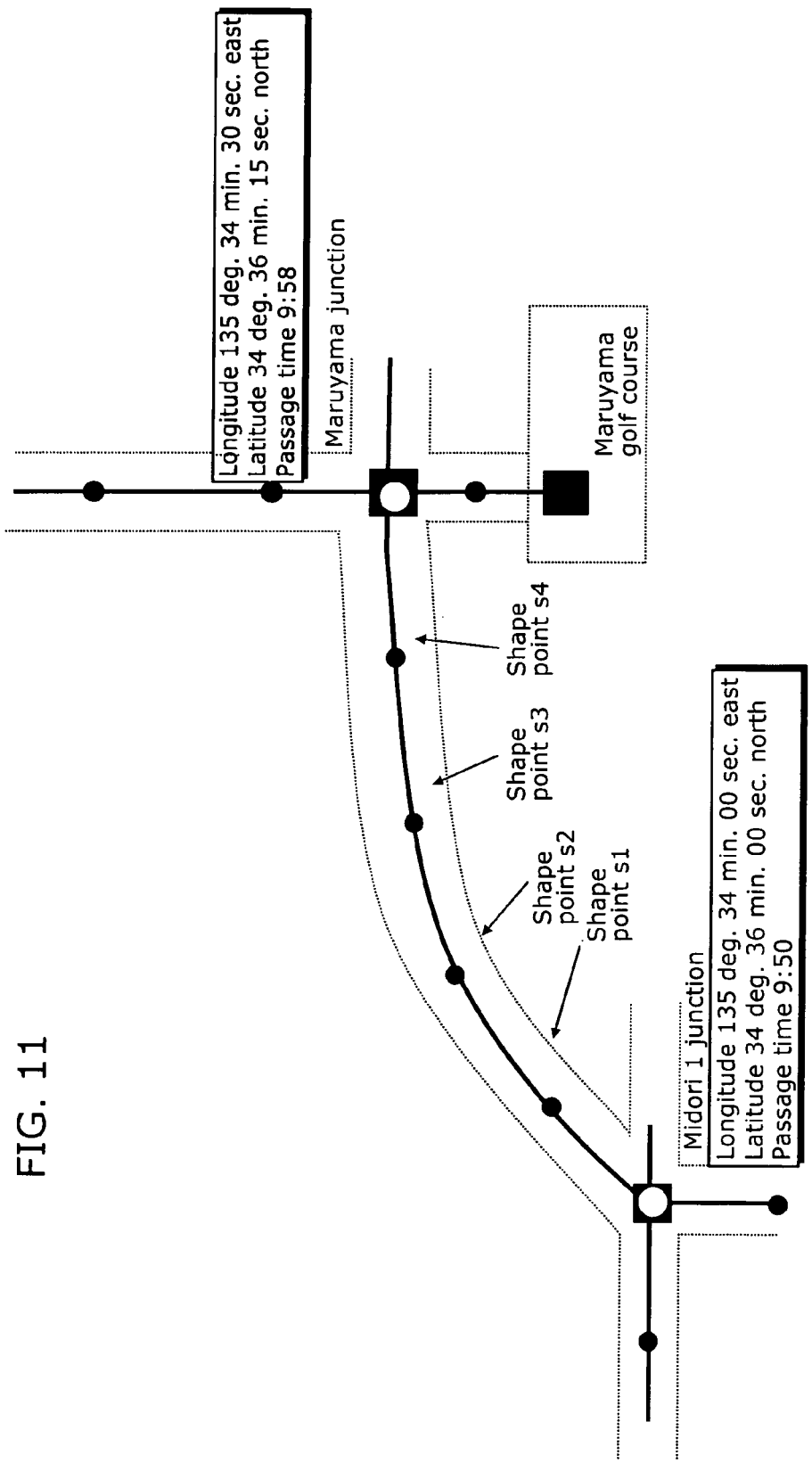
FIG. 11 is a diagram showing a conversion of the moving history.

Like FIG. 5, FIG. 11 is a diagram showing an enlarged view of the vicinity of the mesh ID "M01". The mesh ID "M01" has the node ID "N14 (Midori 1 junction)" and "N15 (Maruyama junction)". Additionally, each node has latitude and longitude information indicating the position (the first map information in FIG. 6). The position of the node ID "N14 (Midori 1 junction)" is "longitude 135 degrees 34 minutes 00 seconds east and latitude 34 degrees 36 minutes 00 seconds north". The position of the node ID "N15 (Maruyama junction)" is longitude 135 degrees 34 minutes 30 seconds east and latitude 34 degrees 36 minutes 15 seconds north.

On the contrary, the node IDs "N14" and "N15" are accumulated as moving history in the first moving history accumulation unit 101 (the moving history ID "001"). In other words, it shows that a user has made a right turn at "Midori 1 junction" and reached "Maruyama junction". Accordingly, the first moving history conversion unit 103 converts the series of node IDs of the passed-through nodes into the rows of latitude and longitude information by using this latitude and longitude information. As the result, the node IDs in the first map information are converted into the latitude and longitude information as follows: the node ID "N14 (Midori 1 junction)" is converted into "longitude 135 degrees 34 minutes 00 seconds east and latitude 34 degrees 36 minutes 00 seconds north"; and the node ID "N15 (Maruyama junction)"

is converted into "longitude 135 degrees 34 minutes 30 seconds east and latitude 34 degrees 36 minutes 15 seconds north".

For example, the moving history ID "001" in FIG. 8; that is, moving history indicating that a user left "home" and moved to "Maruyama golf course" (the asterisk series in FIG. 4), is converted into latitude and longitude information shown in FIG. 12 by using the "position information" of the respective nodes shown in the latitude and longitude information in the first map information. For example, "Midori 1 junction" expressed in the node ID "N14" indicates "longitude 135 degrees 34 minutes 00 seconds east and latitude 34 degrees 36 minutes 00 seconds north" in the first map information shown in FIG. 6, while "Maruyama junction" indicates "longitude 135 degrees 34 minutes 30 seconds east and latitude 34 degrees 36 minutes 15 seconds north"; they are converted into the corresponding latitude and longitude information.

The history information accumulation unit 104 is a memory and the like to accumulate moving history, for example, converted into latitude and longitude information through the first moving history conversion unit 103. In this embodiment, the history information accumulation unit 104, for example, is configured with a recording medium, or the like, and is a temporary storage apparatus through which the moving history is passed down to the second navigation apparatus 200. FIG. 12 shows the converted latitude and longitude information; that is, the moving history converted into latitude and longitude information through the first moving history conversion unit 103 and accumulated in the history accumulation unit 104.

The second moving history conversion unit 105 is a processing unit which converts the formats of the followings into formats available by the second navigation apparatus 200: moving history converted into latitude and longitude information accumulated in the history information accumulation unit 104; and the second map information accumulated in the second map information accumulation unit 106. In addition, since latitude and longitude information of the first map information does not always match that of the second map information, such conversion is applied to a predetermined scope. The following is described in reference to the figures.

Figure 13:
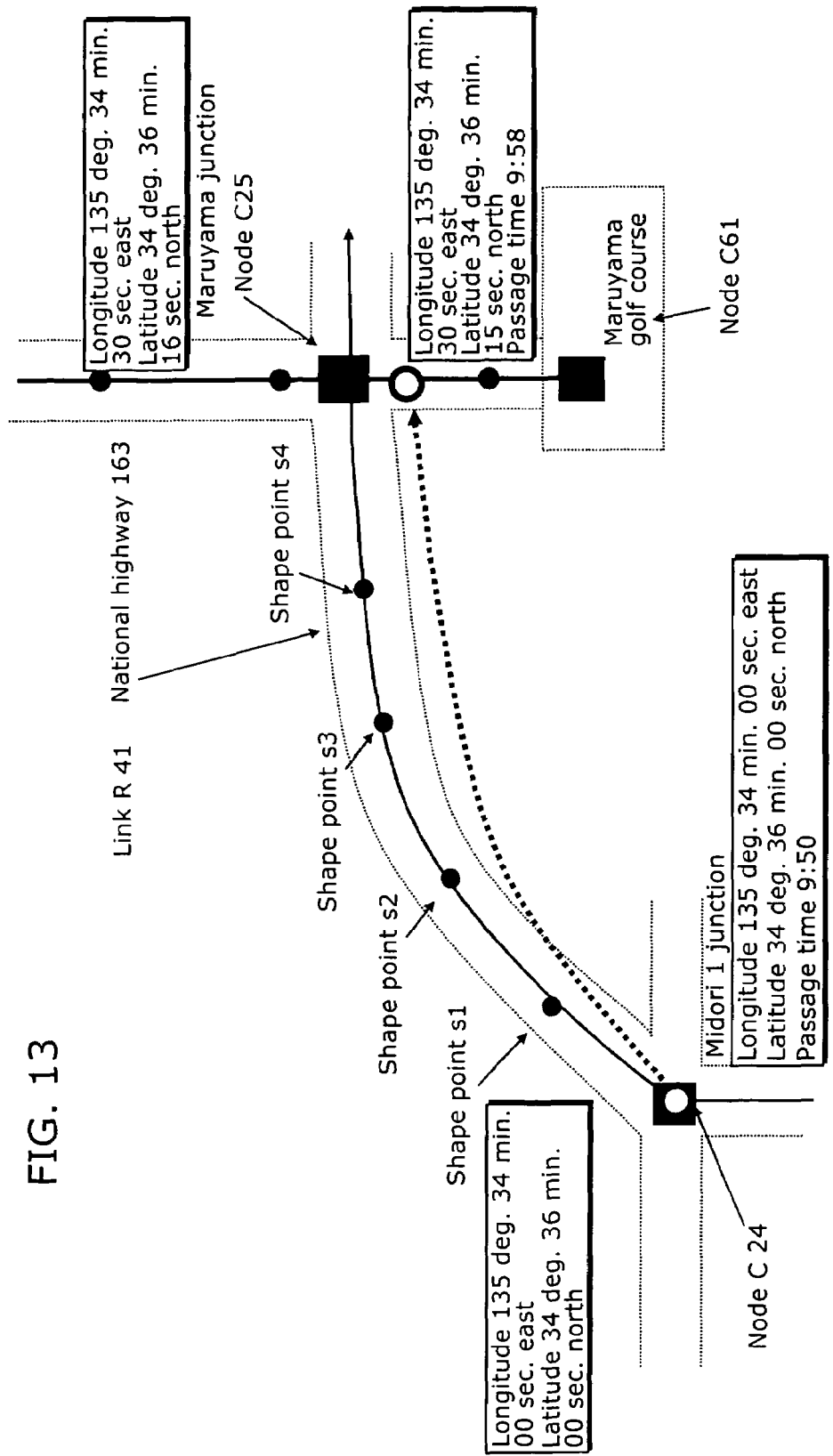
FIG. 13 is a diagram showing the conversion of the moving history.

FIG. 13 is an enlarged view of the vicinity of the area ID "A01" in the second map information. Area "A01" corresponds to the vicinity of the mesh ID "M01" in the first map information. Additionally, nodes and links are indicated by using the same symbols. In other words, black square marks are nodes in the second map information where "Midori 1 junction" is indicated as the node ID "C24" and "Maruyama junction" as "C25". Links are indicated as bold black lines including the link ID "R41 (National highway)" connecting "Midori 1 junction" and "Maruyama junction", for example.

White circles are latitude and longitude information "longitude 135 degrees 34 minutes 00 seconds east and latitude 34 degrees 36 minutes 00 seconds north" and "longitude 135 degrees 34 minutes 30 seconds east and latitude 34 degrees 36 minutes 15 seconds north" accumulated in the history information accumulation unit 104. The circles correspond to the positions of the node IDs "N14 (Midori junction)" and "N15 (Maruyama junction)".

Here, since the latitude and longitude of the node ID "C24 (Midori 1 junction)" in the second map information matches "Midori 1 junction (which is the node ID "N14")" in the first map information, the user is considered to pass through the node. On the other hand, since the latitude and longitude of the Maruyama junction is different, there is a possibility that the user may not be considered to pass through the node in the second navigation apparatus 200.

In this embodiment, therefore, moving history can be passed down by regarding these passed-through points as respectively adjacent nodes within the predetermined scope. For example, if the predetermined scope is the area of the radius 50 m from each node as a center and the passed-through point is included in the predetermined scope, the node is considered to be passed through.

Figure 14:
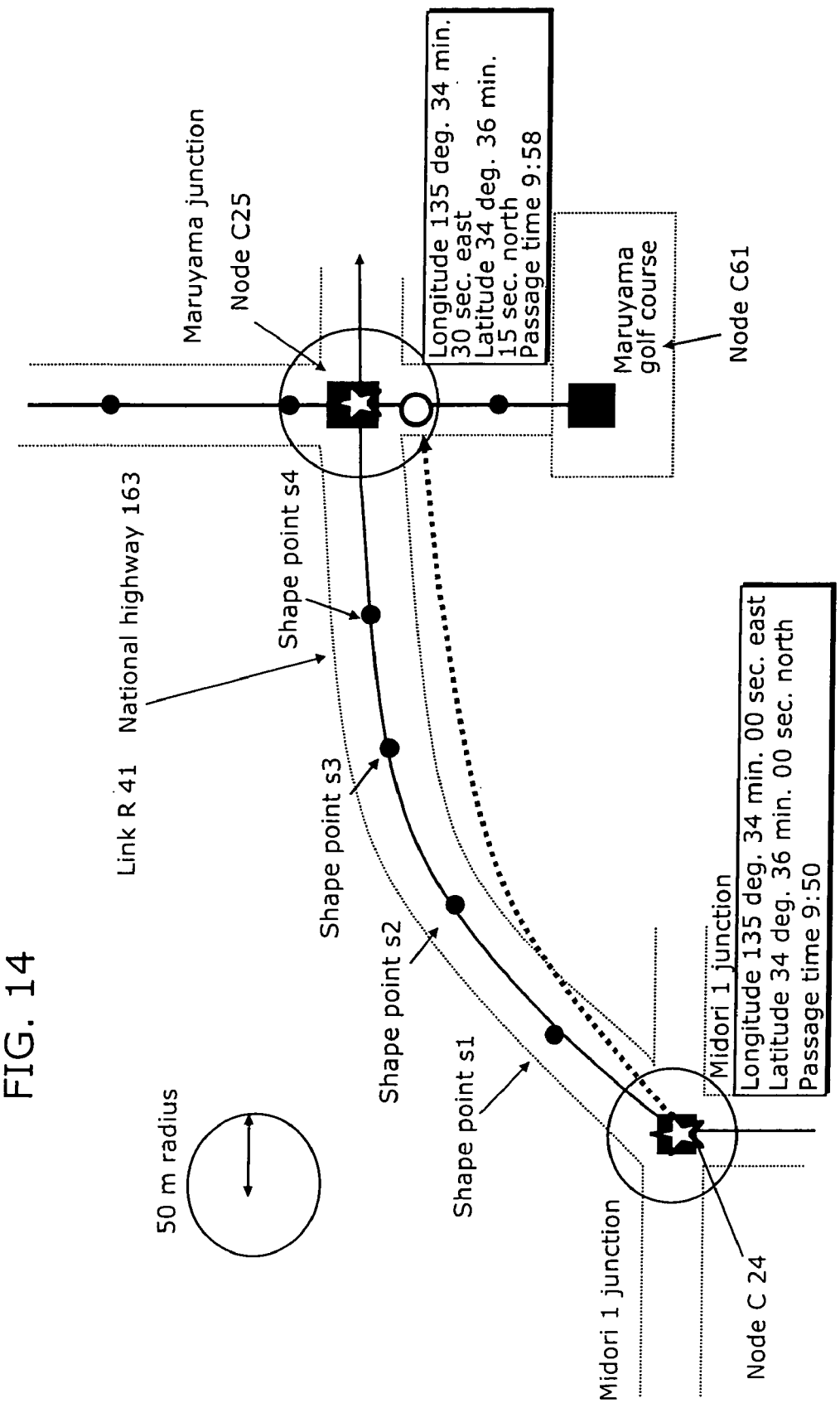
FIG. 14 is a diagram showing the conversion of the moving history.

For example, since the information of "longitude 135 degrees 34 minutes 00 seconds east and latitude 34 degrees 36 minutes 00 seconds north (latitude and longitude converted from N14)", in FIG. 14, which is present in the history corresponds to the node ID "C24 (Midori 1 junction)" in the second map information, the information is converted into the node ID "C24" (indicated by an asterisk). On the other hand, the information of "longitude 135 degrees 34 minutes 30 seconds east and latitude 34 degrees 36 minutes 15 seconds north" which is present in the history does not correspond to the node ID "C25 (Maruyama junction)" in the second map information, but is included in the scope (it is considered to be included because one second corresponds to about 25 m in the vicinity of longitude 135 degrees east and latitude 34 degrees north). Therefore, the information is converted into the node ID "C25". By applying the above-mentioned procedure to the latitude and longitude information accumulated in the history information accumulation unit 104, the latitude and longitude information can be converted into moving history available in the second navigation apparatus 200. Accordingly, the second moving history conversion unit 105 stores moving history obtained through this conversion in the second history accumulation unit 107.

In addition, this scope can be changed depending on junctions and landmarks. For example, it is desirable to extend the scope for a theme park or other facility with wide parking space. In addition, it is possible to perform matching again considering a node to become a matching node. Assuming that the information of "longitude 135 degrees 34 minutes 30 seconds east and latitude 34 degrees 36 minutes 15 seconds north" is not included in the scope of the node ID "C25" in FIG. 14, and that there is a node which is to match the node ID "C61". In this case, in order to pass through the node ID "C24 (Midori 1 junction)" and reach the node ID "C61 (Maruyama golf course)", it is necessary to pass through the node ID "C25 (Maruyama junction)". Therefore, although the passing-through point is not included in the scope, the passing-through point can be considered as the node ID "C25" and extracted as a node. Unlike the control of position information simply detected in real time, moving history conversion in this embodiment allows a subsequent passing-through point to be considered. Therefore, it becomes possible to perform more accurate passing-down of the history considering a node which is to be a matching node. By applying the above-mentioned procedure to each latitude and longitude accumulated in the history information accumulation unit 104, each latitude and longitude can be converted into the node series available by the second navigation apparatus 200.

FIG. 15 is a diagram showing moving history accumulated in the second history accumulation unit 107. The moving history ID "001" includes the node IDs "C100 (home)", "C24 (Midori 1 junction)", "C25 (Maruyama junction)", "C61 (Maruyama golf course)" with a format which is available in the second map information.

Figure 16:
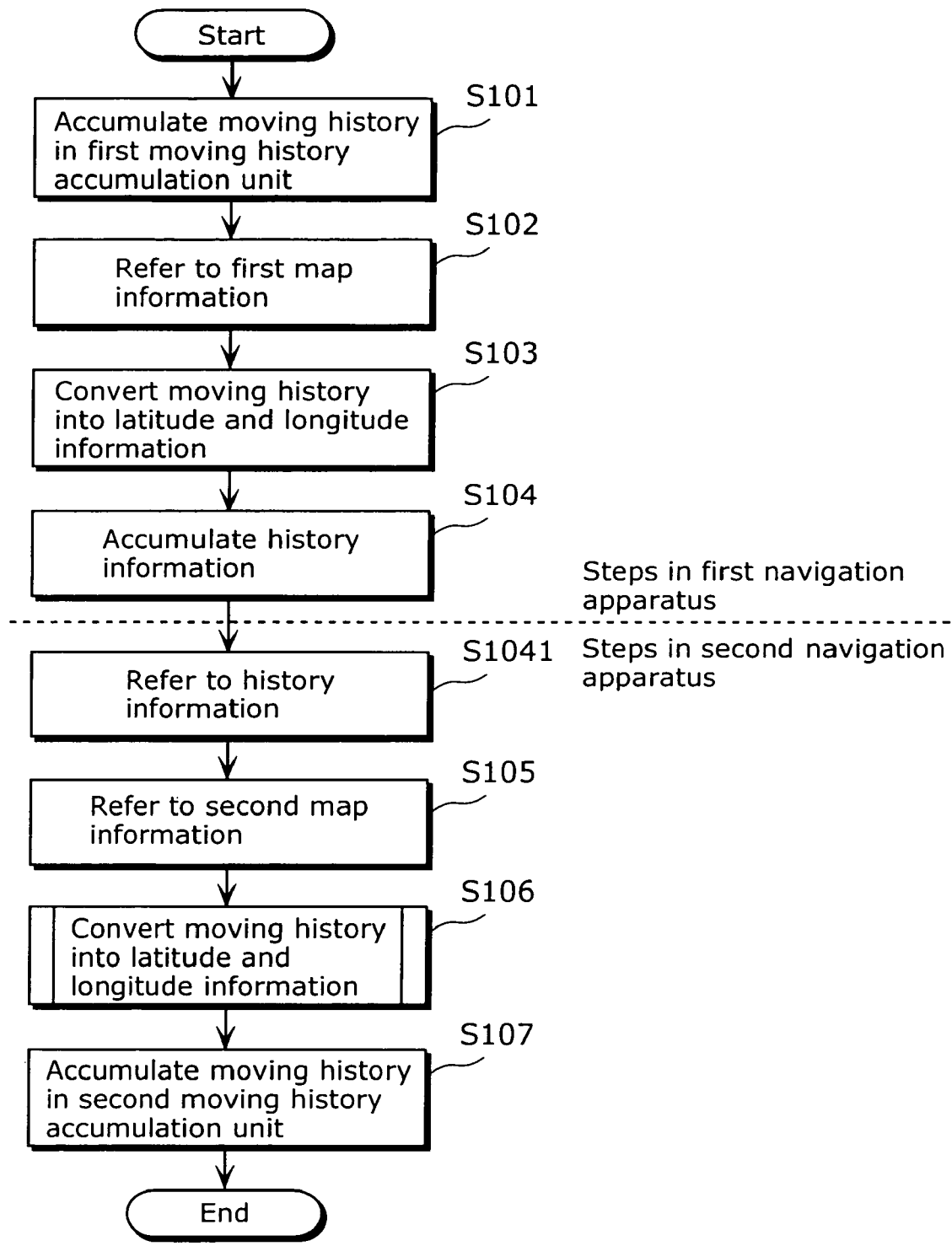
FIG. 16 is a flow chart showing the operation of the moving history conversion apparatus.
Figures 17, 18:
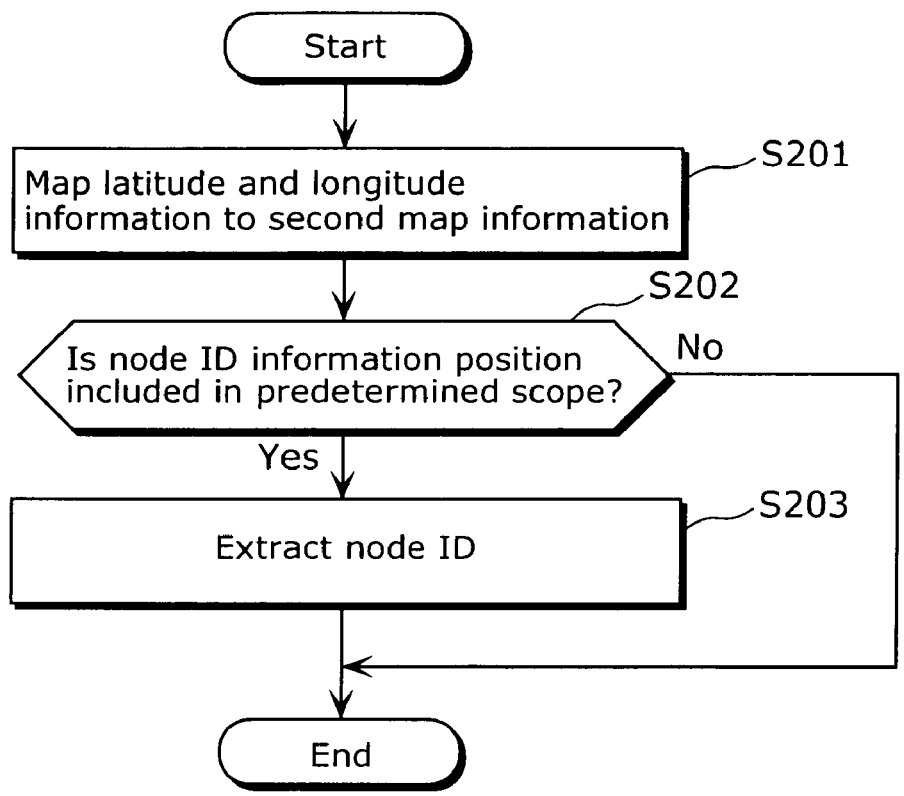
FIG. 17 is a flow chart showing the conversion procedure of moving history.
FIG. 18 is a diagram showing a conversion table.

Subsequently, the operation of the moving history conversion apparatus which is configured as mentioned above in this embodiment is described with reference to the flow charts (FIG. 16 and FIG. 17).

First, the first navigation apparatus 100 stores moving history in the first moving history accumulation unit 101 (Step S101 in FIG. 16). Moving history is accumulated as the series of node IDs based on the first map information. In FIG. 4, bold black lines show user's moving and asterisks are the node IDs. These series are accumulated as moving history. FIG. 8 is the moving history accumulated in the first moving history accumulation unit 101. For example, the moving history ID "001" leaves "N100" and reaches "N51" via "N11", "N12", etc. Such user's moving history is accumulated as the series of node IDs based on the first map information.

Next, the first moving history conversion unit 103 refers to the first map information (Step S102) and converts moving history accumulated as the series of nodes into latitude and longitude information (Step S103). The first map information latitude and longitude information includes a description of latitude and longitude information as detailed information of each node (FIG. 6), and the node information is converted using the latitude and longitude information. As a result, for example, the moving history ID "001" is converted into a row of latitude and longitude information in FIG. 12. The node ID "N14 (Midori 1 junction)" in the history is converted into "longitude 135 degrees 34 minutes 00 seconds east and latitude 34 degrees 36 minutes 00 seconds north"; the node ID "N15 (Maruyama junction)" is converted into "longitude 135 degrees 34 minutes 30 seconds east and latitude 34 degrees 36 minutes 15 seconds north". In this way, each node ID is converted into latitude and longitude information based on the first map information.

Then, the first moving history conversion unit 103 stores moving history converted into latitude and longitude information in the history information accumulation unit 104 (Step S104). FIG. 12 shows an example of latitude and longitude information accumulated in the history information accumulation unit 104. In this embodiment, the operation step of the first navigation apparatus 100 has been described.

Then, in order to make it possible to use moving history in the second navigation apparatus 200, the moving history accumulated in the history information accumulation unit 104 (Step S1041) and the second map information (Step S105), the second moving history conversion unit 105 converts the moving history (Step S106).

For example, the second moving history conversion unit 105 maps moving history accumulated as latitude and longitude information onto the second map information (Step S201) and extracts a node ID (Step S203) if the latitude and longitude information is included in the predetermined scope (Yes in Step S202). In contrast, if it is not included (No in Step S202), no extraction is performed.

In FIG. 14, a white circle is moving history accumulated as latitude and longitude information and is mapped on latitude and longitude information on the second map information. On the other hand, on the second map information, latitude and longitude information such as the node IDs "C24", "C25", etc. are indicated (the second map information in FIG. 10) and nodes are extracted based on this information. The asterisks indicate the extracted nodes. For example, user's moving history which moves from his/her home to the Maruyama golf course is converted into a series of asterisks in FIG. 11.

Subsequently, the second moving history conversion unit 105 stores the obtained series of node IDs as moving history in the second moving history accumulation unit 107 (Step S107). FIG. 13 shows moving history accumulated in the second moving history accumulation unit 107. For example, the moving history ID "001" indicates that a user left "C100" and reached "C61" via "C24", "C25", etc. In this way, user's moving history is converted into the series of node IDs based on the second map information and accumulated.

As mentioned above, moving history is very important information because it can be used for searching user's past driving routes or for understanding a user's activity tendency and forecasting a destination. On the other hand, since accumulation formats for moving history vary depending on apparatuses, the consistency of moving history is not maintained when moving history is passed down between apparatuses. For example, as shown in this embodiment, the moving history accumulated as the series of node IDs based on each map information cannot be recognized in other apparatuses. Consequently, as shown in this embodiment, the moving history can be available in other apparatuses by converting it, using map information, into latitude and longitude information which is generic data. Additionally, consistency can be obtained more flexibly by setting the predetermined scope of latitude and longitude information and performing the matching of nodes.

In addition, in this embodiment, it is assumed that the moving history information accumulation unit 104 is configured with a recording medium, or the like and moving history is passed down through this recording media. However, the passing down of moving history is not limited to this. For example, naturally, it is possible to perform the passing down of such moving history via a server (a method via communications apparatuses connected by communication paths). If it is performed via a server, after moving history accumulated in the first moving history accumulation unit 101 is converted into latitude and longitude information, the history is passed down via the history information accumulation unit 104 installed in the server.

Moreover, in the case of such passing down via a server, it is possible to pass down the history by referring to the conversion table corresponding to each apparatus (the first navigation apparatus 100 and the second navigation apparatus 200 in this embodiment) or downloading the history rather than converting it into latitude and longitude information.

FIG. 18 is a diagram showing the association table used for the conversion of moving history accumulated in the format unique to each navigation apparatus. For example, in the first navigation apparatus 100, as mentioned above, moving history is accumulated as the series of node IDs in the first map information accumulated in the first navigation apparatus 100, while in the second navigation apparatus 200, moving history is accumulated as the series of node IDs in the second map information accumulated in the second navigation apparatus 200. Therefore, the table indicates the node IDs associated with each other. Specifically, the node ID "N51" in the first navigation apparatus 100 is associated with the node ID "C61" in the second navigation apparatus 200. In the passing down of the moving history, it is possible to convert moving history by referring to this association table. By referring to the association table, moving history accumulated in the first moving history accumulation unit 101 shown in FIG. 8 can be converted into moving history in the second navigation apparatus 200 in FIG. 15.

In this embodiment, although only the series of node IDs are exemplified as moving history, the present invention is not limited to this moving history. It is possible to accumulate information attached to the moving history in the history information accumulation unit 104 and pass it down to the second navigation apparatus 200.

For example, by attaching information obtained during the moving to the moving history to be accumulated, these attached information can be passed down as history information. In recognition of a Vehicle Information and Communication System (VICS), for example, traffic congestion at a junction ahead and construction information is to be obtained as a vehicle travels. However, obtained information includes not only useful information but also information which is not usually used. For example, a user does not check obtained information on an expressway that the person usually drives because the information of a service area ahead does not change every time the person drives. On the other hand, if traffic congestion on a user's usual route varies depending on time and day of week, the user may check detailed information every time he drives.

In this way, necessary information and unnecessary information (which is easily memorized by a user and does not change every time) on the user's usual route vary depending on the type of information and the place where the information is obtained. Consequently, on a condition that it is possible to check whether the user has obtained more detailed information or not in addition to the information obtained by VICS, or the like as well as to set whether the obtained information is displayed or not in a Car Navi where the first moving history is accumulated, it is convenient for the user to perform the same settings also in another Car Navi where the second moving history is accumulated. Therefore, such a method is described that not only the user's moving history is accumulated in the first Car Navi but also the setting history is passed down for obtaining information. Such method is described below using an example of the VICS information and with reference to the figures.

Here, the VICS information is traffic information such as traffic congestion and highway regulations transmitted from the VICS center, making it possible to display traffic information as characters and images. Although display methods vary depending on each Car Navi and its setting status, information to be transmitted has a common format. Therefore, the information obtained from the VICS information may be accumulated as history, accumulated in the moving history accumulation unit 104 and passed down.

Figure 19:
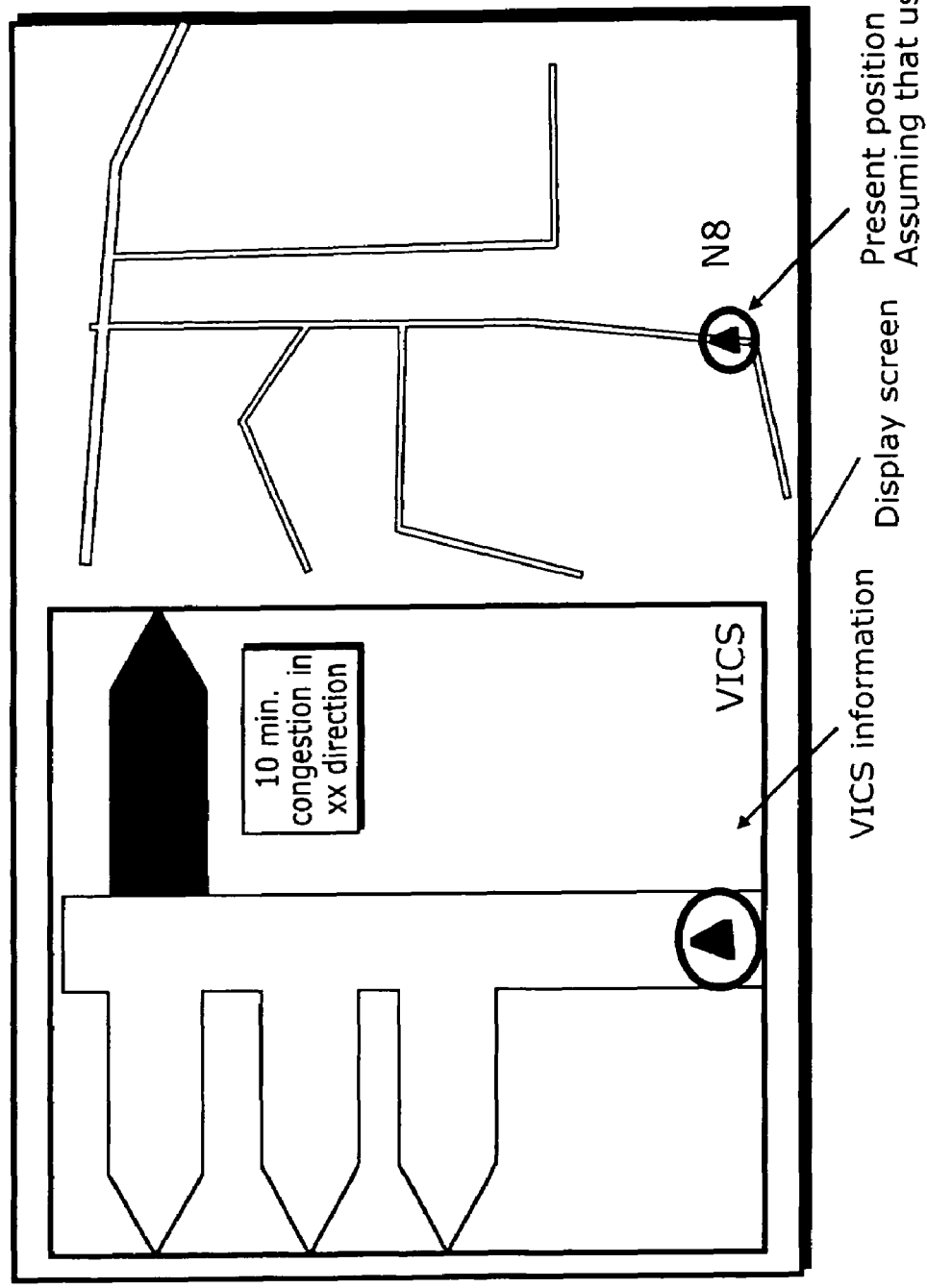
FIG. 19 is a diagram showing VICS information.
Figure 20:
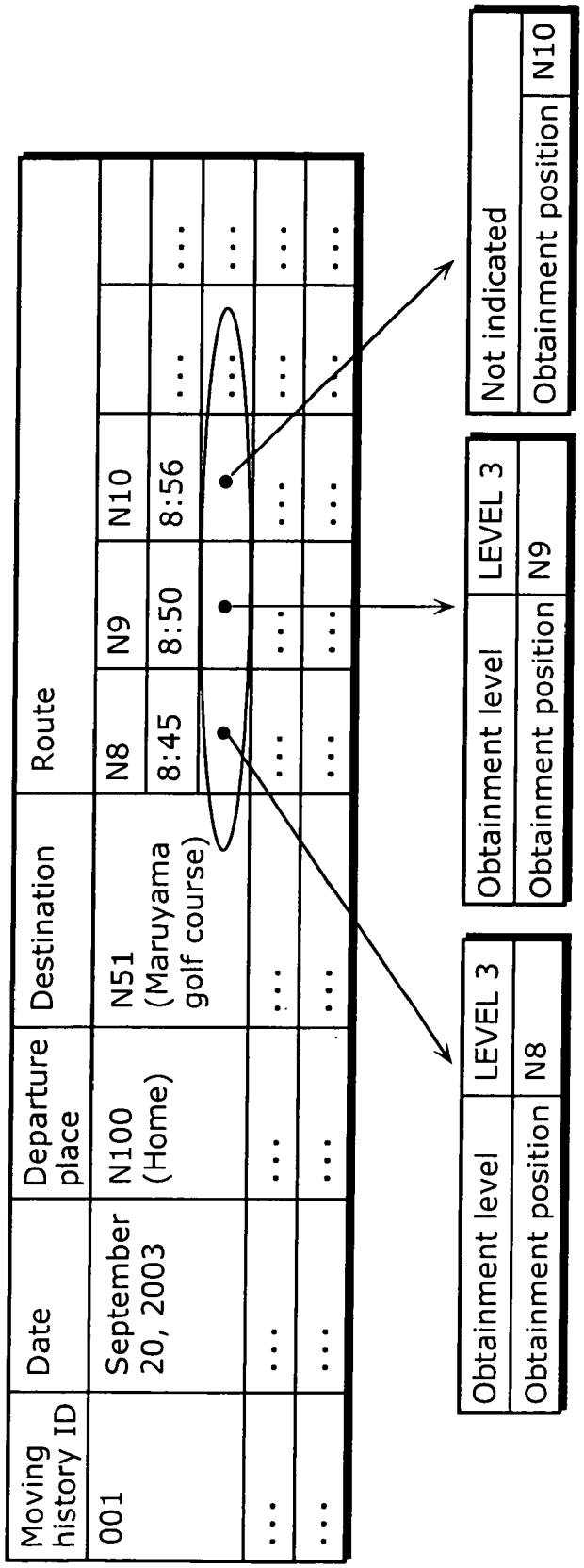
FIG. 20 is a diagram showing the accumulation of VICS information.

FIG. 19 shows an example of the VICS information obtained and displayed at the point of the node ID "N8". The obtained VICS information is displayed as an image (LEVEL 3) on the left of a display screen. On the other hand, this obtained information is accumulated as moving history. FIG. 20 is a diagram showing the obtainment status of the VICS information accumulated in the first moving history accumulation unit 101. The obtainment status of the VICS information has been accumulated together with the node ID "N8" of the moving history ID "001". Information that LEVEL 3 (an image) was obtained in this area has been accumulated. In the node ID "N10", information that the VICS information was not obtained or was not displayed due to the settings although it was obtained (not shown) has been accumulated. The VICS information is different in display or the like depending on each Car Navi but common in the format of the information to be provided. For example, the VICS information is configured with integrated formats: LEVEL 1 includes only character information; LEVEL 2 includes simple graphic information; LEVEL 3 includes detailed map information. For example, the color in the display of the VICS information varies depending on each navigation apparatus which obtained the VICS information. Therefore, it becomes possible to pass down the obtainment status to other apparatus by converting such information into information which can be passed down through the first moving history conversion unit 103 using the history information accumulation unit 104.

Especially, users' needs are high on customizing Car Navis in accordance with areas. For example, passing down a tendency unique to a user without troublesome operation produces special effects in security and operability. Such a user's tendency includes areas of which information to be provided is obtained, areas of which information is not obtained, the settings of a previously used Car Navi, for example. Since the VICS information is provided in accordance with area, a user's activity tendency can be reflected through the passing down of such information. An area where much VICS information is obtained can be inferred as a user's activity area. On the contrary, an area where little VICS information is obtained is judged as an area which is not familiar with a user. Accordingly, information such as a recommendation of a general road which is suitable to each user can be provided.

Furthermore, information attached when a route is set, for example, information indicating that a user took a wrong route, can be accumulated and passed down to another apparatus. In a general Car Navi, if a user preset a route to a destination and drives the route for the first time, audio and display guidance by the Car Navi may not be enough for the user to drive the route proposed by a Car Navi. Assuming that there is a route with junctions in series and a Car Navi provides guidance of, "Turn left 100 meters ahead." Even in that case, when there are junctions in series 100 and 200 meters ahead where the user can turn left at the respective junctions, the user may have a difficulty in distinguishing between junctions 100 and 200 meters ahead even if the Car Navi provides very timely audio guidance. However, if it is found that the user has turned left mistakenly at one of the junctions with reference to the past moving history, it is possible to provide the user with guidance using the moving history, such as "Turn left 100 meters ahead. Be careful because you accidentally turned left at a junction 200 meters ahead last time when you went to XX." In this way, it becomes possible to provide user-friendly guidance by causing the Car Navi to explain the user's driving experience and the situation.

Therefore, in the case where the history of taking a wrong route has been accumulated in the first Car Navi, it becomes possible to realize Car Navi guidance based on user's driving history also in the second Car Navi by passing down the history to the second Car Navi. This variation describes the operation of an apparatus which passes down the history of taking the wrong route in the past route guidance.

FIG. 21 is a diagram showing moving history accumulated in the first moving history accumulation unit 101. The moving history of a user who left the node ID "N100 (home)" and moved to the node ID "N103 (Osaka land)" has been accumulated. Additionally, a route is set up and the attached information of whether the user passed through the route has been accumulated in this moving history. Assuming that the accumulated information indicates that the user passed through the node IDs "N31" and "N32" (shown as circles) on the route, but he/she did not pass through the node IDs "N34", "N35" (shown as x-mark) and "N36" on the route because he/she took a wrong road. Such information may be passed down at the same time when passing down the moving history to the second navigation apparatus 200.

Since the first moving history conversion unit 103 in this embodiment converts the series of node IDs into latitude and longitude information which is generic information, it becomes impossible to judge whether the user passed each of the nodes intentionally or accidentally. Therefore, such information is desired to be passed down. This passing-down makes it possible to provide detailed information indicating that the user tends to take a wrong route between the node IDs "N32" and "N33".

In this embodiment, as information to be passed down to the history information accumulation unit 104, moving history and the routes have been described, but such information is not limited to moving history and the routes. For example, it is possible to judge and pass down necessary parts from landmark information registered by the user based on the moving history. When using a Car Navi, a user often registers his/her home, work place, destinations to be set up frequently, for example as points in the Car Navi. Additionally, at the same time, the user may register icons for these points in order to display them on the map. As for information on each registered point, not only the name of the point and the absolute position (longitude and latitude) need to be passed down from the first Car Navi to the second Car Navi, but also the information of the icons to be displayed on the map needs to be passed down. However, display information on the icons registered for the first Car Navi and display information on the icons registered for the second Car Navi are generally different. Therefore, even if the information on an absolute position is passed down, when the display information in the first Car Navi and that in the second Car Navi are different, it is difficult to judge whether the point has been registered by the user. A Car Navi is especially desired to facilitate an easy understanding of driving information, and therefore the display information of familiar landmarks, for example is desired to be the same. Therefore, passing down the display information of the registered points displayed by the first Car Navi to the second Car Navi makes it possible to display familiar points on a map.

FIG. 22 shows the registered points set by the first navigation apparatus 100. The registered points are: user's home as a registered point "001", user's work place as a registered point "002" and the Maruyama golf course as a registered point "003". However, the registration format is unique to the apparatus. For example, the node ID "N51 (Maruyama golf course)" has been registered based on the first map information. Therefore, it is impossible to pass down this information as it is to the second navigation apparatus 200. Therefore, under control of the first moving history conversion unit 103, the node ID "N51" is converted into latitude and longitude information of "longitude 135 degrees 00 minutes and latitude 34 degrees 00 minutes", which is accumulated in the history information accumulation unit 104 and then passed down to the second navigation apparatus 200.

Figure 23:
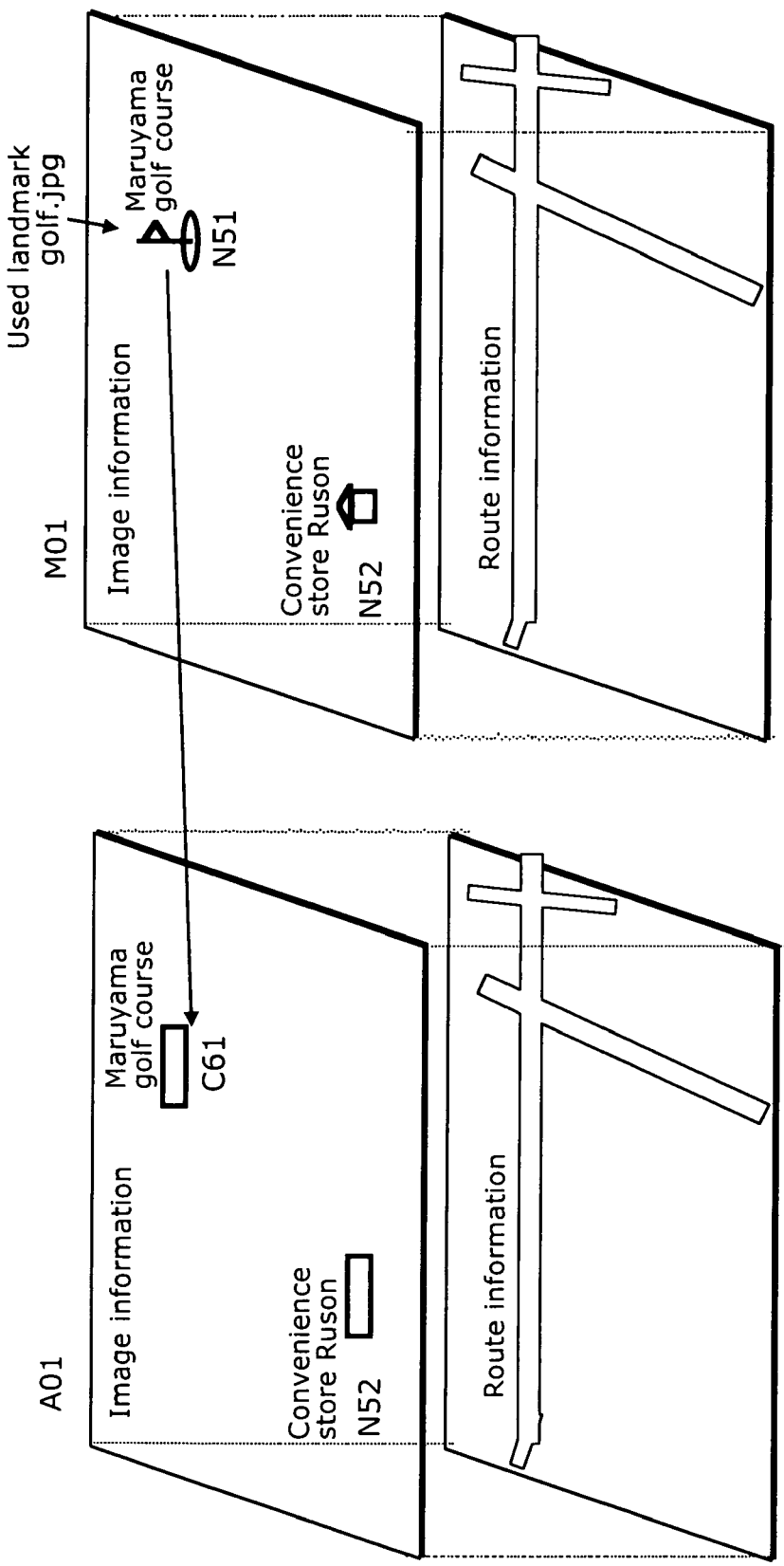
FIG. 23 is a diagram showing the conversion of the registered points.

FIG. 23 is a diagram showing an example of image information among the map information of the mesh ID "M01" in the first navigation apparatus 100 and "A01" in the second navigation apparatus 200. It shows that the landmark information "GOLF.JPG (image information)" of the Maruyama golf course, often used by the user, accumulated in the first navigation apparatus 100 has been passed down to the second navigation apparatus 200. For example, because the landmark information in this embodiment keeps its existing position as latitude and longitude information, it is possible to pass down the landmark information using latitude and longitude information.

Moreover, when the history is passed down, generic information such as registered date, the number of accesses, for example can be passed down. For example, in FIG. 22, the number of accesses of "home", the registered point ID "001", is "51". Therefore, it is possible to set a threshold value (for example, 10 times) and pass down the information indicating that the landmark is familiar if the number of accesses is the same as the threshold value or more. Eliminating points registered by mistake and points which seem to be unnecessary because of low arrival frequency from among the multiple registered points makes it possible to pass down only necessary registered points to a user in accordance with the moving history. In addition, image colors, character fonts, layout, or the like may be controlled considering map information passed down, that is, the second map information.

Figure 24:
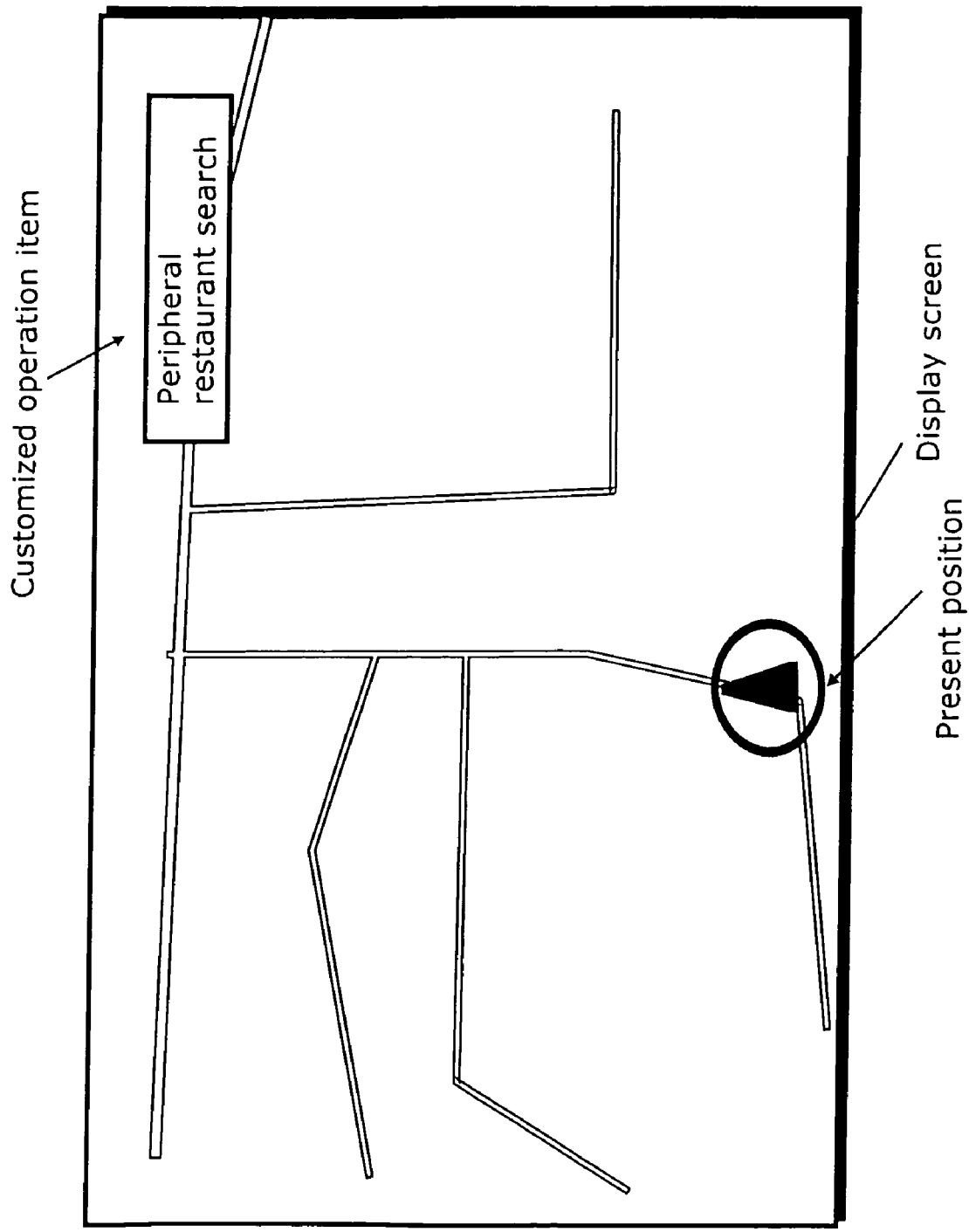
FIG. 24 is a diagram showing setting items passed down from another apparatus.

Additionally, as for preset information, not only registered points but also operational items including "Circumference search" and "Restaurant information search", which are often performed by a user, may be passed down and the display positions of the operational menu items may be also passed down. For example, as shown in FIG. 24, as for the operational item, "Nearby restaurant search", performed at "Kobe Station" to which the user often drives, the user history of displaying the item on the driver's seat side (on the top right corner of the screen if the driver's seat is on the right) may be passed down to the second navigation apparatus 200. For example, if the second navigation apparatus 200 has two screens, items often used by the user in the first navigation apparatus 100 can be automatically customized to be preferentially displayed on the driver's seat side.

Information set by a user such as registered points, for example which have been used in the first navigation apparatus 100 is often needed to be also used in the second navigation apparatus 200. As shown in this embodiment, customization based on the moving history can be done according to the user's needs at the same time when moving history is passed down.

Figure 25:
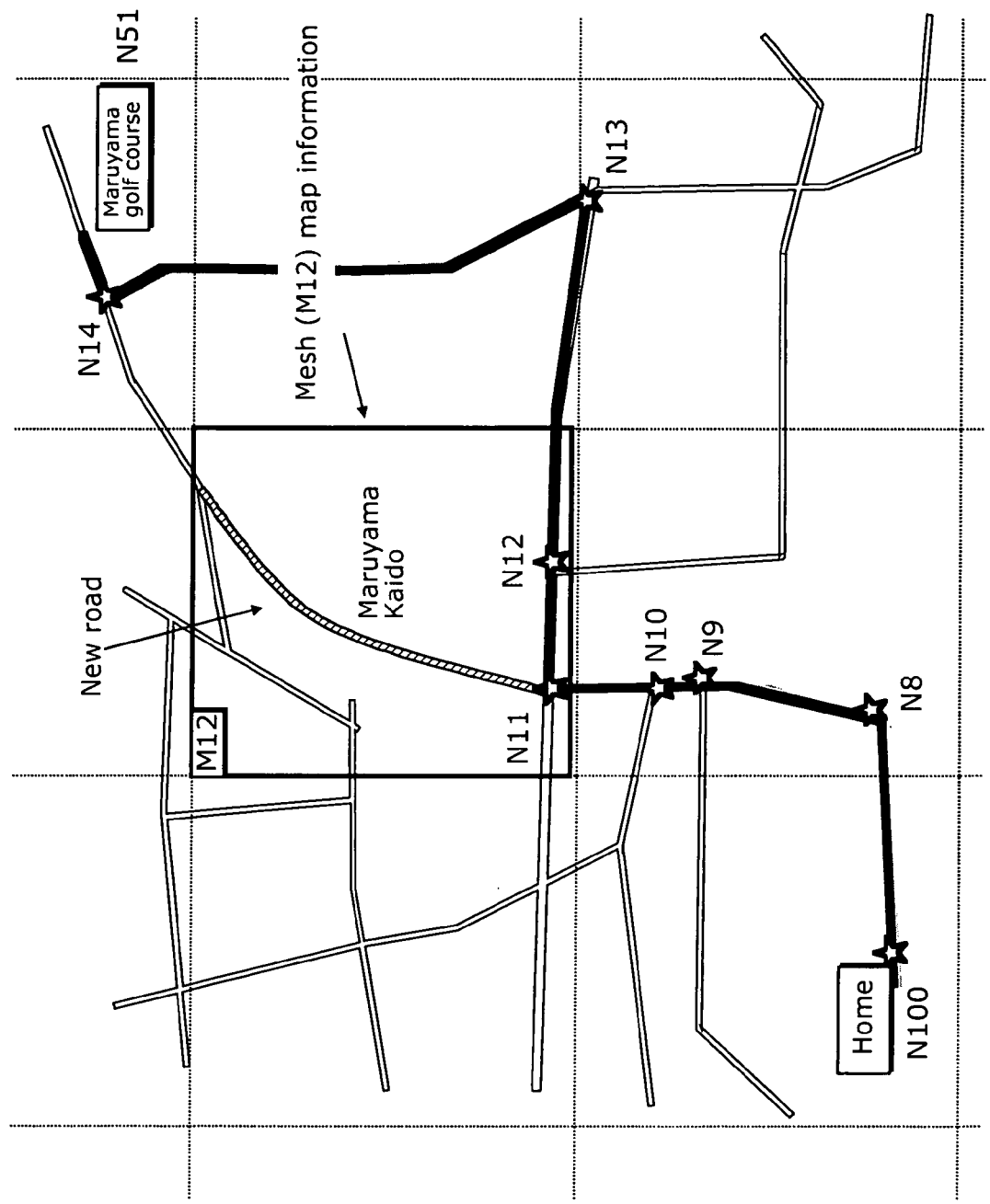
FIG. 25 is a diagram showing renewal map information passed down from another apparatus.

In addition, in the first navigation apparatus 100, partially updated map information as well as moving history may be passed down to the second navigation apparatus 200. As shown in FIG. 25, the mesh ID "M12" is now assumed to be partially updated map information by the server, or the like. Compared to FIG. 3, the new road "Maruyama kaido" is newly established. In this way, areas where moving history is present is considered as areas often used by a user, and the map may have been updated on this part alone. However, this updated information is not always reflected in the newly purchased second navigation apparatus 200, but the latest map information can be used in the second navigation apparatus 200 by passing down this updated map information and moving history together via the history information accumulation apparatus 104.

Moreover, in this embodiment, moving history is passed down between the first navigation apparatus 100 and the second navigation apparatus 200 and its usage includes various modes.

For example, in the case that several users share a navigation apparatus, and only when each user uses the apparatus, his/her individual history information may be used via the history information accumulation unit 104.

Figure 26:
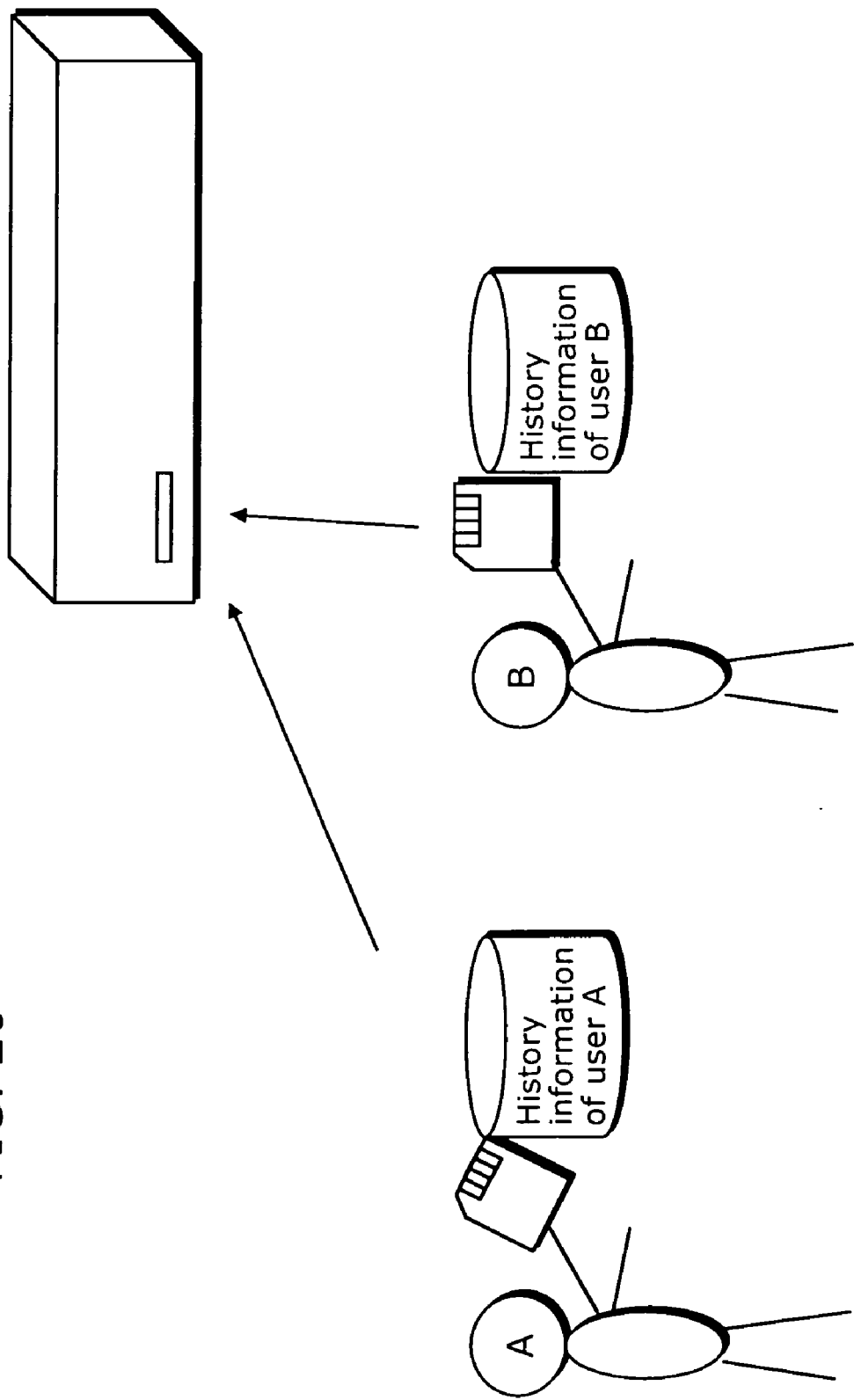
FIG. 26 is a hardware configuration diagram showing an application example of the present invention.

FIG. 26 shows this apparatus mounted on a commercial vehicle and the usage of passing down moving history every time the apparatus is used by User A and User B who have accumulated moving history in the history information accumulation unit 104.

Figure 27:
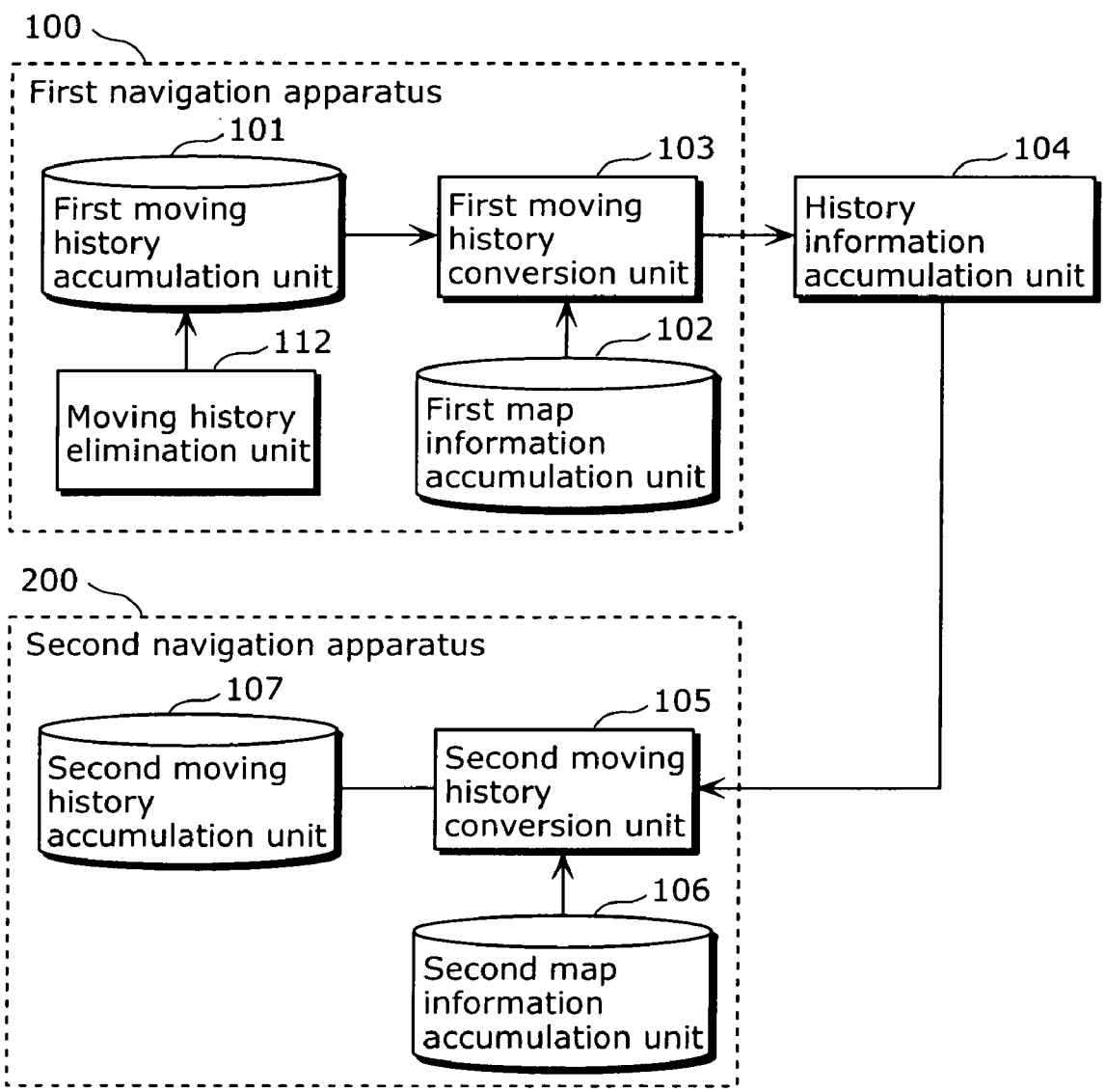
FIG. 27 is a functional block diagram of the moving history conversion apparatus in a variation.

In this case, it is desirable that individual history information accumulated in the history information accumulation unit 104 is stored only in the history information accumulation unit 104 such as a memory storage, for example; that is, it is desirable that the individual history information is closed information. If User A passes down his moving history to this apparatus and User B uses the apparatus, User A's personal information could be easily obtained by User B. Therefore, in order to keep the history closed by holding it only in a recording medium or the like without leaving it in this apparatus even if the history is passed down by using the history information accumulation unit 104, the moving history elimination unit 112 which deletes history may be prepared as shown in the configuration diagram of FIG. 27. FIG. 27 shows the configuration where the moving history elimination unit 112 having such functions is added to the configuration of the moving history conversion apparatus in the first embodiment shown in FIG. 2. In other words, the first navigation apparatus 100a has the configuration where the moving history elimination unit 112 is added to the first navigation apparatus 100 in the first embodiment.

Moreover, plural users' moving history may be accumulated in this apparatus and be passed down.

Figure 28:
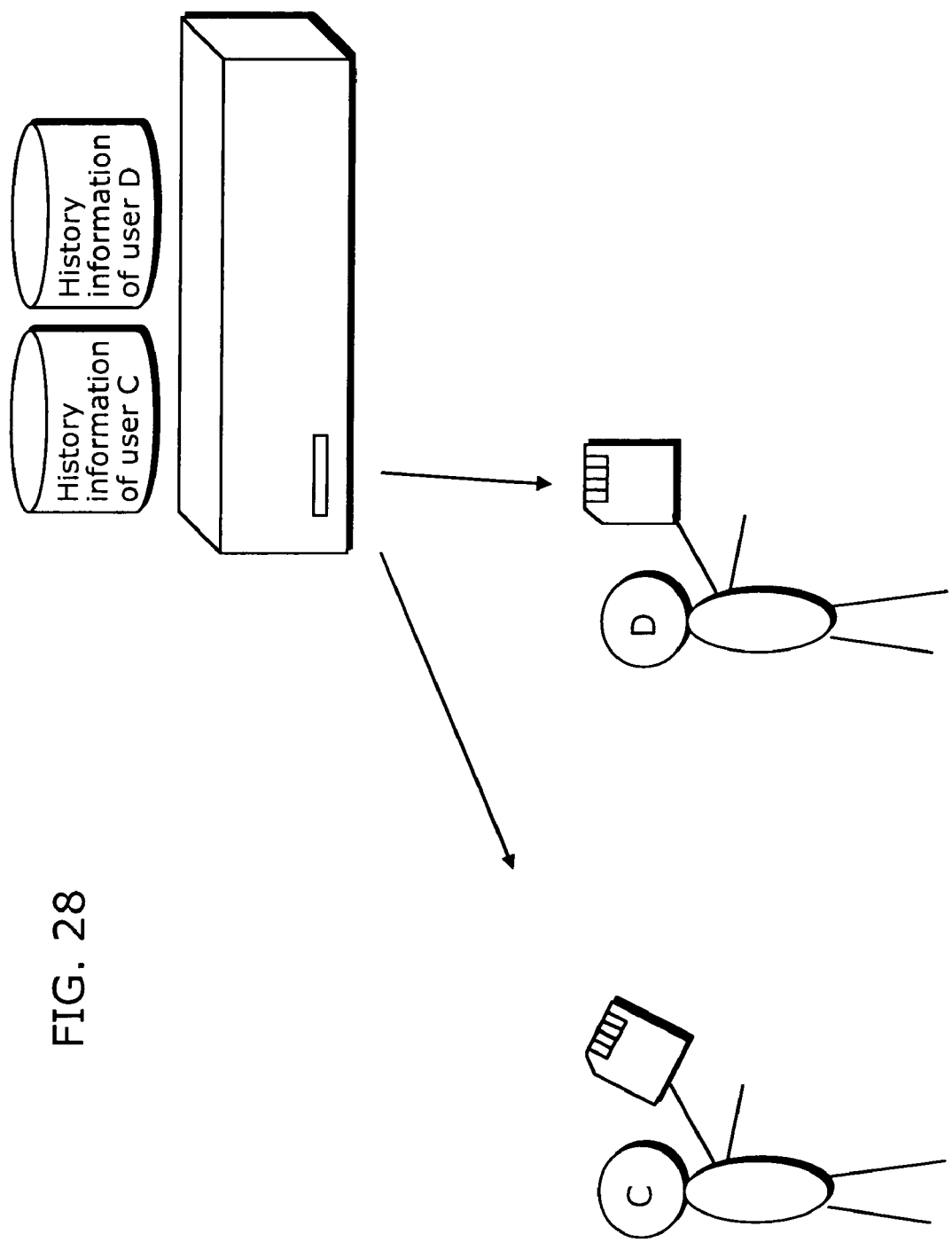
FIG. 28 is a hardware configuration diagram showing an application example of the present invention.

For example, in FIG. 28, it is assumed that User C and User D who are family members share this apparatus (the first navigation apparatus 100) and individual moving history is accumulated in this apparatus. If User C wants to pass down the history to another apparatus (the second navigation apparatus 200), it is desirable to accumulate User C's moving history alone in the history information accumulation unit 104 such as a memory storage, for example.

Figure 29:
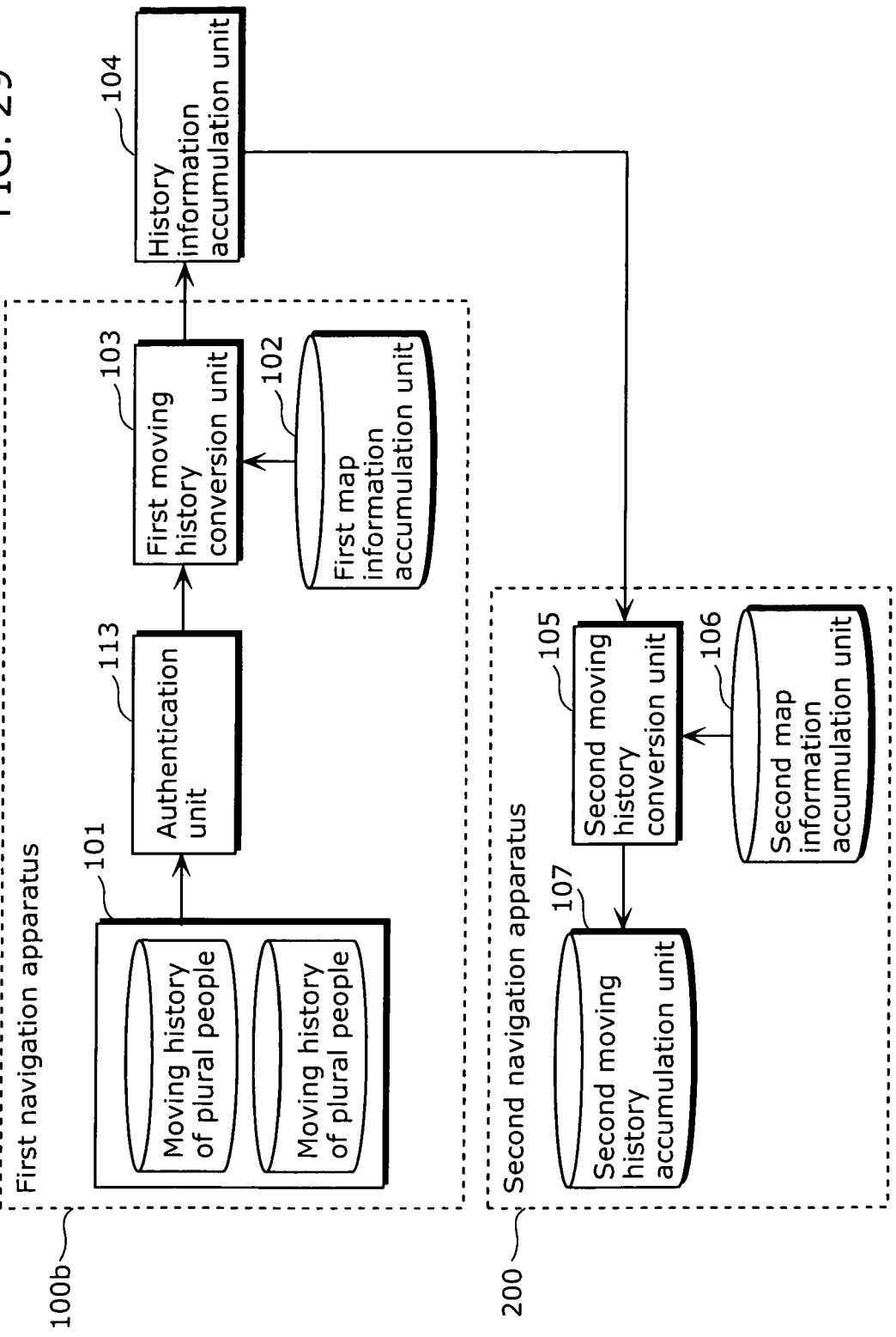
FIG. 29 is a block diagram showing the functions of the moving history conversion apparatus in a variation example.

Accordingly, as shown in the configuration diagram of FIG. 29, an authentication unit 113 which authenticates a person may be prepared and only authorized history information may be passed down. FIG. 29 shows the configuration where the authentication unit 113 having such functions is added to the configuration of the moving history conversion unit in the first embodiment shown in FIG. 2. In other words, the first navigation apparatus 100b has the configuration where the authentication unit 113 is added to the first navigation apparatus 100 in the first embodiment.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

Second Embodiment

Next, a second embodiment of the present invention is described.

The first embodiment has described a method where moving history to be accumulated as different symbols between apparatuses is converted to become available via latitude and longitude information. For example, white circles in FIG. 13 represent moving history in the first navigation apparatus 100, which are plotted on the latitude and longitude positions of the node IDs "N14 (Midori 1 junction)" and "N15 (Maruyama junction)" (asterisks) in the first map information. On the other hand, by performing matching in consideration of the node IDs "C24", "C25" and a predetermined scope (for example, radius 50 m) in the second map information, the node IDs "C24" and "C25" can be extracted and used as moving history also in the second navigation apparatus 200.

By the way, in the first map information and the second map information, the nodes do not always correspond one to one and inconsistency may occur when the history is passed down. The following is described using the figures.

Figure 30:
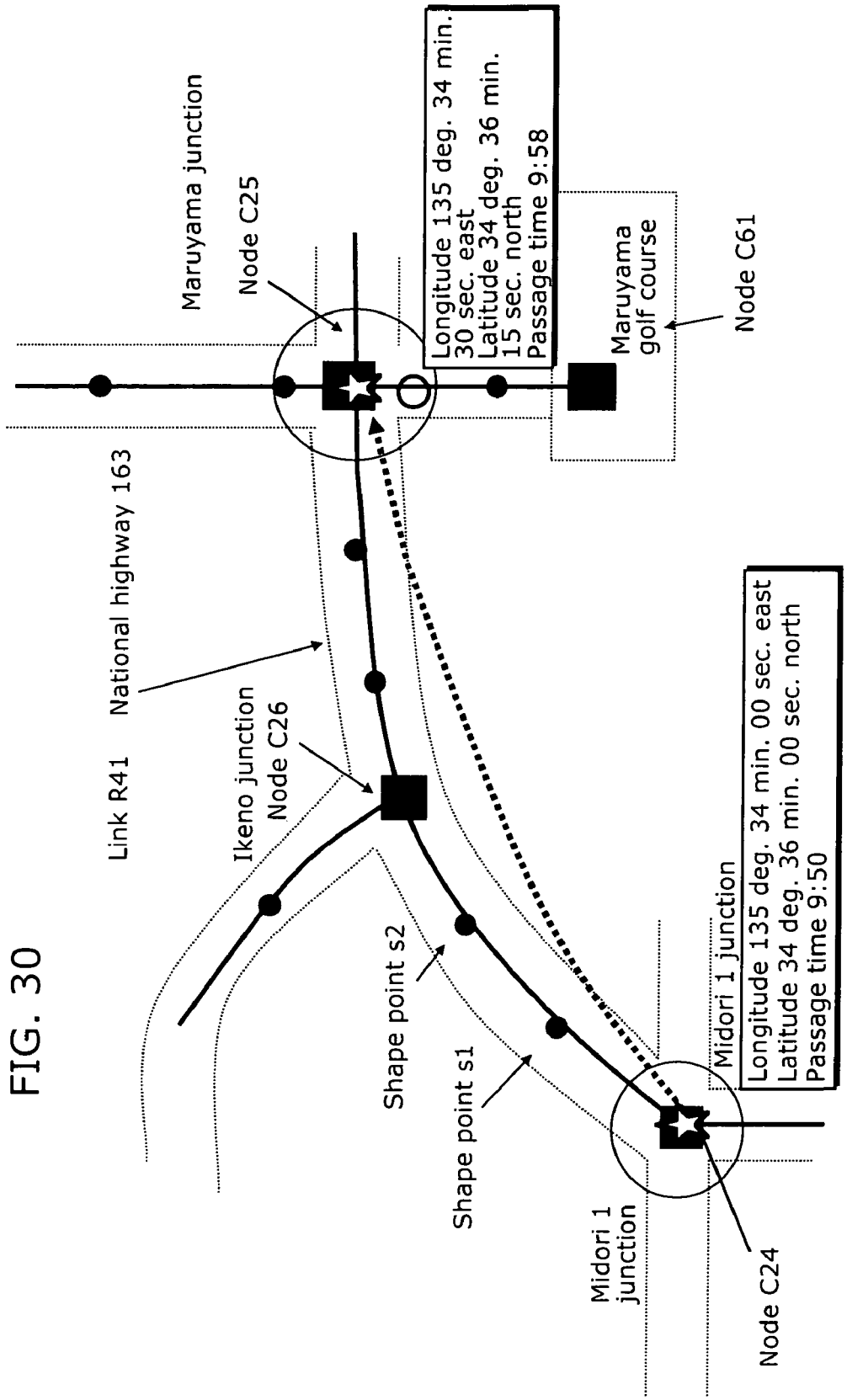
FIG. 30 is a diagram showing the second map information.

FIG. 30, like FIG. 13, is a diagram showing the area "A01" in the second map information. The node ID "C26 (Ikeno junction)" which is not present in the first map information, is present here. For example, because a new node is added to one of the map information and the second map information when a new route is generated and the node system is different depending on the degree of details of a route, either map information does not have nodes and the nodes do not always correspond one to one, which leads to the occurrence of inconsistency. For example, in the second map information in FIG. 30, since there is the node ID "C26 (Ikeno junction)" which is not present in the first map information, inconsistency indicating that the user has not passed through the node ID "C26 (Ikeno junction)" occurs despite that the user has passed through the node IDs "C24 (Midori 1 junction)" and "C25 (Maruyama junction)".

Figure 31:
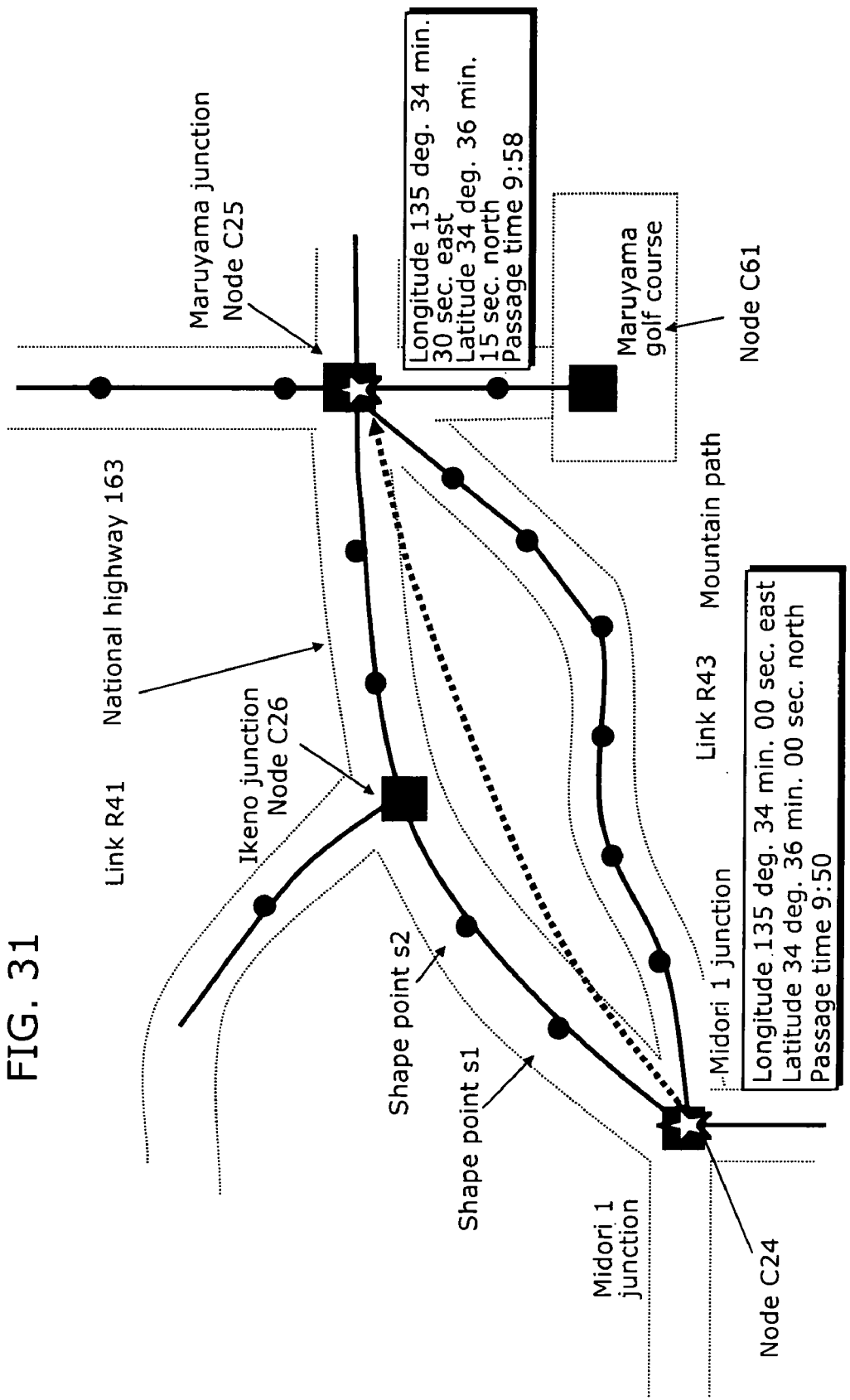
FIG. 31 is a diagram showing the second map information.

Also, as shown in FIG. 31, if some of the nodes are not always connected by one link, it is impossible to judge which route the user passed through. For example, in the case of FIG. 31, although there are the link ID "R41 (National highway 163)" and the link ID "R43 (Mountain path)" for reaching "Maruyama junction" through "Midori 1 junction", it is impossible to judge which route the user passed through.

Therefore, in order to solve the above-mentioned problem, the embodiment enables various apparatuses to use moving history accumulated as a series of node IDs unique to the apparatuses by converting the moving history into latitude and longitude information using link information in map information.

Figure 32:
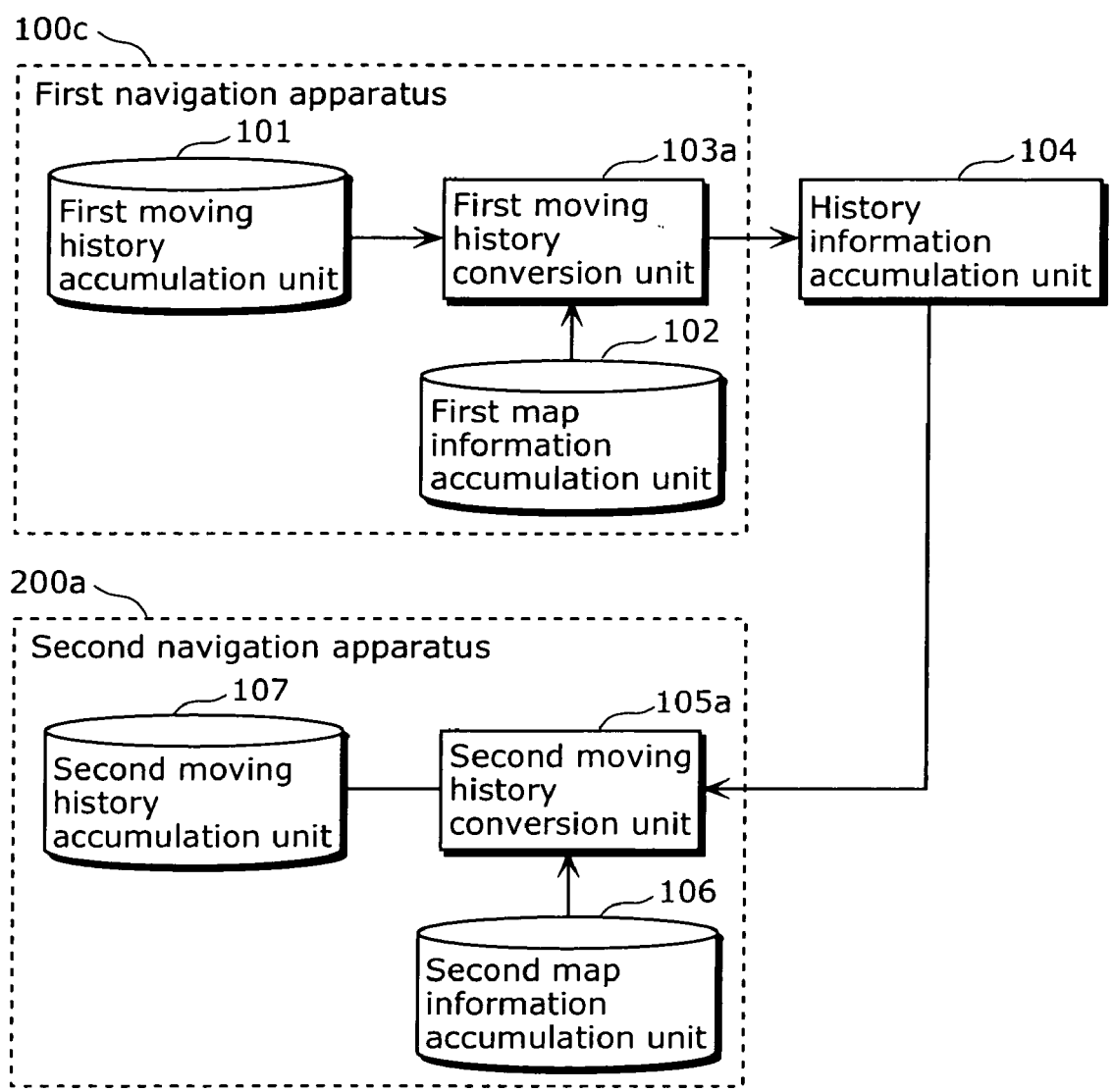
FIG. 32 is a block diagram showing the functions of the moving history conversion apparatus in a second embodiment of the present invention.

FIG. 32 is a functional block diagram showing the configuration of the moving history conversion unit in the second embodiment of the present invention. This moving history conversion apparatus is configured with a first navigation apparatus 100c, a history information accumulation unit 104 and a second navigation apparatus 200a, and converts the moving history accumulated in the first navigation apparatus 100c to become available in the second navigation apparatus 200a by using link information. The first navigation apparatus 100 has a first moving history accumulation unit 101, a first moving history conversion unit 103a and a first map information accumulation unit 102, while the second navigation apparatus 200a has a second moving history conversion unit 105a, a second map information accumulation unit 106 and a second moving history accumulation unit 107.

Basically, this moving history conversion apparatus has the same functions as those of the moving history conversion apparatus in the first embodiment. However, in this embodiment, the first moving history conversion unit 103a and the second moving history conversion unit 105a convert moving history using a conversion method different from those used by the first moving history conversion unit 103 and the second moving history conversion unit 105 in the first embodiment. In the following description, the same constituent elements as those in the first embodiment are provided with the same reference numerals and the explanation is omitted. The different point; that is, the details of the moving history conversion method is described using an example of the moving history ID "001" shown in the above-mentioned FIG. 8.

FIG. 8 shows moving history accumulated in the moving history accumulation unit 101. This moving history ID "001" shows that the user left home and passed through the node ID "N11 (Midori 1 junction)", "N12 (Midori 4 junction)", "N13 (Midori 2 junction)" and "N14 (Midori 1 junction)" in order, and reached the destination "N51 (Maruyama golf course)". This moving history is accumulated as the series of node IDs in the first map information. Additionally, the passage time and the moving date are accumulated by using time and the like obtained by a GPS. For example, the moving history ID "001" is accumulated on the date "Sep. 20, 2004" and the time when the user passed through the node ID "N11" is "8:50".

The first moving history conversion unit 103a converts moving history accumulated in a format unique to the first navigation apparatus 100 (the series of node IDs of the first map information in this embodiment) into latitude and longitude information. In addition, in this embodiment, conversion is performed using the link information.

Figure 33:
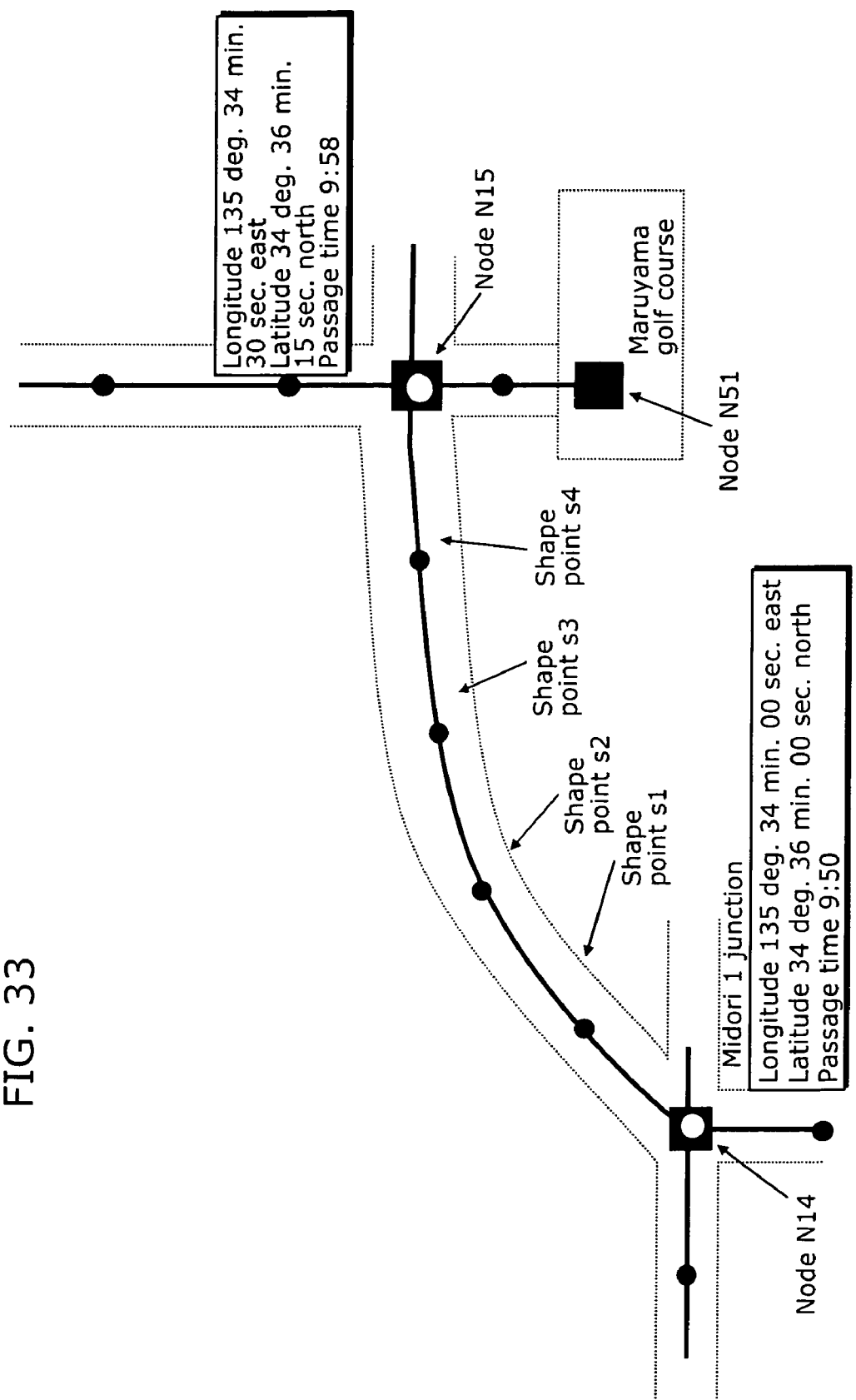
FIG. 33 is a diagram showing a conversion of moving history.

FIG. 33 is a diagram showing the enlarged view of the vicinity of the mesh ID "M01" in the first map information.

The mesh ID has the node ID "N14 (Midori 1 junction)" and "N15 (Maruyama junction)". In addition, each node includes latitude and longitude information indicating the position. In the first map information in FIG. 4, the position of the node ID "N14 (Midori 1 junction)" is "longitude 135 degrees 34 minutes 00 seconds east and latitude 34 degrees 36 minutes 00 seconds north". The position of the node ID "N15 (Maruyama junction)" is "longitude 135 degrees 34 minutes 30 seconds east and latitude 34 degrees 36 minutes 15 seconds north".

On one hand, the node IDs "N14" and "N15" are accumulated as moving history in the moving history ID "001". In other words, the user turned right at "Midori 1 junction" and reached "Maruyama junction". Accordingly, in this embodiment, the first moving history conversion unit 103*a* converts the series of the passed through node IDs into the rows of latitude and longitude information using the latitude and longitude information of these nodes. As a result, for example, the node ID "N14 (Midori 1 junction)" is converted into "longitude 135 degrees 34 minutes 00 seconds east and latitude 34 degrees 36 minutes 00 seconds north" and the node ID "N15 (Maruyama junction)" is converted into "longitude 135 degrees 34 minutes 30 seconds east and latitude 34 degrees 36 minutes 15 seconds north". In this way, the series of node IDs are converted into the latitude and longitude information of the node IDs in the first map information (white circles in FIG. 33).

Moreover, in this embodiment, the first moving history conversion unit 103*a* interpolates latitude and longitude information at the predetermined intervals to indicate not only the simple node conversion, but also how the user passed through the routes between nodes. For example, the shape points of the link in the first map information are used for interpolation. As mentioned above, the shape points of the link indicate the shape of the link connecting the nodes. The more the link length is long and the link shape is complicated, the greater the number of the link shape points which reflect the detailed link shape. Furthermore, since the shape points have coordinates, the latitude and longitude information of the link shape points can be uniquely calculated from the latitude and longitude information of the nodes; that is the both-end nodes. Additionally, in this embodiment, it is possible to estimate the shape points per se as passage points because the link is generated in such a manner that it connects these nodes on the center line of a road. Therefore, in this embodiment, not only the both-end nodes but also the latitude and longitude information of the link shape points are calculated as moving history.

For example, the link connecting the node IDs "N14" and "N15" corresponds to the link ID "L31" which has 4 shape points "s1", "s2", "s3" and "s4" (according to the first map information of FIG. 6). Black circles in FIG. 33 correspond to the link shape points. As each shape point has coordinates, the latitude and longitude information of the shape points can be intensively calculated from the latitude and longitude information of the both-end nodes. If the coordinates of the shape points are accumulated as latitude and longitude information, the information may be used as it is.

Figure 34:
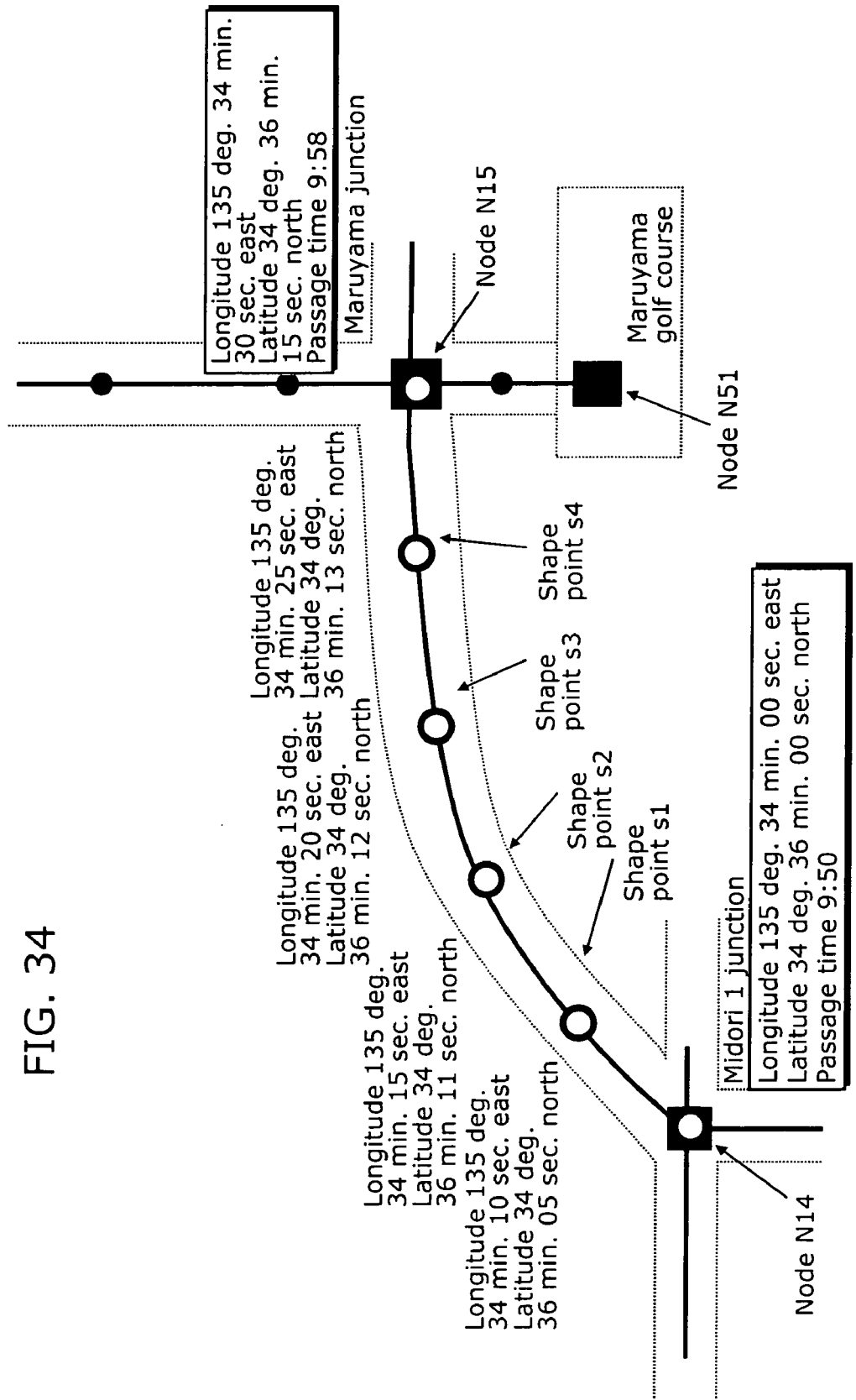
FIG. 34 is a diagram showing the conversion of the moving history.

FIG. 34 is a diagram showing the latitude and longitude information of the shape points. The latitude and longitude information of each shape point is calculated. For example, the latitude and longitude information of the shape point "s1" is calculated as "longitude 135 degrees 34 minutes 10 seconds east and latitude 34 degrees 36 minutes 05 seconds north". The first moving history conversion unit 103*a* interpolates the latitude and longitude information of these shape points as moving history. Like the nodes converted into latitude and longitude information in FIG. 33, these shape points are indicated as white circles.

In addition, in this embodiment, the passage time of each shape point is estimated and interpolated based on the passage time of nodes at both ends of the link. In other words, the first moving history conversion unit 103*a* interpolates time information by estimating the passage time at latitude and longitude which is different from the latitude and longitude indicated by the series of latitude and longitude information records based on the time information and the series of latitude and longitude information records converted from the ID series included in the first moving history accumulation unit 101. The second moving history conversion unit 105*a* replaces the series of latitude and longitude information records with the series of IDs along with the second map information based on the interpolated time information.

Figure 35:
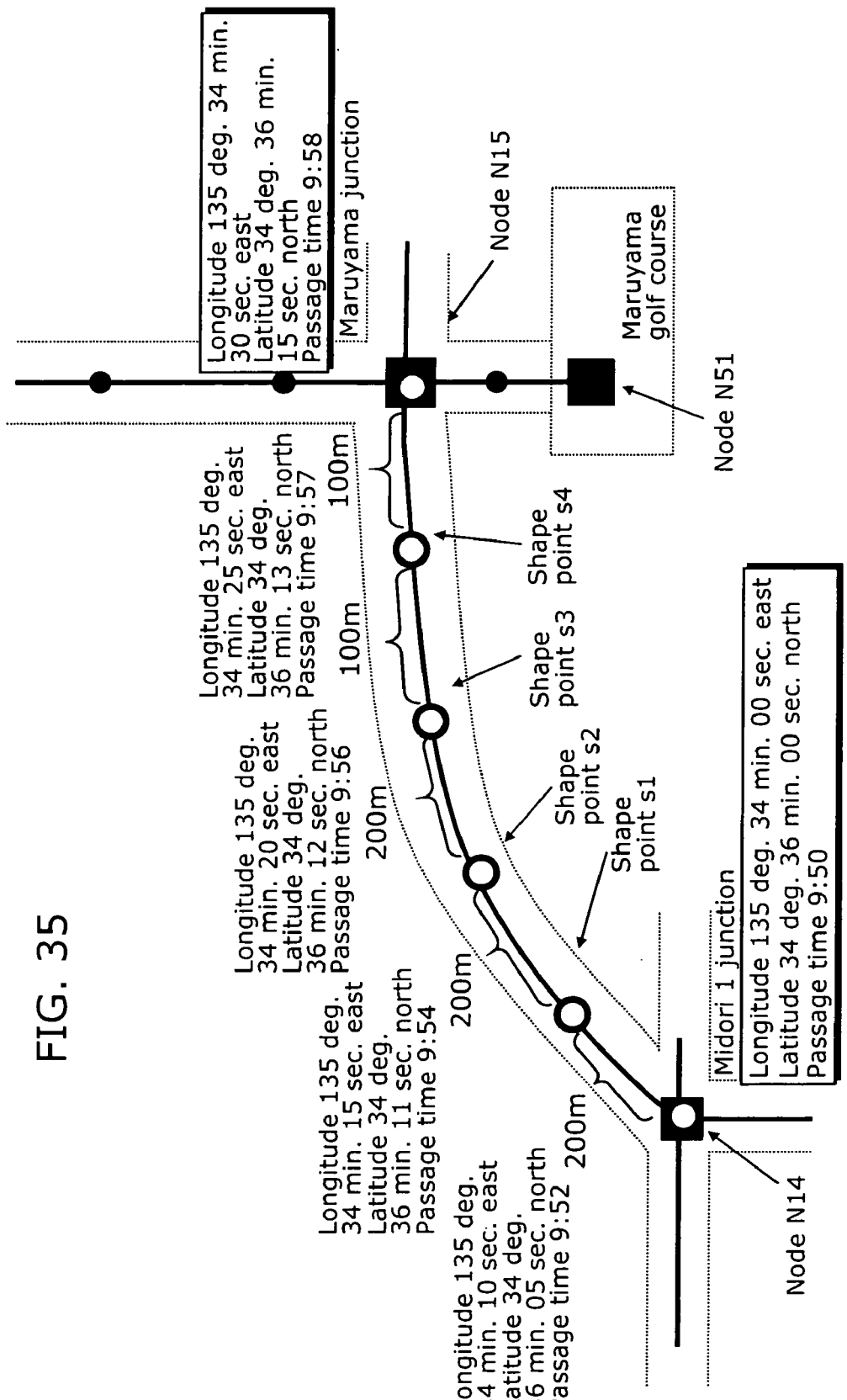
FIG. 35 is a diagram showing the conversion of the moving history.

FIG. 35 is a diagram showing the interpolation method. The moving history ID "001" shows that the passage time of the node ID "N14" is "9:50" and the passage time of the node ID "N15" is "9:58", and thus the difference is 8 minutes. On the other hand, the latitude and longitude information of the respective shape points are obtained based on the coordinates, and the distances from the nodes can be calculated according to this latitude and longitude information. For example, based on the latitude and longitude information of the node ID "N14": "longitude 135 degrees 34 minutes 00 seconds east and latitude 34 degrees 36 minutes 00 seconds north", and the latitude and longitude information of the shape point "s1": "longitude 135 degrees 34 minutes 10 seconds east and latitude 34 degrees 36 minutes 05 seconds north", the distance between the two points can be calculated as approximately 200 m using the third angle projection (in the vicinity of longitude 135 degrees east and latitude 34 degrees, a second (that is 1/3600 degree) corresponds to approximately 25 m distance). In the same way, the distance between the respective shape points can be calculated. Likewise, when the distance between the respective shape points can be calculated, as shown in FIG. 35, the distance from the shape point "s1" to "s2" is 200 m, the distance from the shape point "s2" to "s3" is 200 m, the distance from the shape point "s3" to "s4" is 100 m and the distance from the shape point "s4" to the node ID "N15" is 100 m. The entire distance is 800 m. Therefore, the passage time of the respective shape points can be estimated. As shown in FIG. 35, for example, the passage time of the shape point "s1" is "9:52".

Figure 36:
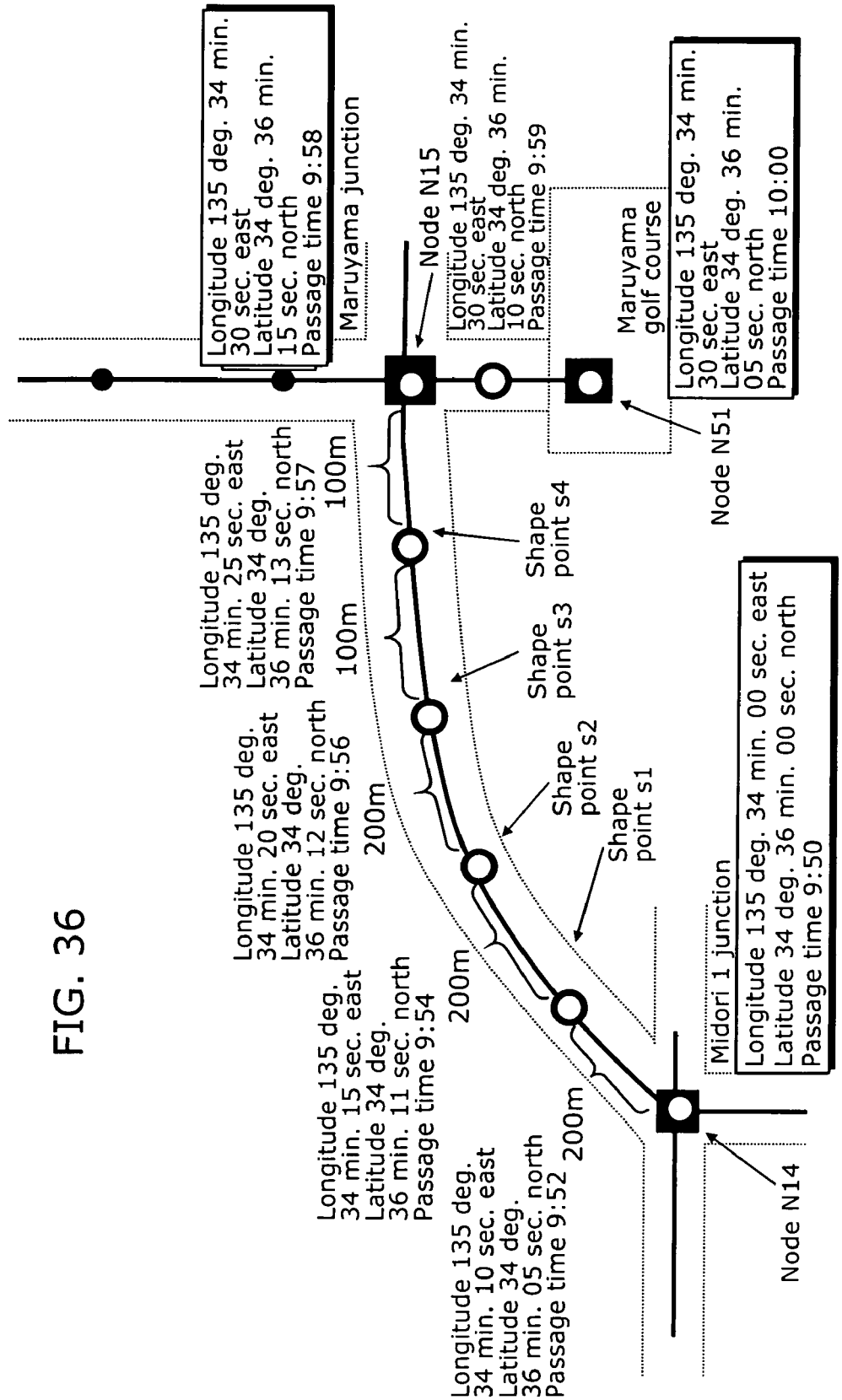
FIG. 36 is a diagram showing the conversion of the moving history.

FIG. 36 is an interpolated diagram, using the shape points, where the above-mentioned procedure is also performed between the node ID "N15" and the node ID "N16". Moreover, by repeating the above-mentioned procedure between the respective node IDs as well as links, for example, the moving history from "home" to "Maruyama golf course" is to be converted into the rows of latitude and longitude information as shown with white circles in FIG. 37.

FIG. 38 is a diagram showing the converted latitude and longitude information. This moving history converted into latitude and longitude information is accumulated in the history information accumulation unit 104 through the first moving history conversion unit 103*a*.

The second moving history conversion unit 105*a* converts moving history which is converted into latitude and longitude information accumulated in the history information accumulation unit 104, as well as the second map information which is accumulated in the second map information accumulation unit 106, into available formats in the second navigation apparatus 200*a*.

The need that the user can pass down and use moving history accumulated in the conventional navigation apparatus (the first navigation apparatus 100c) to the new navigation apparatus (the second navigation apparatus 200c) is considered to be great also in terms of the importance of moving history. In the case that moving history is accumulated in each navigation apparatus, it is general that its format is unique to each apparatus. For example, a navigation apparatus with the node-oriented road network accumulates moving history as a node series and a navigation apparatus with the link-oriented road network may accumulate moving history as the series of links. Moreover, another navigation apparatus may accumulate moving history as a combination of links and nodes. Even if moving history is accumulated as the same node series, the node ID systems may be totally different and inconsistency indicated in FIG. 30 and FIG. 31 may occur.

Therefore, in this embodiment, as mentioned above, the series of node IDs and the in-between routes in the moving history are interpolated and converted into moving history.

Figure 39:
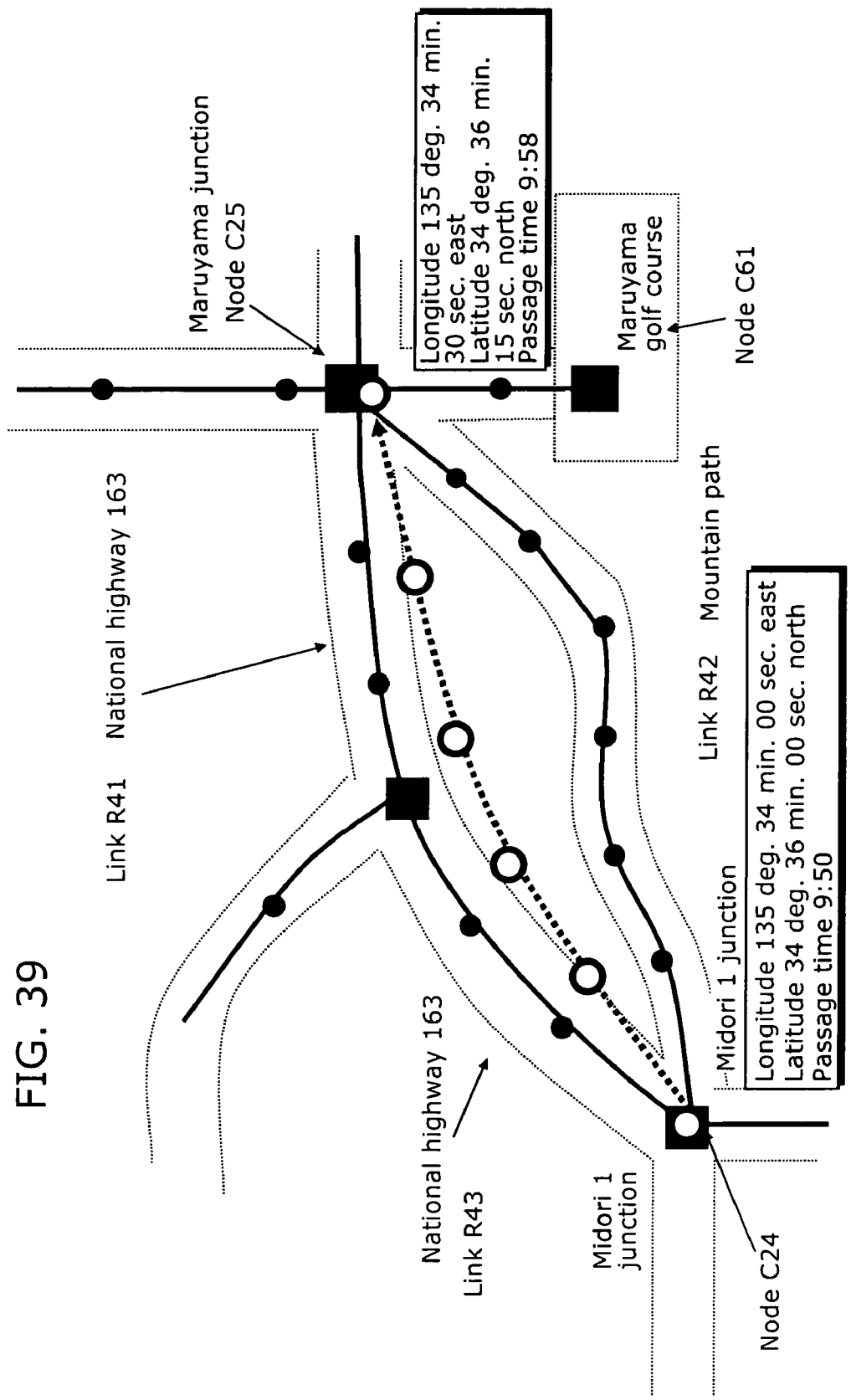
FIG. 39 is a diagram showing the conversion of the moving history.

FIG. 39 is a diagram indicating moving history (white circles) converted into the rows of latitude and longitude information by the first moving history conversion unit 103a on the second map information.

The latitude and longitude information of the nodes and links from the second map information is not always the same as the latitude and longitude information from the first map information. In addition, the number of the link shape points and positions may be also different, and they do not always correspond to each other.

Accordingly, in this embodiment, the second moving history conversion unit 105a vertically projects latitude and longitude information accumulated in the history information accumulation unit 104 on the links in the second map information. Even if the link shape points are different, vertical projection to the lines which connect these shape points allows the extraction of most approximate traveling routes. Moreover, it is judged that the user passed through a node which is included in the second map information but not included in the first map information. In addition, since moving history is accumulated with passage time, passage time at a node in the second map information can also be calculated.

Figure 40:
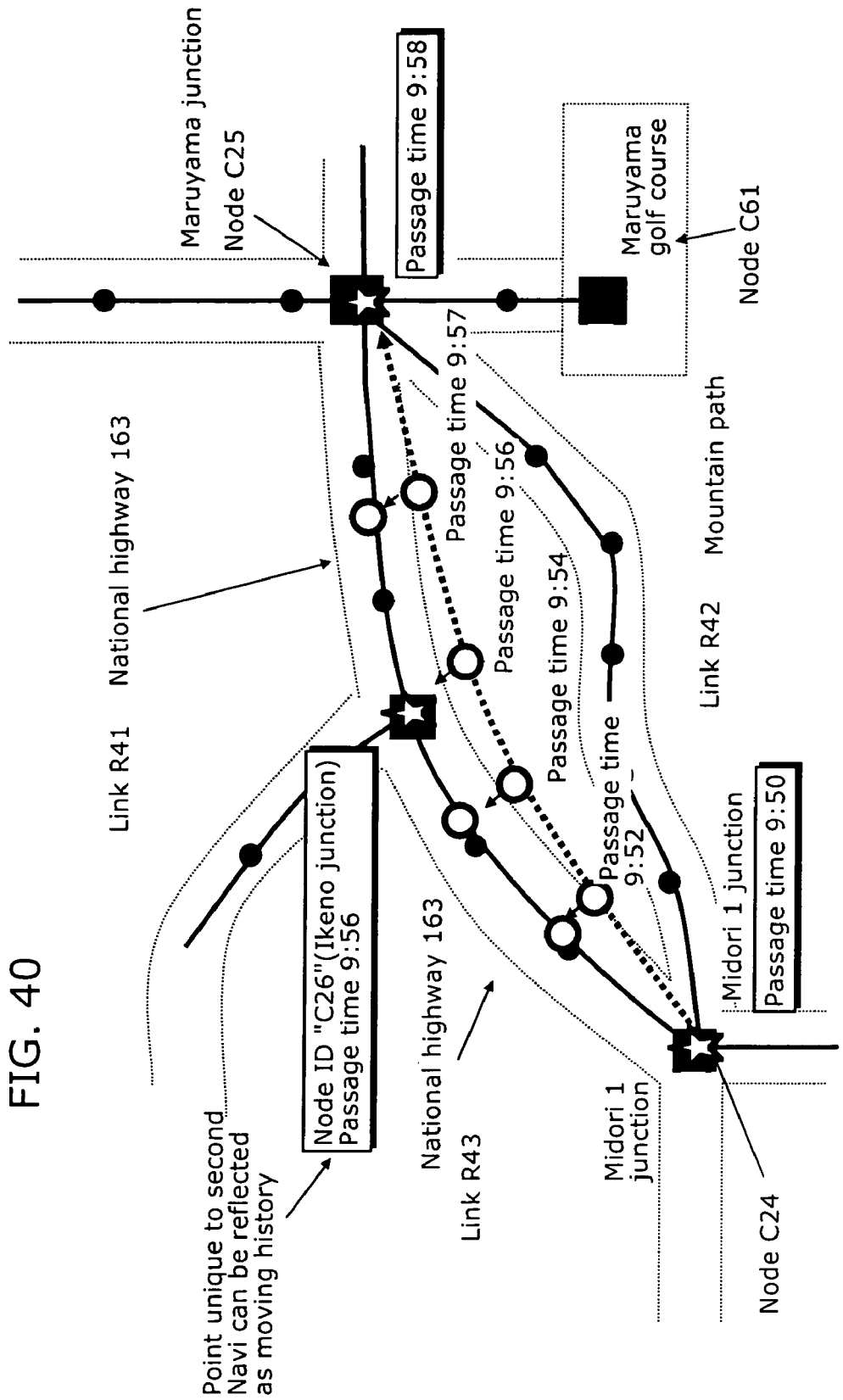
FIG. 40 is a diagram showing the conversion of the moving history.

FIG. 40 is a diagram showing an example where moving history is vertically projected on the links in the second map information. The node ID "C26 (Ikeno junction)", that is, a new node which is present in the second map information, can be judged to be passed through and the passage time is calculated as "9:56".

Figure 41:
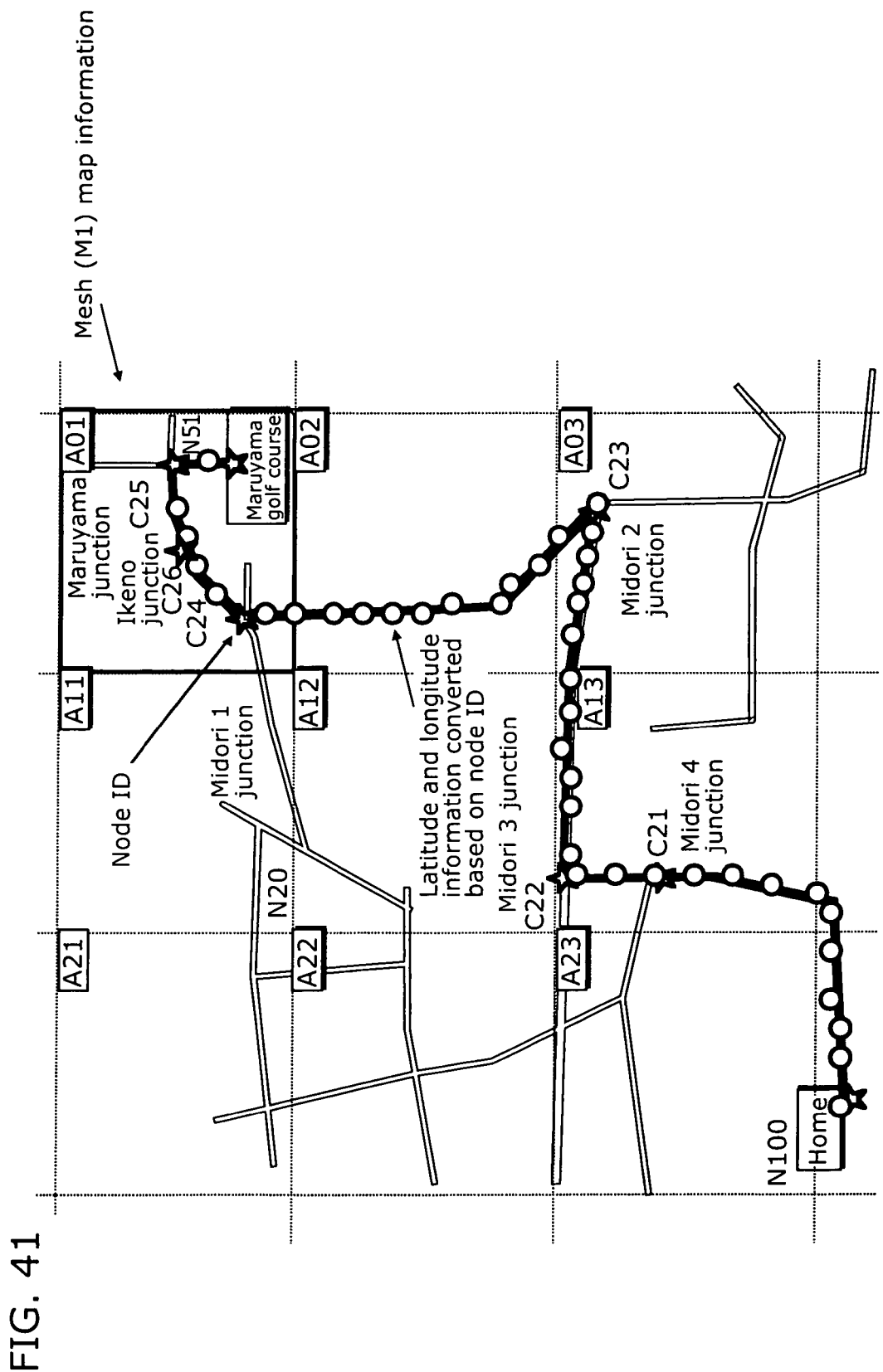
FIG. 41 is a diagram showing the conversion of the moving history.

FIG. 41 is a diagram showing latitude and longitude information accumulated in the history information accumulation unit 104 on the second map information. The second moving history conversion unit 105a extracts the passage nodes (as shown with asterisks in FIG. 41) in the second map information using the above-mentioned conversion method and accumulates the extracted nodes as the user's moving history in the second moving history accumulation unit 107.

FIG. 42 is a diagram showing moving history accumulated in the second moving history accumulation unit 107. The moving history ID "001" is accumulated as the node ID "C100 (home)", "C24 (Midori 1 junction)", "C26 (Ikeno junction)", "C25 (Maruyama junction)", and "C61 (Maruyama golf course)" which are available formats in the second map information.

Figure 43:
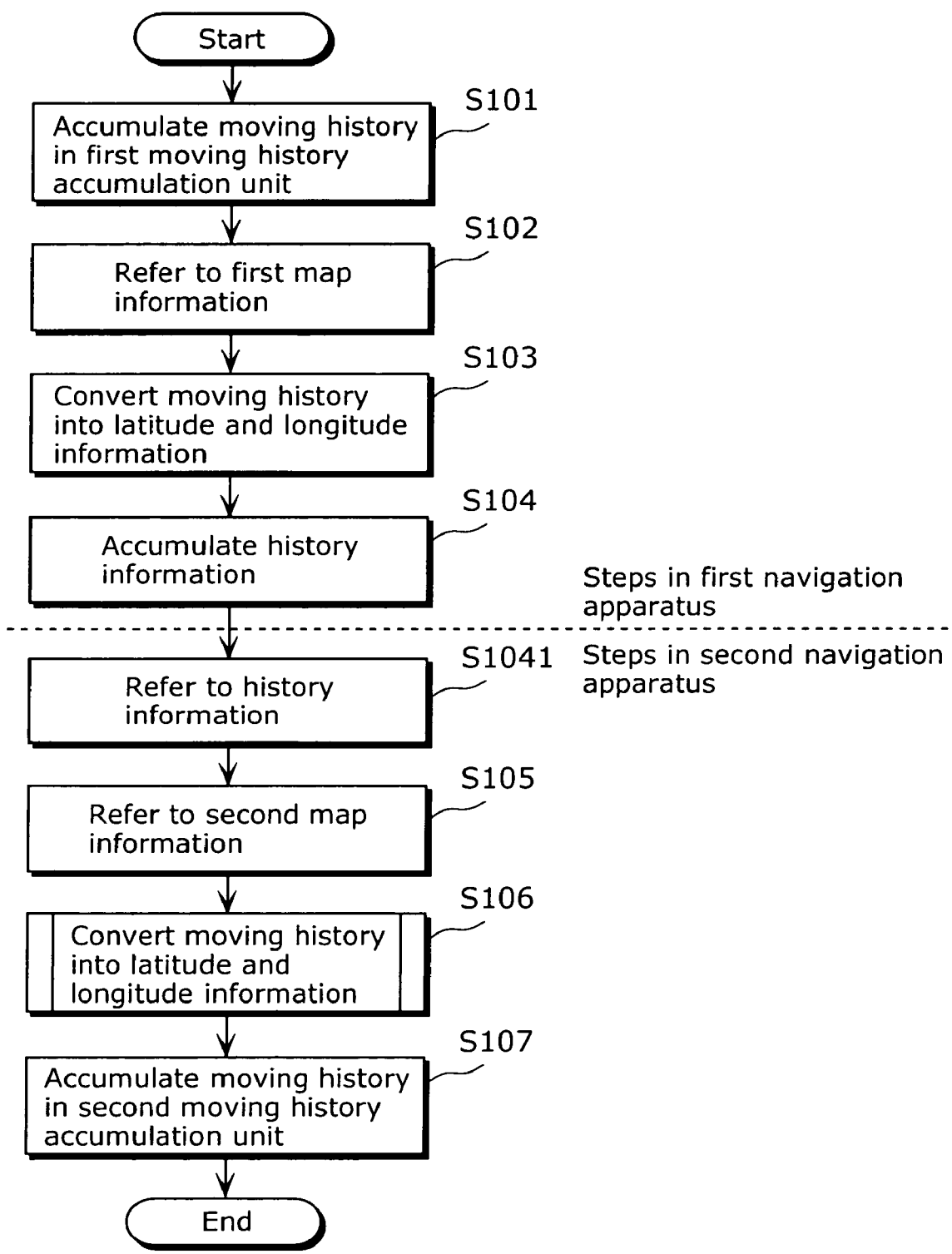
FIG. 43 is a flow chart showing the operation of the moving history conversion apparatus.
Figure 44:
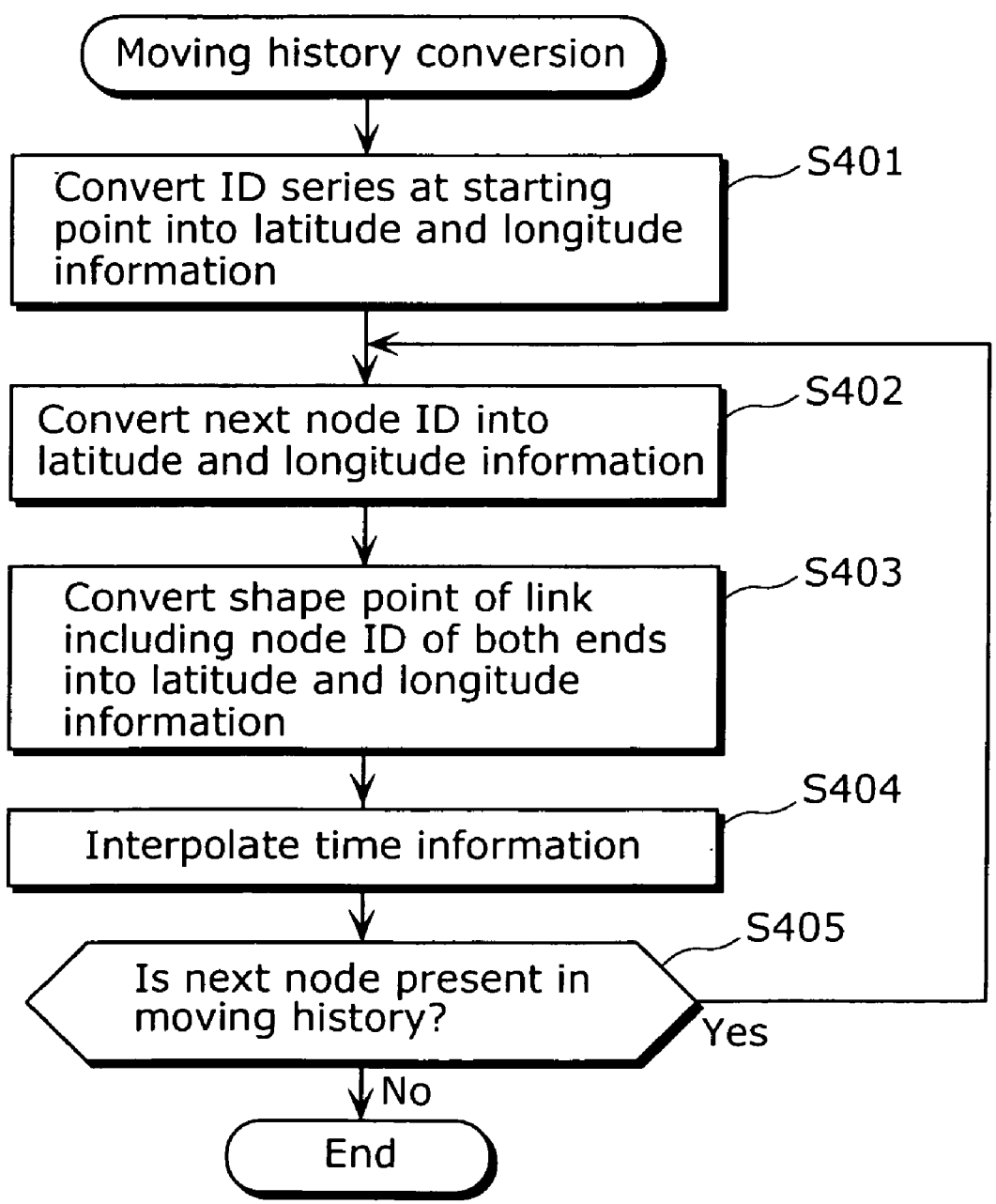
FIG. 44 is a flow chart showing a conversion procedure of moving history.
Figure 45:
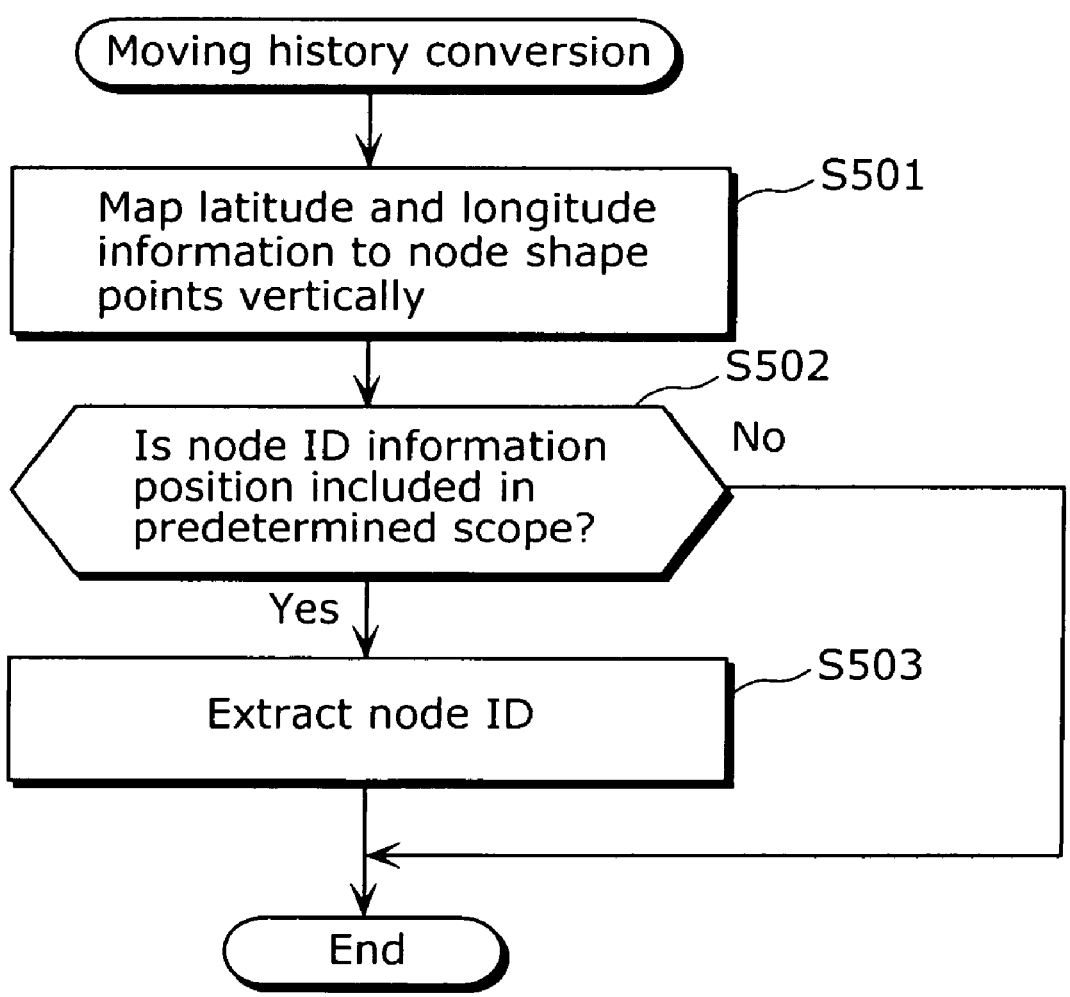
FIG. 45 is a flow chart showing a conversion procedure of longitude and latitude information.

Subsequently, the operation of the moving history conversion apparatus in this embodiment is described using flow charts (FIG. 43, FIG. 44 and FIG. 45). The same Step Ss as those of the operation flow in the first embodiment are provided with the same reference numerals.

The first navigation apparatus 100c accumulates moving history in the first moving history accumulation unit 101 (Step S101 in FIG. 43). Moving history is accumulated as the series of node IDs based on the first map information. Bold Black lines in FIG. 4 shows the user's movement and asterisks correspond to the node IDs, and these series are accumulated as moving history.

FIG. 8 shows moving history accumulated in the first moving history accumulation unit 101. For example, the moving history ID "001" shows that the user left "N100" and reached "N51" via "N11" and "N12". This user's moving history is accumulated as the series of node IDs based on the first map information.

Next, the first moving history conversion unit 103a refers to the first map information (Step S102) and converts moving history accumulated as node series into latitude and longitude information (Step S303). The detailed information of the respective nodes and latitude and longitude information are described in the first map information (FIG. 4) and the conversion is performed using this latitude and longitude information.

In this embodiment, the history is converted using the positions of the node IDs in the first map information and the shape points of the links which connect node IDs.

First, the first moving history conversion unit 103a converts the positions of the node IDs in the history into latitude and longitude information (Step S401 in FIG. 44). Next, the position information of the next node ID is converted into latitude and longitude information (Step S402). Then, the position information of the link shape points including the both end nodes is converted into latitude and longitude information (Step S403). Simultaneously, the passage time is interpolated (Step S404). Subsequently, it is judged whether there is a next node or not (Step S405). If there is the next node (Yes in Step S405), the next node is converted (return to Step S401) and if there is no next node (No in Step S405), the conversion is terminated.

The following is a specific description using diagrams. In FIG. 33, the node ID "N14 (Midori 1 junction)" is present in the history and converted into "longitude 135 degrees 34 minutes 00 seconds east and latitude 34 degrees 36 minutes 00 seconds north" from the first map information (Step S401). Next, the node ID "N15 (Maruyama junction)" is converted into latitude and longitude information (Step S402). Subsequently, the shape points of the link ID "L31" including the nodes "N14" and "N15" at the above-mentioned both-end nodes are converted into latitude and longitude information (Step S403). In this case, four shape points from the shape point "s1" to "s4" are converted into latitude and longitude information respectively (FIG. 34). In addition, time information is interpolated (Step S404). In this case, each passage time is calculated from latitude and longitude information and the passage times of the both-end nodes (FIG. 35).

Since there are the node ID "N51 (Maruyama golf course)" following the node ID "N15" (Yes in Step S405), the node is converted using the same method (the loop to Step S402). In FIG. 36, the node IDs "N15" and "N51" as well as the link shape points between them are converted into latitude and longitude information.

Figure 37:
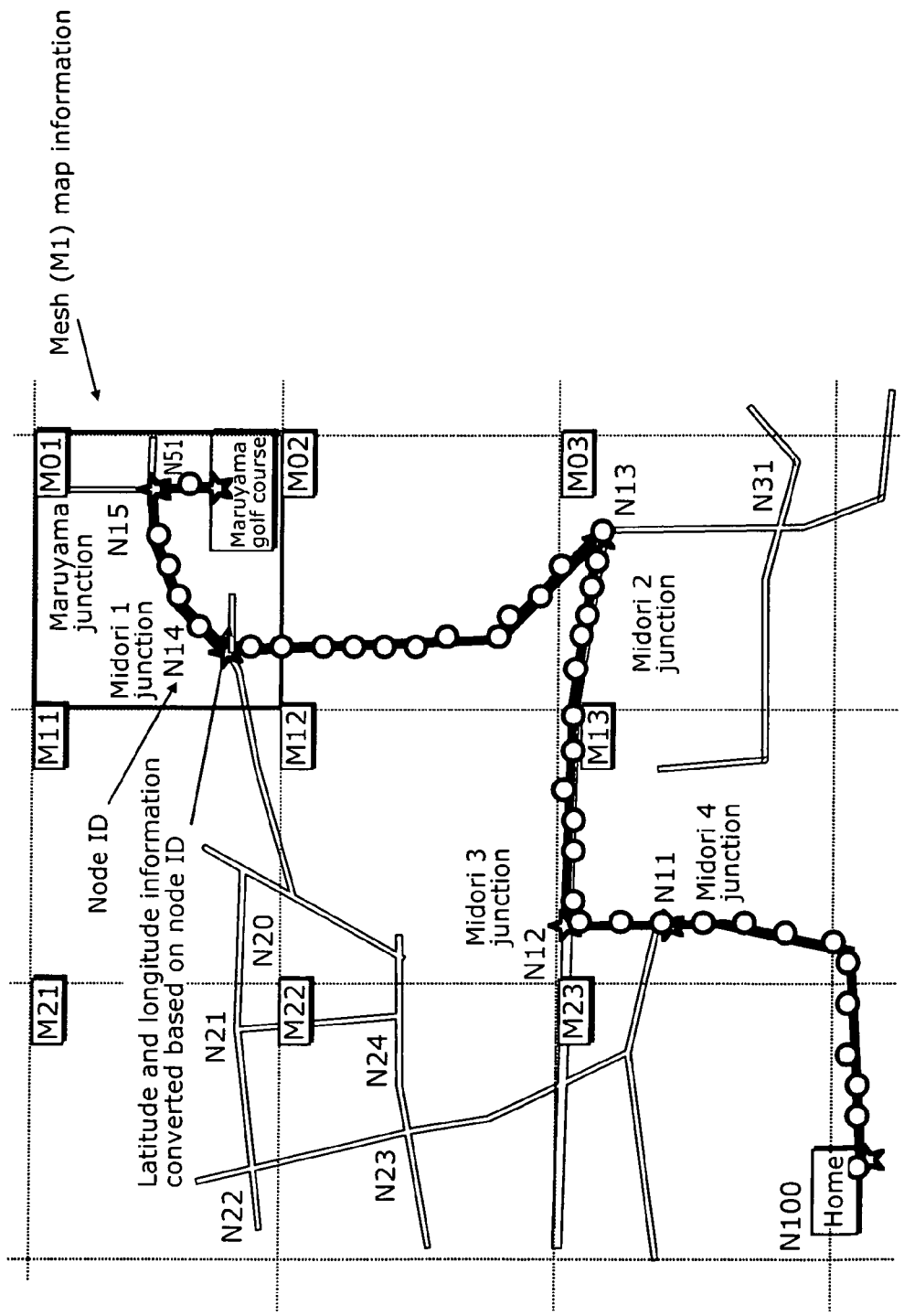
FIG. 37 is a diagram showing the conversion of the moving history.

If the same procedure is performed with the departure place, the nodes are converted into the row of latitude and longitude information as shown with white circles in FIG. 37.

Next, the first moving history conversion unit 103a accumulates the moving history converted into latitude and longitude information in the history information accumulation unit 104 (Step S104 in FIG. 43). FIG. 38 shows moving history accumulated as latitude and longitude information.

Then, in order to make this moving history available in the second navigation apparatus 200, in the second navigation apparatus 200*a*, the second moving history conversion unit 105*a* reads out the moving history accumulated in the history information accumulation unit 104 (Step S1041 in FIG. 43) and converts the moving history (Step S306) with reference to the second map information (Step S105).

For example, the second moving history conversion unit 105*a* maps moving history accumulated as latitude and longitude information on the second map information and performs the vertical mapping conversion (Step S501 in FIG. 45). Next, it is judged whether latitude and longitude information is included in a predetermined scope or not in order to extract the node IDs (Step S502). If latitude and longitude information is included in the predetermined scope (Yes in Step S502), the node IDs are extracted (Step S503). In contrast, if latitude and longitude information is not included in the predetermined scope (No in Step S502), the node IDs are not extracted.

White circles in FIG. 40 indicate moving history accumulated as latitude and longitude information. Here, the vertical mapping conversion to the links is performed.

Latitude and longitude information such as the node IDs "C24", "C30", "C61" and the like is shown in the second map information (the second map information in FIG. 10) and the nodes are extracted based on this information. Asterisks indicate the extracted nodes. For example, the moving history of a user who moves from home to the Maruyama golf course is converted into the series of the asterisks in FIG. 41.

Subsequently, the second moving history conversion unit 105*a* accumulates the obtained series of node IDs as moving history in the second moving history accumulation unit 107 (Step S107 in FIG. 43). FIG. 42 shows moving history in the second moving history accumulation unit 107. For example, the moving history ID "001" shows that the user left "C10" and reached "C61" via "C24" and "C25". This user's moving history is converted into the series of node IDs and accumulated based on the second map information.

The need that the user can pass down and use moving history accumulated in the conventional navigation apparatus (the first navigation apparatus 100*c*) to the new navigation apparatus (the second navigation apparatus 200*c*) is considered to be great also in terms of the importance of moving history. In the case that moving history is accumulated in each navigation apparatus, it is general that its format is unique to each apparatus. For example, a navigation apparatus with a node-oriented road network accumulates moving history as node series and a navigation apparatus with a link-oriented road network may accumulate moving history as the series of links. Furthermore, another navigation apparatus may accumulate moving history as a combination of links and nodes. Even if moving history is accumulated as the same node series, the node ID systems may be totally different and inconsistency indicated in FIG. 30 and FIG. 31 may occur.

In this embodiment, the moving history accumulated in a format unique to an apparatus is converted into nodes on the map information and the rows of latitude and longitude information using the shape points of the links. Conversion of the history information into generic latitude and longitude information allows re-conversion of the generic information into a format unique to an apparatus.

In addition, although the history conversion in the second moving history conversion unit 105*a* is into the node series, the present invention is not limited to this. The conversion method in this embodiment also allows conversion into the series of links or the mixture of nodes and links. The following is described using the figures.

Figure 46:
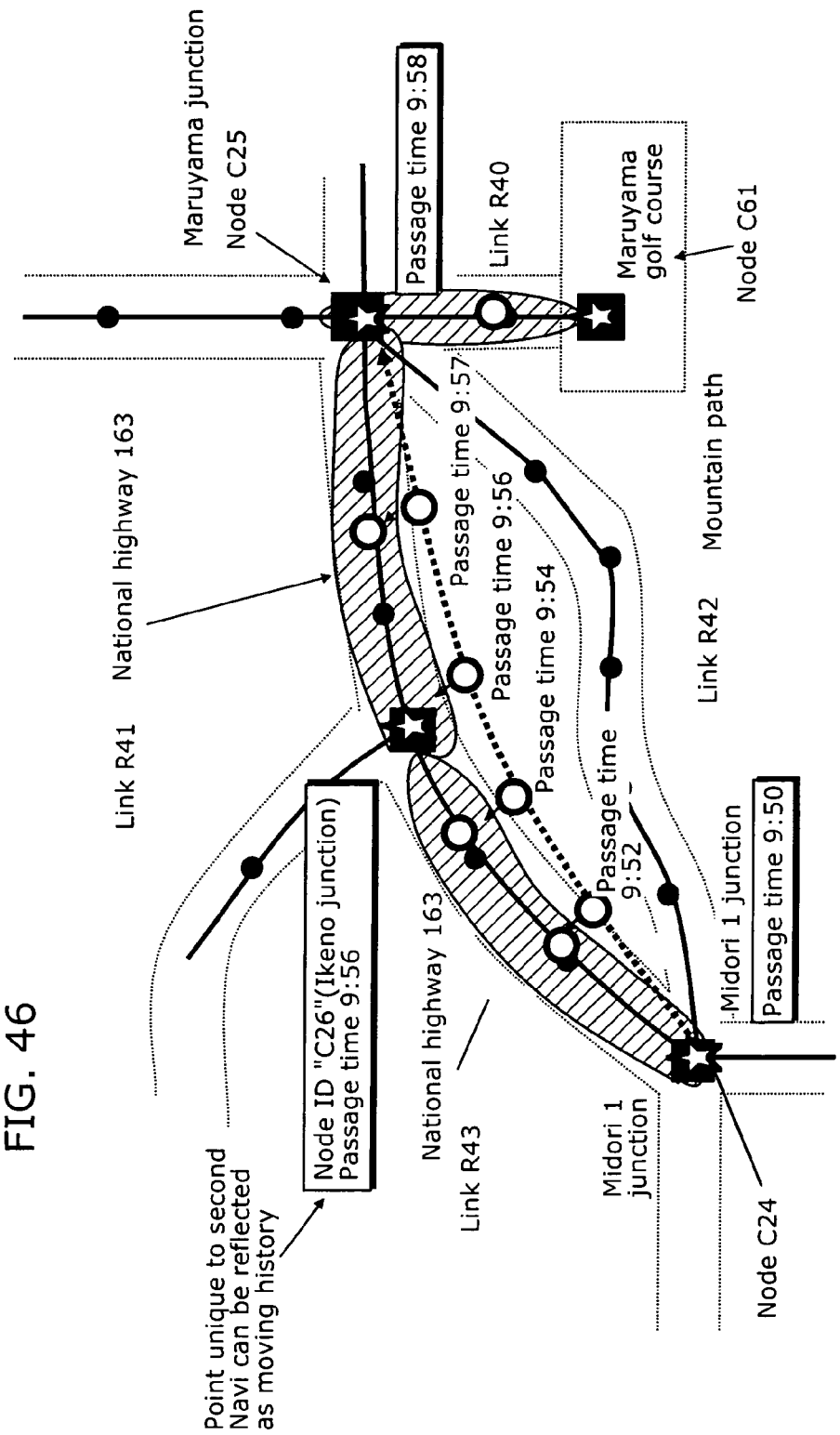
FIG. 46 is a diagram showing a conversion example of the moving history.

FIG. 46 is a diagram showing the method where the second moving history conversion unit 105*a* converts the series of latitude and longitude information records into the series of the links. The link is formed from shape points indicating shapes and the nodes of junctions at both ends of the link. The passage times of the nodes at the both ends can be considered as the entry and exit times of the link. Therefore, in this embodiment, if the information is accumulated as the series of link IDs, the passage time of the link is assumed to be the time of entering the link. In other words, the time of the prior node at the both ends is accumulated. Since the time of exiting the link indicates the same value as the time of entering the next link, exit time is omitted here and the passage time of the node; that is, the arrival time at the destination, is only accumulated.

In FIG. 46, when latitude and longitude information records (white circles) accumulated in the history information accumulation unit 104 are vertically projected along with the shape of the links and are approximated, it can be judged that the user passed through the link ID "R43 (National highway 163)" and "R41 (National highway 163)". Moreover, because each latitude and longitude information is converted based on the estimation of the passage time, the time of entering the link ID "R41 (National highway 163)" can be calculated. In this case, the time of entering the link ID "R41" can be calculated as "9:56" because the time is corresponding to the node ID "C26 (Ikeno junction)".

FIG. 47 is a diagram showing the moving history indicated as the series of link IDs accumulated in the second moving history accumulation unit 107. The moving history is converted into the series of link IDs and the converted series of link IDs are accumulated as, for example, the link ID "R43" and the entry and exit time "9:50".

In addition, it may not be judged which route the user passed through depending on the link shape. The following is described using FIG. 48.

Figure 48:
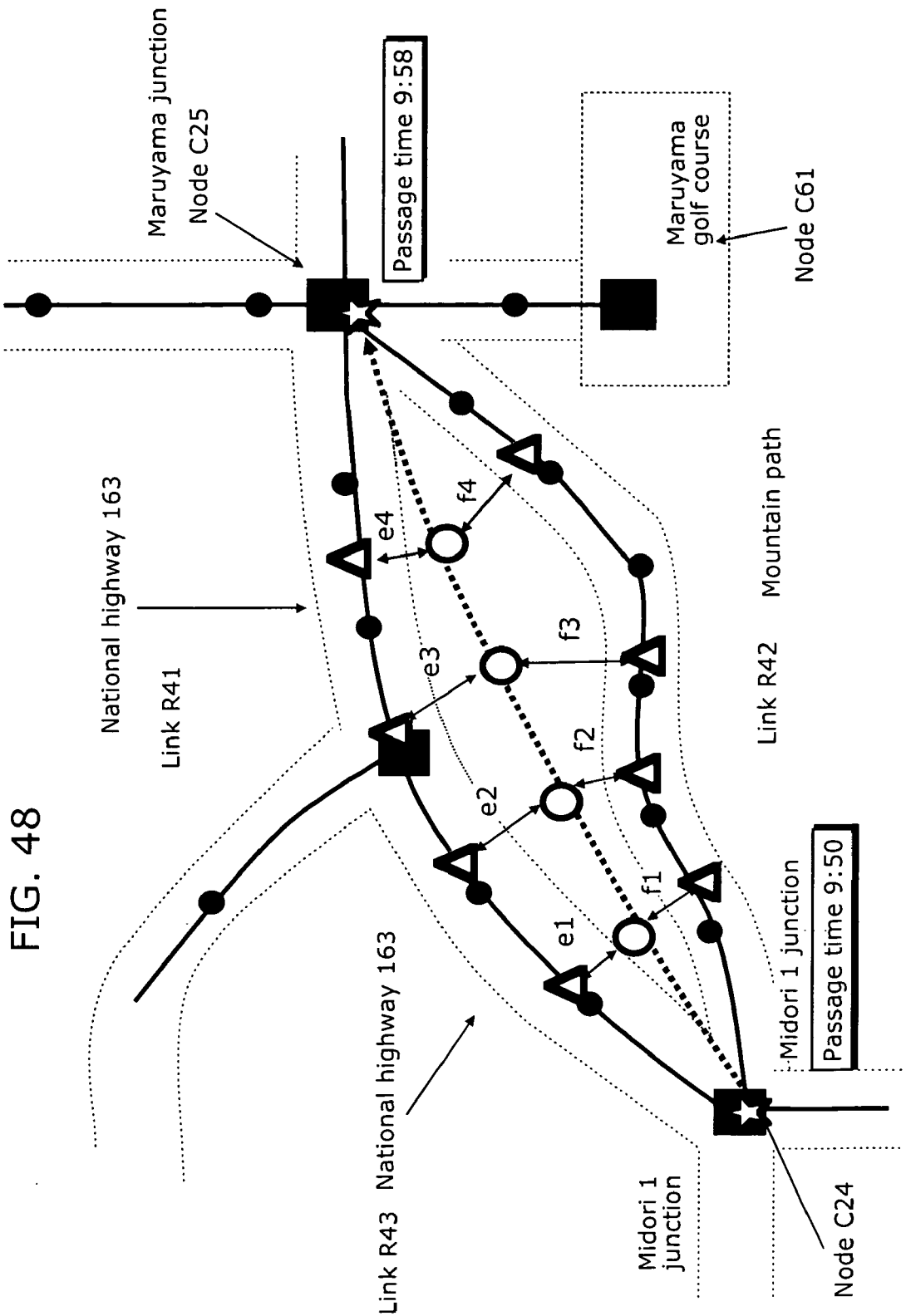
FIG. 48 is a diagram showing a conversion example of moving history.

FIG. 48 is a diagram showing the example of the history information accumulated in the history information accumulation unit 104. White circles are latitude and longitude information accumulated in the history information accumulation unit 104. On the other hand, white triangles indicate points to be vertically projected on each link and their differences are indicated as "e1, e2, e3, e4" and "f1, f2, f3, f4". Here, if the absolute values of these differences are compared and there is no valid difference, it is possible to leave such information as unmatched data and perform reconversion using the user's posterior driving. For example, if the user frequently passes through the national highway 163 later, this moving history is estimated to indicate the national highway 163 and may be converted into the link IDs "R43" and "R41". The following is described using specific examples.

The moving history in FIG. 48 has no valid distinction in differences and cannot be converted because it is not judged which of the national highway 163 (the links R43 and R41) and the mountain path (the link R42) the user passed through. Therefore, it is temporarily accumulated as the unconverted history. Then, it is assumed that the second navigation apparatus accumulates the moving history indicating that the user passed through the route as usual.

Figure 49:
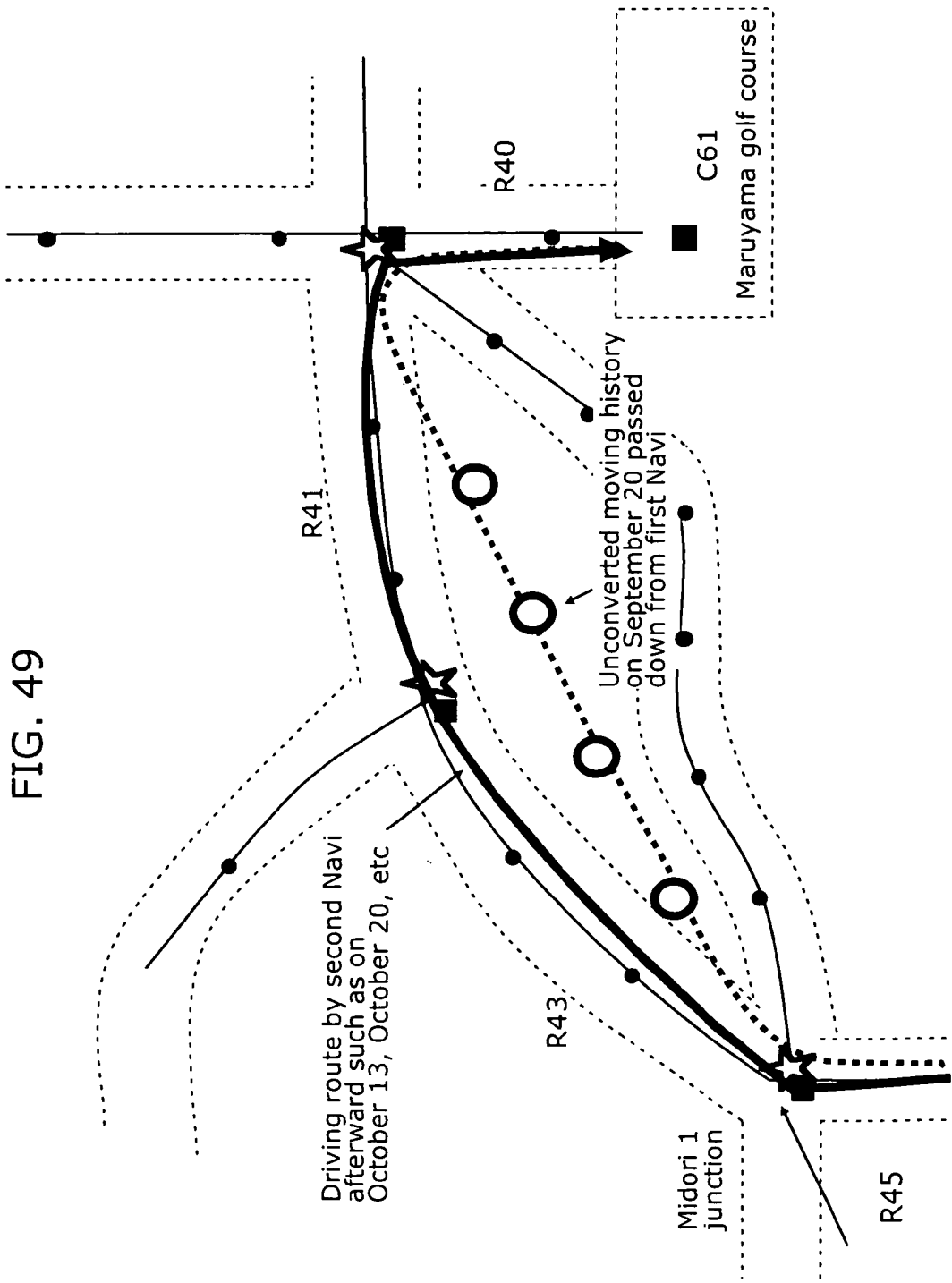
FIG. 49 is a diagram showing an example of moving history.

FIG. 49, like FIG. 48, is a diagram showing the enlarged map of the vicinity of the Maruyama golf course. In FIG. 49, the moving history indicated as bold black lines is the user's driving route in the second navigation apparatus and shows that the user passed through R45, R43, R41 and the national highway 163 and reached the Maruyama golf course. In other words, this user uses the national highway 163 to go to the Maruyama golf course and the moving history is also accumulated in the second navigation apparatus. Therefore, the moving history which remains unconverted because it was impossible to judge which of the national highway 163 and the mountain path the user had passed through is converted as the moving history indicating that the user passed through the national highway 163 to also be used in the second navigation apparatus.

Figure 50:
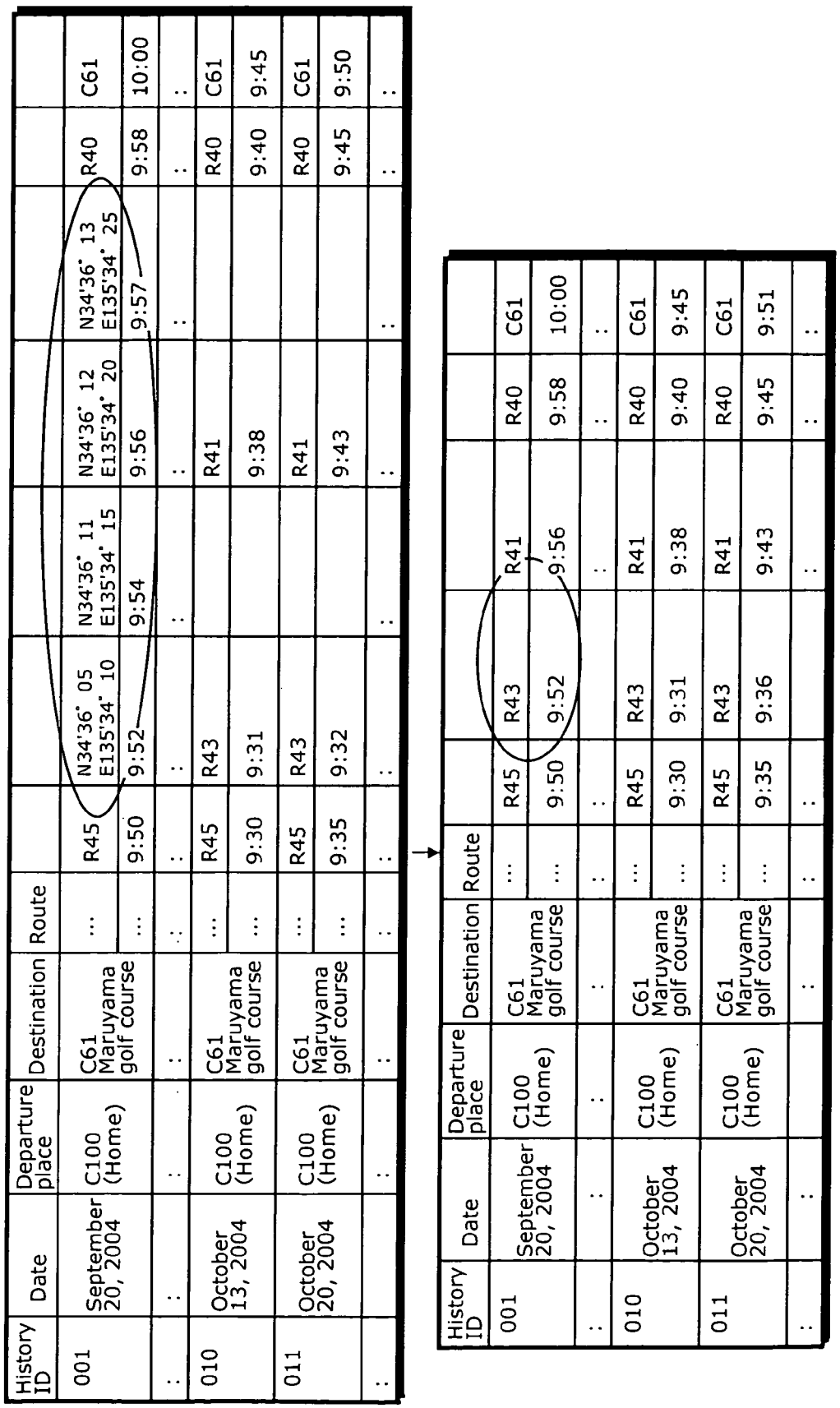
FIG. 50 is a diagram showing a conversion example of moving history.

FIG. 50 is a diagram showing the history in the above-mentioned example (FIG. 49) using tables. In the upper table in FIG. 50, the date "Sep. 20, 2004" and the moving history (the unconverted moving history) indicating that the user left "home" and headed for "Maruyama golf course" are accumulated as the moving history ID "001". This is the moving history which was accumulated in and passed down from the first navigation apparatus. However, the history is temporarily accumulated as latitude and longitude information because it was impossible to judge which of the national highway 163 and the mountain path the user had passed through after passing through the link ID R45. Afterward, the moving history indicating that the user left "home" and headed for "Maruyama golf course" on the date "Oct. 13, 2004" has been accumulated as the moving history ID "010" in the second navigation apparatus. At that time, the user uses the national highway 163 and the link IDs "R45", "R43", "R41" and "R40" have been accumulated. Likewise, the moving history indicating that the user left "home" and headed for "Maruyama golf course" using the national highway on the date "Oct. 20, 2004" has been accumulated. Therefore, as shown in the lower table in FIG. 50, it is assumed that the unconverted moving history ID "001" indicating that the national highway was also used and the history is reconverted into and accumulated as the link IDs "R43" and "R41".

Figure 51:
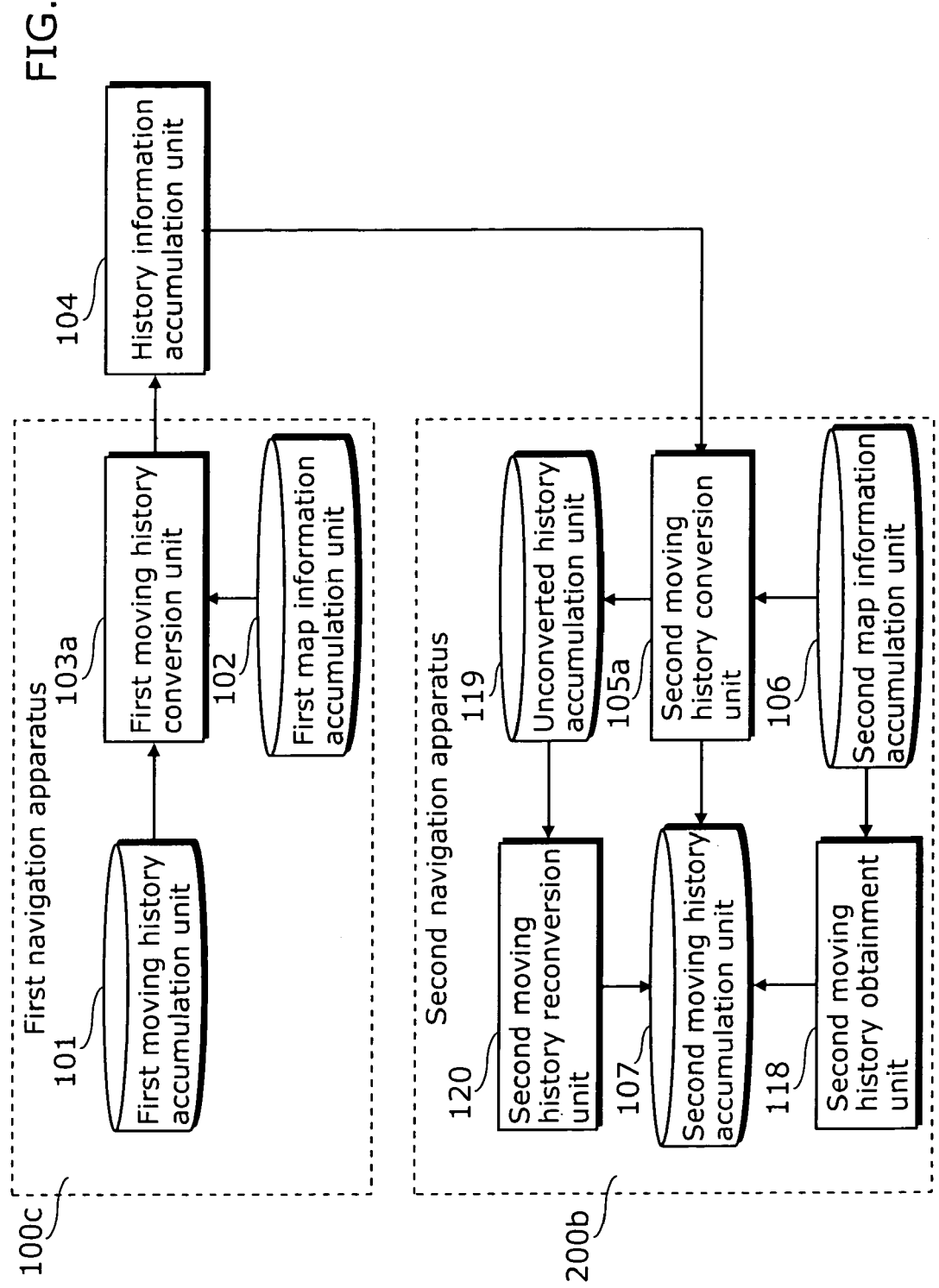
FIG. 51 is a block diagram showing the functions of the moving history conversion apparatus in a variation example.

FIG. 51 is a block diagram to realize the above-mentioned example. The same constituent elements as those in the block diagram in this embodiment as shown in FIG. 32 are provided with the same reference numerals as those in FIG. 32. As with the configuration shown in FIG. 32, the first navigation apparatus 100c includes a first moving history accumulation unit 101, a first moving history accumulation conversion unit 103a and a first map information accumulation unit 102, and converts the moving history accumulated in the first navigation apparatus 100 into a series of latitude and longitude information records, and accumulates it in the history information accumulation unit 104. The second navigation apparatus 200b includes a second moving history conversion unit 105a, a second map information accumulation unit 106 and a second moving history accumulation unit 107 as shown in this embodiment as well as a second moving history obtainment unit 118, an unconverted history accumulation unit 119 and a second moving history reconversion unit 120.

The latitude and longitude information accumulated in the history information accumulation unit 104 is converted, based on the map information accumulated in the second map information accumulation unit 106, into the history available in the second navigation apparatus 200b through the second moving history conversion unit 105a, and the converted history is accumulated in the second moving history accumulation unit 107. On the other hand, as shown in this example, the history which is not converted through the second moving history conversion unit 105a is temporarily accumulated in the unconverted moving history accumulation unit 119. In other words, if there are plural ID series which may be replaced with the series of the latitude and longitude information, the series of the latitude and longitude information are temporarily accumulated as the unconverted information in the unconverted moving history accumulation unit 119. At this time, a flag indicating that the history is unconverted may be added or the latitude and longitude information may be accumulated as it is in the second moving history accumulation unit 107. Subsequently, the moving history in the second navigation apparatus 200b is detected and is obtained by the second moving history accumulation unit 118, and is accumulated in the second moving history accumulation unit 107. In the above-mentioned example, the history of "Oct. 13, 2004" and "Oct. 20, 2004" correspond to the history in this second navigation apparatus 200b. Accordingly, the second moving history reconversion unit 120 reconverts the unconverted history accumulated in the unconverted history accumulation unit 119 and accumulates it in the second moving history accumulation unit 107. In other words, the second moving history reconversion unit 120 converts the unconverted history into the series of the IDs which are close to the moving history newly accumulated in the second moving history accumulation unit 107 among the plural ID series to be candidates for conversion.

In this way, when the moving history is passed down, the history cannot be always converted because a new map often has a new map system and includes a new road and the latitude and longitude values are often different even at the same point. In such case, using the fact that the user often has his/her usual driving pattern, the unconverted history is reconverted by referring to the moving record to be accumulated in the second navigation apparatus later. This allows the passing-down of the history reflecting the user's behavioral characteristics more.

In addition, the method to reconvert an unconverted history is not limited to this. It may assume that the moving history includes the traffic information obtaining point information which identifies the obtaining points of traffic information. The unconverted history may be converted into the ID series which have highly close traffic information obtaining point information among the plural ID series to be candidates for conversion by judging the sameness between the traffic information obtaining point information attached to the unconverted history and the second map information included in the traffic information obtaining point information.

For example, it is possible to convert the history using the traffic information obtained from VICS. In the above-mentioned embodiment, it is shown that not only the moving history but also the obtained information such as the VICS information can be passed down. The VICS information can be displayed as traffic congestion on the Car Navi screen by obtaining the updated information at a predetermined interval such as a five minute interval from optical beacons placed on the routes. It is general that this information is given the specific IDs of every point and link (the VICS link), and the IDs can be shared between companies. As mentioned above, classifying the character information, the image information and the like into levels and passing down these levels displayed during the user's driving allows to pass down the display status at the time when the user usually passes through the route (See FIG. 20). It is also possible to reconvert the unconverted moving history by using the VICS information which is passed down with the moving history.

Figure 52:
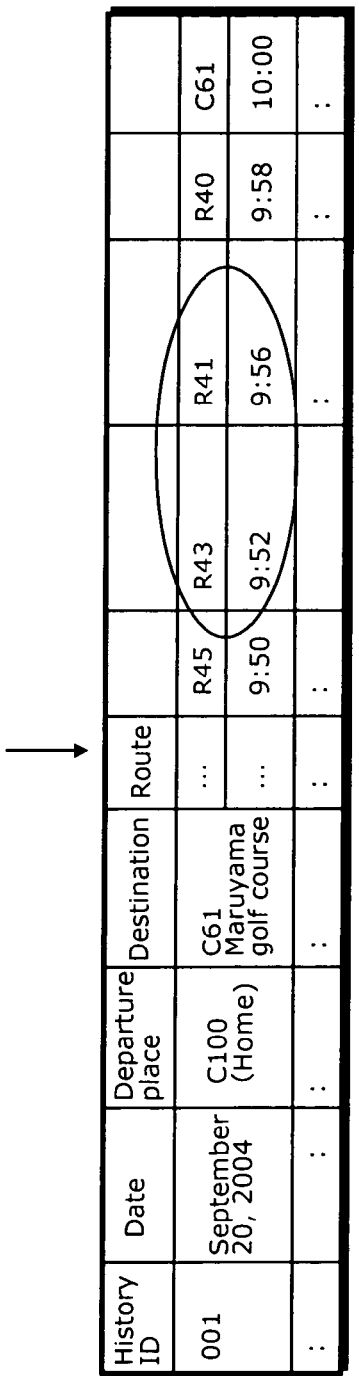
FIG. 52 is a diagram showing a conversion example of moving history.

FIG. 52, like FIG. 49 and the like, is a diagram showing the unconverted moving history based on which it is impossible to judge which route between "National highway 163" and "Mountain path" is used. Specifically, as shown in the upper table in FIG. 52, after the user passed through the link ID "R45", the unconverted moving records such as "latitude 34 degrees 36 minutes 05 seconds north and longitude 135 degrees 34 minutes 10 seconds east" "latitude 34 degrees 36 minutes 11 seconds north and longitude 135 degrees 34 minutes 15 seconds east" "latitude 34 degrees 36 minutes 12 seconds north and longitude 135 degrees 34 minutes 20 seconds east" and "latitude 34 degrees 36 minutes 13 seconds north and longitude 135 degrees 34 minutes 25 seconds east" have been accumulated as the latitude and longitude information as they are. The VICS information which is passed down with the history from the first navigation apparatus has been accumulated in this moving history. Specifically, the history indicating "LEVEL3" at the point "V43" and "LEVEL3" at the point "V41" is accumulated (and the link IDs "V41", "V43" and the like which are the VICS information indicate the same "National highway 163" in the first navigation apparatus and the second navigation apparatus). In other words, since the link IDs "V43" and "V41" indicating "National highway 163" as the VICS information are obtained and passed down, the user can presume that the unconverted history record indicating the passage of "National highway 163", although the history record was unconverted because a difference in the second map in the second navigation apparatus was equal to or above the predetermined threshold. Therefore, as shown in the lower table in FIG. 52, the unconverted moving history can be converted into "R43" and "R41"; that is, the ID series in the second navigation apparatus. In this way, even if the history is accumulated in different formats in different Car Navis, the moving history can be correctly passed down by using the VICS information and the like.

Moreover, as another conversion method, the unconverted history may be converted by using the information indicating whether or not the user drove according to the routes and the like searched for by setting a destination. In other words, the passage information indicating that whether or not the mobile object passed through the predetermined routes is assumed to be included in the moving history. If the passage information attached to the unconverted history indicates that the user passed through the routes, the unconverted history may be converted into the ID series recommended when a destination is set from among the plural ID series to be candidates for conversion.

Specifically, in the above-mentioned embodiment, it is shown that not only the moving history but also the route setting information and the like can be passed down. It is shown that the information indicating that the user drove according to the preset routes or drove routes other than the preset routes by taking the wrong path or other reasons can be attached to the history and such history can be passed down. It is possible to convert the unconverted history by using this route setting information.

Figure 53:
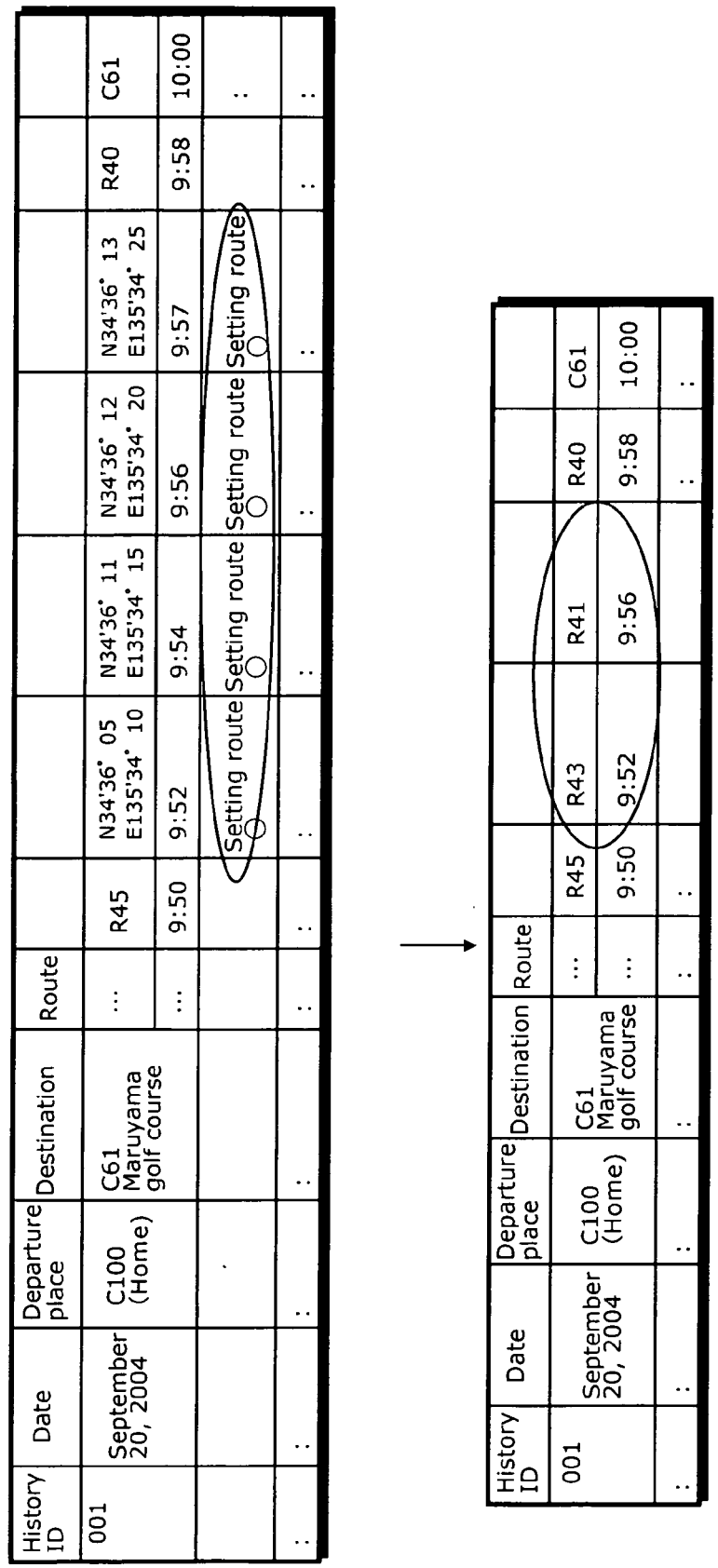
FIG. 53 is a diagram showing a conversion example of the moving history.

For example, assuming that FIG. 48, like FIG. 49, is a diagram indicating the unconverted moving history based on which it is impossible to judge which of the routes, "National highway 163" or "Mountain path" was used. Specifically, in this diagram, after the user passed through the link ID "R45", the unconverted moving records such as "latitude 34 degrees 36 minutes 05 seconds north and longitude 135 degrees 34 minutes 10 seconds east" "latitude 34 degrees 36 minutes 11 seconds north and longitude 135 degrees 34 minutes 15 seconds east" "latitude 34 degrees 36 minutes 12 seconds north and longitude 135 degrees 34 minutes 20 seconds east" and "latitude 34 degrees 36 minutes 13 seconds north and longitude 135 degrees 34 minutes 25 seconds east" have been accumulated as the latitude and longitude information as they are. On the other hand, as shown in the upper table in FIG. 53, it is assumed that the route setting information with the history passed down from the first navigation apparatus has been accumulated in the second navigation apparatus. Specifically, the preset route "o (circle)" is indicated as the user having driven according to the preset route at the point "latitude 34 degrees 36 minutes 05 seconds north and longitude 135 degrees 34 minutes 10 seconds east". Likewise, the preset route "o (circle)" is also indicated at the next "latitude 34 degrees 36 minutes 11 seconds north and longitude 135 degrees 34 minutes 15 seconds east". This example shows that if the general route searched for when a destination is set is "National highway 163", it is found that the user is driving the preset route. Accordingly, the user can presume that the user passed through "National highway 163" by using this route setting information, although the history was unconverted in the second map in the second navigation apparatus because the differences exceed the predetermined threshold. As shown in the lower table in FIG. 53, the unconverted moving history can be converted into "R43" and "R41"; that is, the ID series in the second navigation apparatus. In this way, even if the history is accumulated in different formats in different Car Navis, the moving history can be correctly passed down by using the VICS information and the like.

Although the moving history conversion apparatus according to the present invention has been described according to the embodiments, the present invention is not limited to these embodiments. The present invention includes variations based on the above-mentioned embodiments which can be arrived at by a person skilled in the art within the scope of the present invention and the embodiment which can be realized by combining the constituent elements in the above-mentioned embodiments.

For example, although junctions and the landmark IDs are used for the series to be the moving history in the above-mentioned embodiments, it is possible to accumulate the communications communication base station ID series as the moving history in the mobile object system of mobile phones and the like and use the above-mentioned conversion method. In other words, an embodiment is realized by: maintaining the communication base station area information, as first map information, which identifies the position of the communication base station operated by a first communication service company by first-type IDs; maintaining the communication base station area information, as the second map information, which identifies the position of the communication base station operated by a second communication service company by second-type IDs; and accumulating, as the first moving history, the ID series included in the first map information corresponding to the communication area series which a mobile object passed through.

The mobile terminals such as mobile phones and the like periodically register their positions to the mobile terminals and the communication base stations in order to be always ready for receiving incoming calls. When there is an incoming call, a calling is provided based on this registered position. If the current communication area is different from the registered area according to the moving of the mobile object, communications can be usually performed by re-registration of positions.

Figure 54:
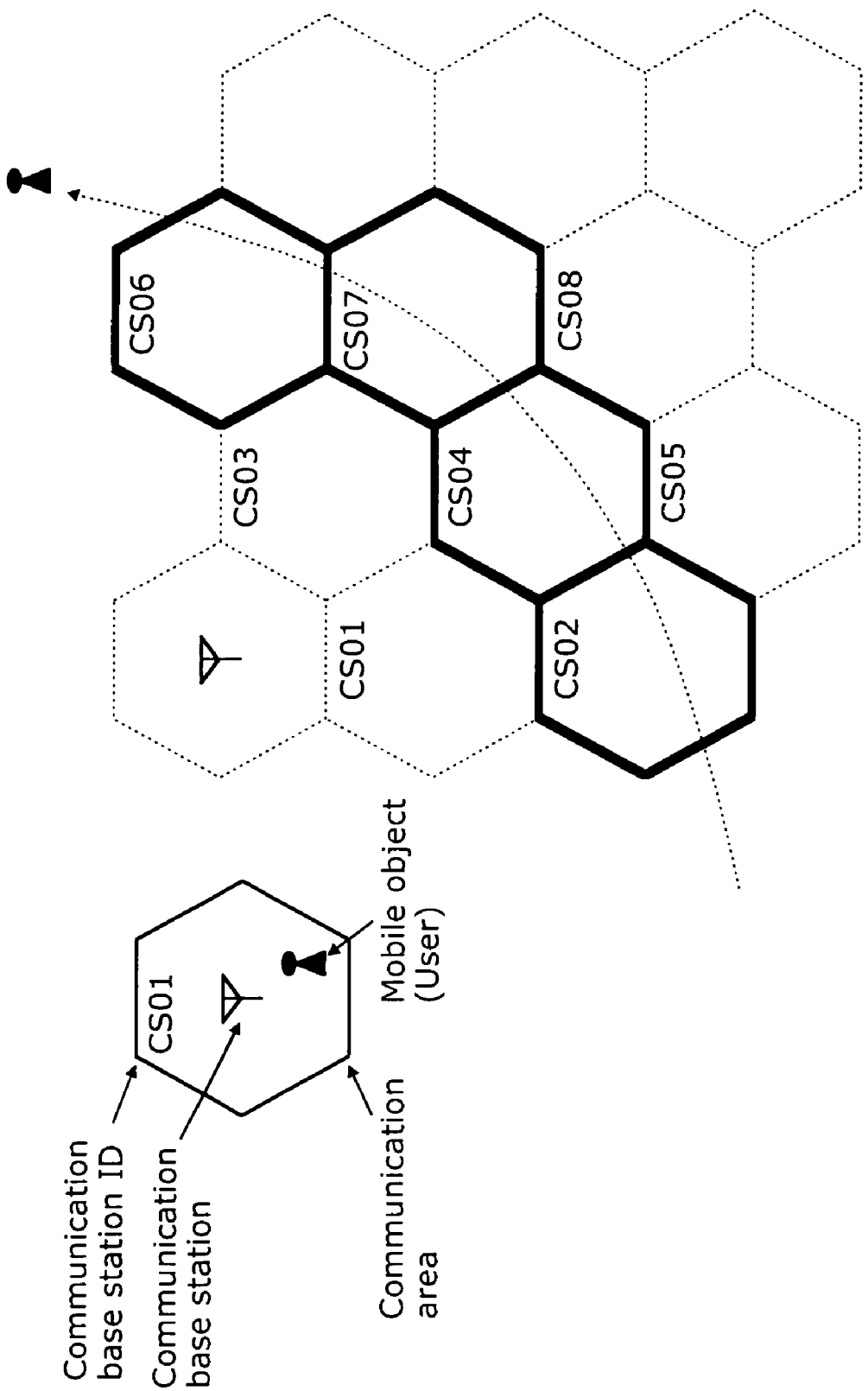
FIG. 54 is a diagram showing the IDs of communication base stations for mobile terminals in the case of applying the present invention to a mobile communications system.

As shown in FIG. 54, the registered area is divided into plural areas and has the IDs unique to the communication base stations (the communication base station IDs (CS-ID)). For example, as shown in FIG. 54, if the user (the mobile terminal) stays in the communication base station ID "CS01", "CS01" is registered to itself and the communication base station side, preparing for a call from other terminal. Moreover, if the user moves as shown with an arrow, the base stain IDs "CS02", "CS04", "CS07" and "CS06" are periodically registered.

It is possible to use these communication base station ID series as the user's moving history. Generally, since a transition of the registration of these communication base stations is the information that is closed in communication service companies and the terminals, the user cannot use the information, but it is possible to understand the transition of these registration IDs as the user's action pattern. For example, it is possible to provide in advance information necessary for a user, in a time of disaster or the like, based on the action pattern. In addition, the communication service company side can provide higher-quality communication services by analyzing users' action patterns to disperse resources. Therefore, this moving history is also important for the mobile terminals such as mobile phones and the like.

FIG. 55 is a diagram showing the example of the moving history accumulated in the first moving history accumulation unit 101. The user's moving as shown with an arrow in FIG. 55 is accumulated as the communication base station IDs "CS02", "CS04" and "CS07"; that is, the communication base station ID series as shown in FIG. 55.

Meanwhile, these communication base station IDs cannot be used as they are in other apparatuses because they are information unique to each communication service company. Therefore, as shown in this embodiment, the moving history can be used in other apparatuses by converting it into the generic latitude and longitude information.

FIG. 56 is a diagram showing the example of the latitude and longitude information corresponding to each communication base station accumulated in the first map information accumulation unit 102 (hereafter called "the first communication base station table"). The position of communication base station ID "CS01" indicates "longitude 135 degrees and latitude 34 degrees". The first moving history conversion unit 103 converts the moving history into latitude and longitude information using the above-mentioned conversion method based on this first communication base station table. In addition, in the case of the communication base station to be used by mobile terminals, since the covered areas are different according to each communication base station, the moving history may be converted in consideration to the covered areas and the like.

FIG. 57 is a diagram showing the example of the moving history accumulated in the history information accumulation unit 104. The moving history accumulated at the communication base station ID series in FIG. 55 has been accumulated as a pair of latitude and longitude information and the corresponding covered areas.

Figure 58:
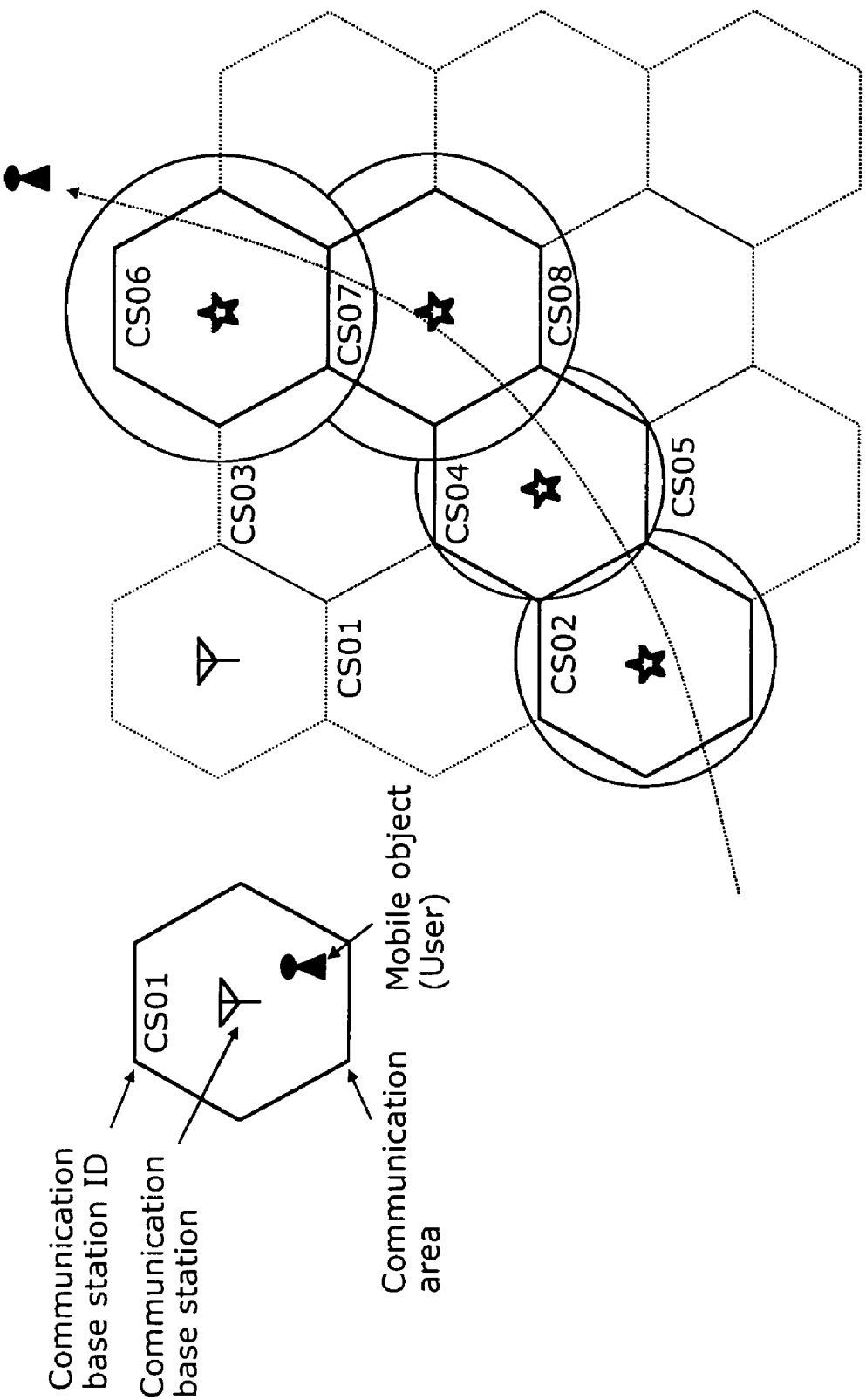
FIG. 58 is a diagram showing a conversion example of moving history.

FIG. 58 is a diagram showing the accumulated history indicated in FIG. 57, for purpose of illustration. The user's moving as shown with an arrow is indicated as latitude and longitude information as shown with asterisks and the row of the covered areas as shown with diagonal lines.

Figure 59:
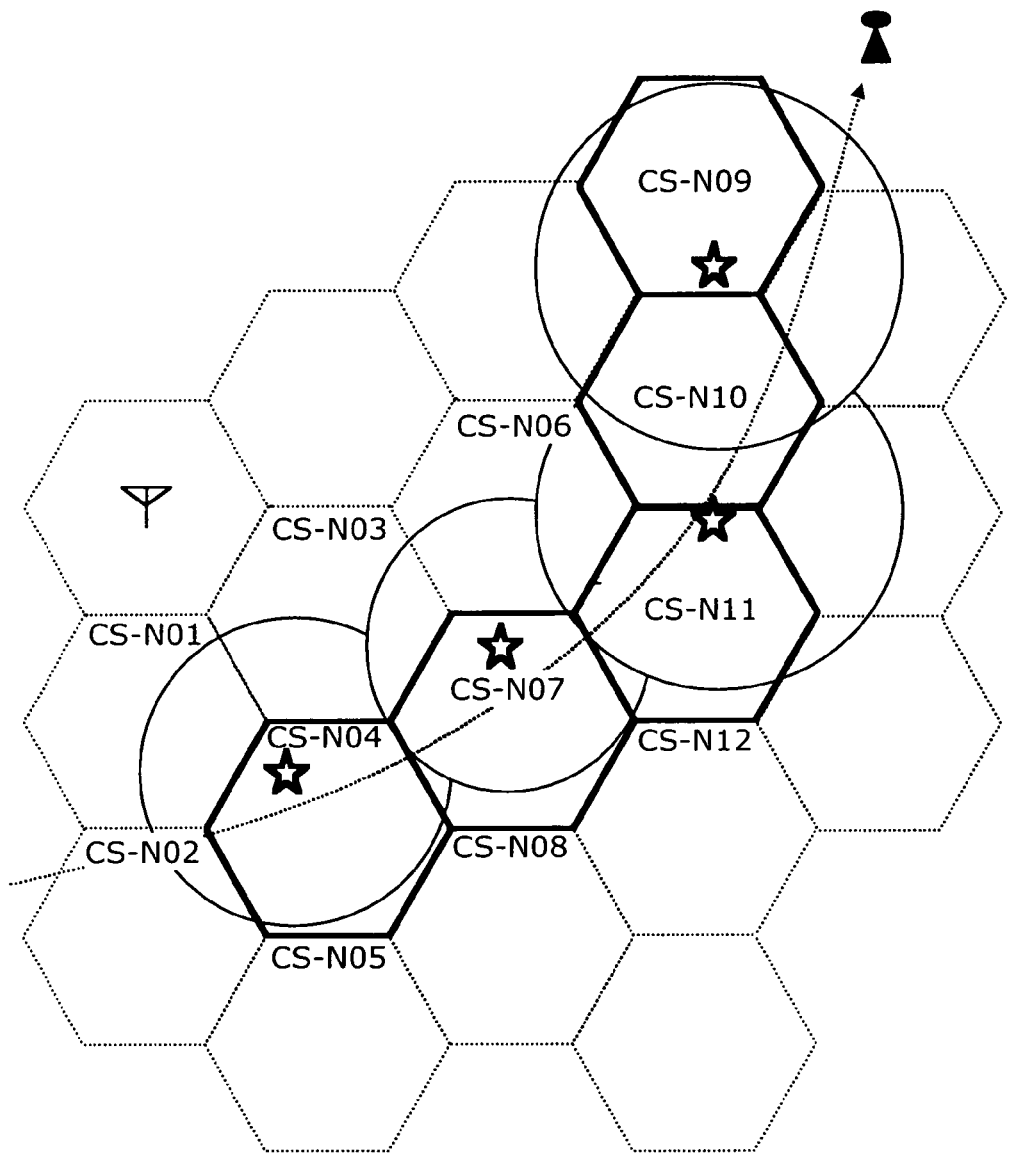
FIG. 59 is a diagram showing a conversion example of the moving history.

FIG. 59 is a diagram indicating the history in FIG. 58 on the communication base station areas in the second navigation apparatus 200. The communication base station IDs and their covered areas are totally different even in the same geographical conditions. However, general numeric data; that is, latitude and longitude information and the covered areas are accumulated in the history information accumulation unit 104. Therefore, based on this information, conversion into the communication base station ID series in the second navigation apparatus can be performed in the second moving history conversion unit 105.

For example, as shown in FIG. 59, the matching of the latitude and longitude which is the center of the communication base station in the first navigation apparatus 100 and the communication base station IDs in the second navigation apparatus 200 is performed based on the covered areas and the matched data is converted into moving history in the second navigation apparatus 200. For example, the matching is judged depending on the degree of sameness between the communication base stations in the second navigation apparatus 200 and their covered areas.

For example, in FIG. 59, moving history is converted as the things which match with the communication base station IDs "CS-N02", "CS-N04", "CS-N07", "CS-N11" and "CS-N10". FIG. 60 is a diagram showing the example of the moving history which is converted in this way and accumulated in the second moving history accumulation unit 107. It is converted into moving history available in the second terminal.

Additionally, in the above-mentioned embodiment, moving history to be accumulated has been described as the series of node IDs. Generally, the positions to be detected by a GPS are latitude and longitude values. If moving history is accumulated as this latitude and longitude values, since the latitude and longitude values at the junction are not always accumulated, depending on a difference in position accuracy of a GPS antenna or the time sampling interval, an inconvenience occurs for searching and the understanding of the user's action tendency. Therefore, in this present embodiment, data accumulated as the latitude and longitude values is converted into and accumulated as the node ID information defined by a map and the link information of roads in order to convert the data into the accessible formats according to the map information to be used. However, the accumulation method of moving history is not limited to this and the following accumulation formats may be used.

Figure 61:
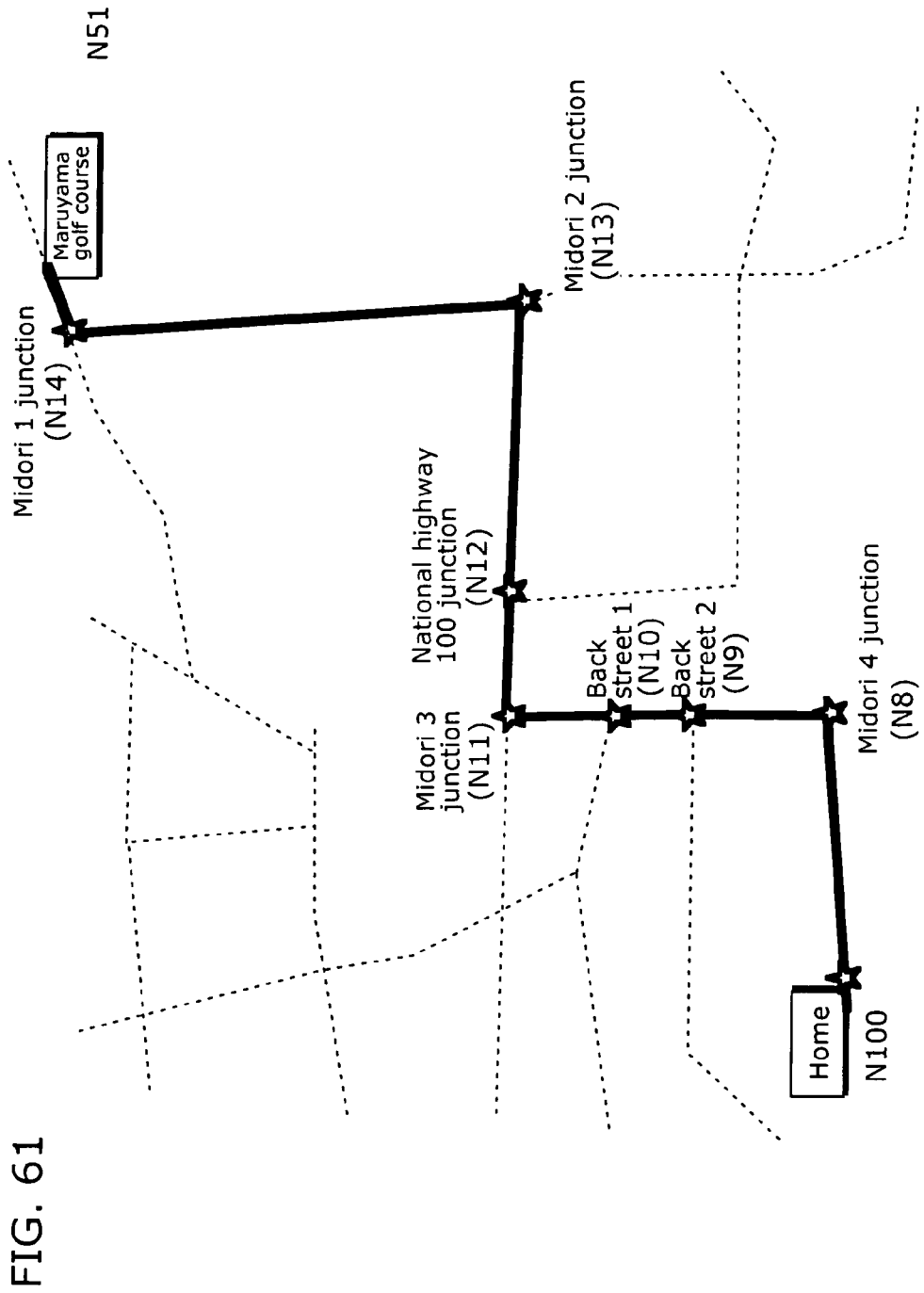
FIG. 61 is a diagram showing a representation example of the moving history.

FIG. 61 is a diagram for showing the accumulation method of moving history. In the map in FIG. 61, the moving from home to the Maruyama golf course is indicated as bold black lines. In the above-mentioned embodiment, landmarks such as home or junctions are assumed to be nodes and these series of node IDs are accumulated based on the map information. For example, in the case of FIG. 61, the following ID series corresponding to the respective nodes have been accumulated: the home "N100", the Midori 4 junction "N8", the back street 2 "N9", the back street 1 "N10", the Midori 3 junction "N11", the national highway 100 junction "N12", the Midori 2 junction "N13", the Midori 1 junction "N14" and the Maruyama golf course "N51".

Figure 62:
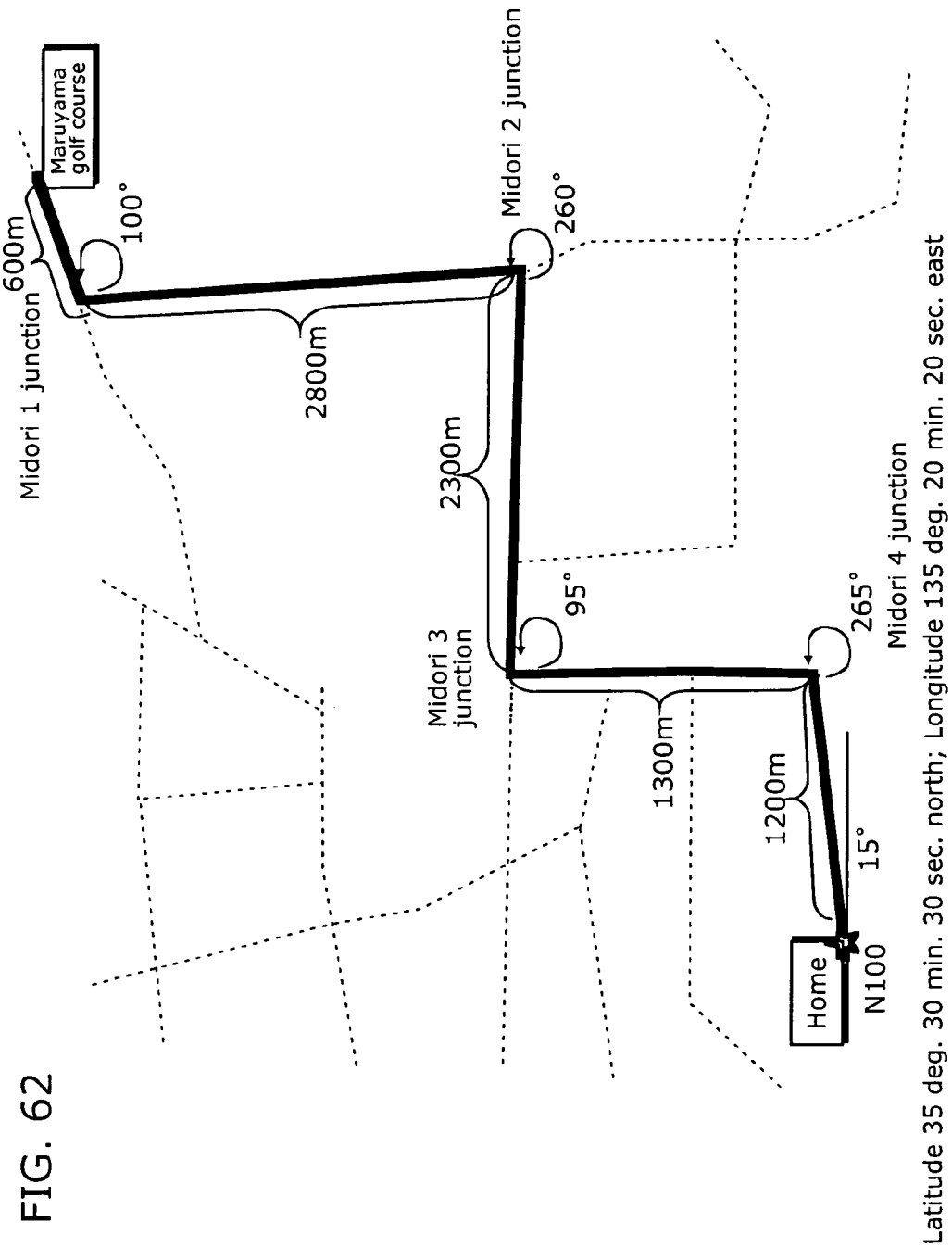
FIG. 62 is a diagram showing the representation example of the moving history.

FIG. 62 is a diagram showing another example of the moving history accumulation method. As shown in this diagram, moving history can be indicated as the position which is a starting point and the series of vectors (distances and angles) from the starting point. For example, in FIG. 62, a straight line to "Midori 4 junction" can be represented by indicating "Angle: 15 degrees and Distance: 1200 m" (the initial value is assumed to be 0 degrees in east direction) from the home which is the starting point "N100". Moreover, the user's moving history can be indicated by using the series of distances and angles such as "Angle: 265 degrees and Distance: 1300 m", "Angle: 95 degrees and Distance: 2300 m", "Angle: 260 degrees and Distance: 2800 m" and "Angle: 100 degrees and Distance: 600 m".

In the case of using this method, since a long straight line and the like can be expressed as a vector, the data volume can be reduced. For example, in FIG. 61, three nodes from the Midori 4 junction to the back street 2, the back street 1, and the Midori 3 junction can be represented as a vector "Angle: 265 degrees and Distance: 1300 m" as shown in FIG. 62.

Figure 63:
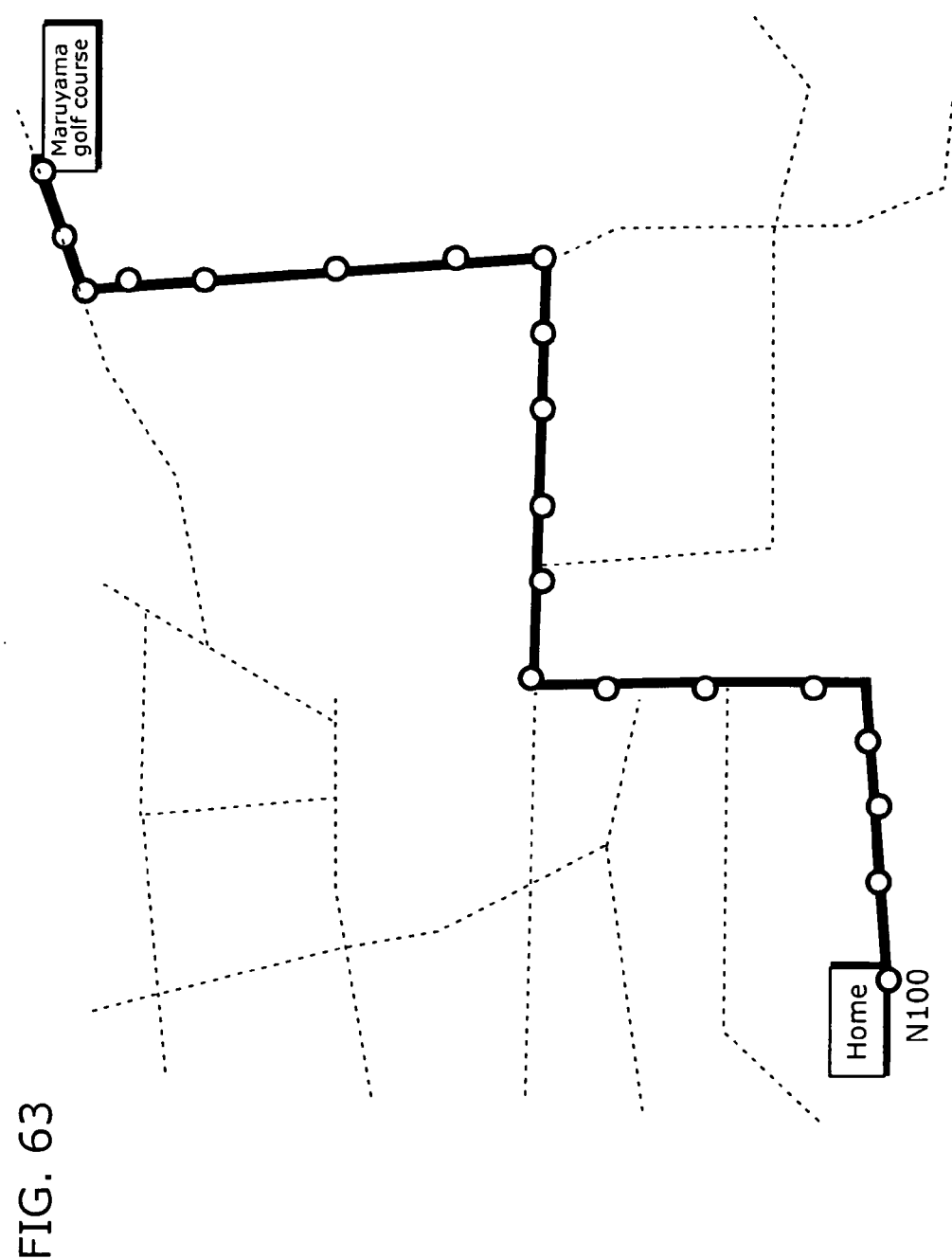
FIG. 63 is a diagram showing the representation example of the moving history.

In this way, the moving history accumulation method is not always common between respective companies and moving history cannot be passed down as it is. Accordingly, as shown in this embodiment, the moving history can be passed down to and used in every apparatus and the like by using the latitude and longitude values of the IDs accumulated in the map information and interpolating the intervals between them and then converting them into the latitude and longitude series. FIG. 63 is a diagram indicating that moving history is converted into the series of latitude and longitude by using the conversion method as shown in this embodiment (as shown with white circles).

At this time, when a user moves, generally, the user leaves the main point such as his/her home and the like and drives narrow streets for a while, and then uses a main road such as a national highway and the like, and again uses narrow roads around the destination. In order to accurately restore this moving history while controlling the data volume, for example, the intervals around the starting point and the destination are finely interpolated and the intervals of the main road such as the national highway and the like between the starting point and the destination may be roughly interpolated.

Figure 64:
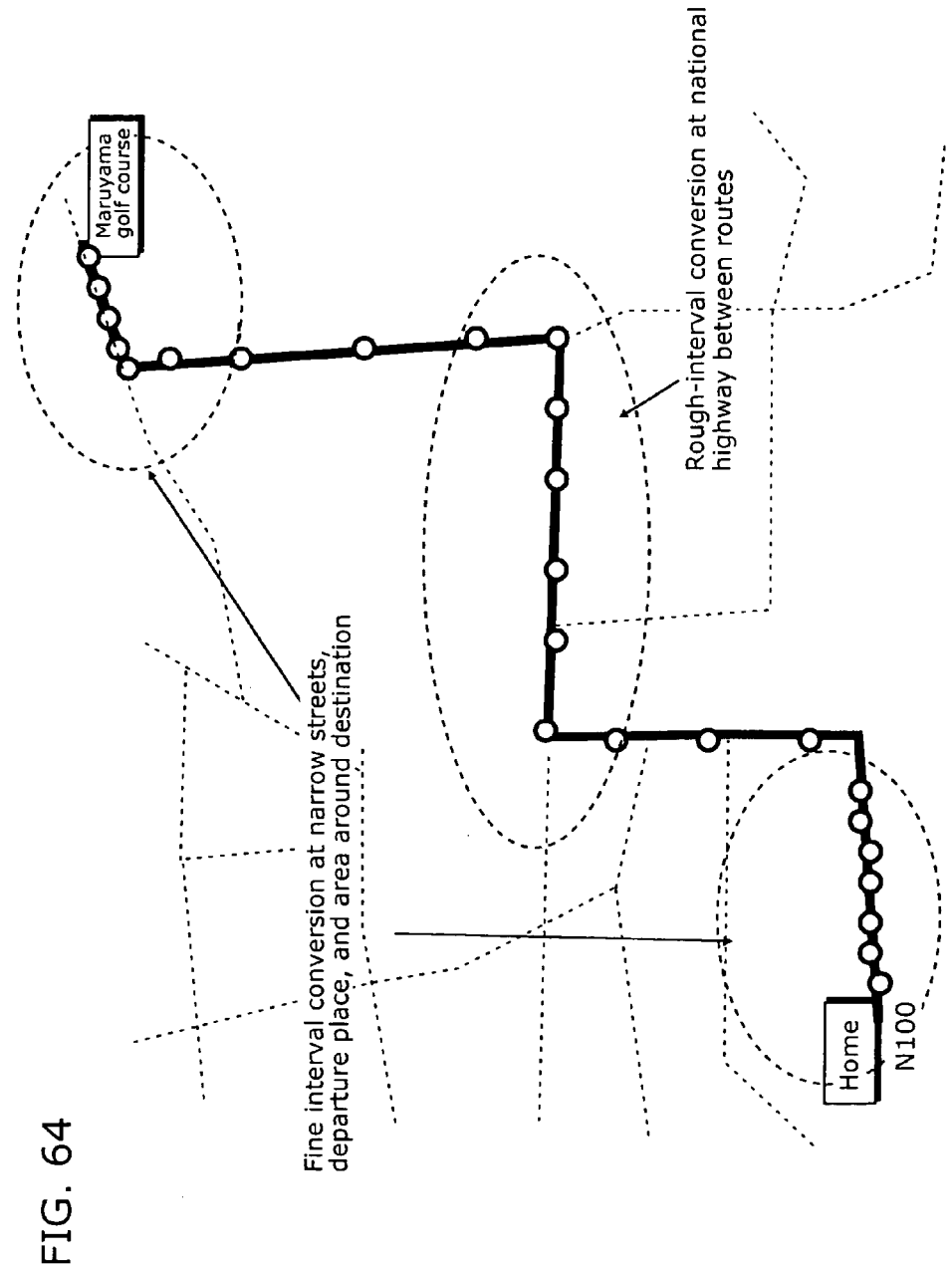
FIG. 64 is a diagram showing the representation example of the moving history.

FIG. 64 is a diagram showing an example where the moving history indicated in this example is converted into the latitude and longitude series. Here, the intervals around the starting point and the destination are finely interpolated and the intervals of the main road such as the national highway and the like between the starting point and the destination is roughly interpolated. In this way, the interval of the latitude and longitude series may be finely/roughly controlled based on the user's moving tendency.

Additionally, in the above-mentioned embodiment, the two dimensional description based on the latitude and longitude has been provided. However, since the height information is also obtained from the GPS, conversion may be performed considering this height information. This allows a more appropriate passing down of moving history in multi-level routes such as "Did the user drive the upper expressway?" or "Did the user use the lower general road?" or the like.

Moreover, in the above-mentioned embodiment, for example, the moving history accumulated in the first Car Navi mounted on a car has been described using the example of the passing-down to the second Car Navi via a recording medium. In recent years, a Car Navi has hard disks storing the various records of information such as music, and such information can be carried via storage media. Likewise, it is shown that a user's moving can be passed down to a newly purchased Car Navi and a car via these storage media and the moving history can be used immediately without troublesome operation. In addition, the passing down of the moving history may be used through not only storage media but also a server such as the Internet. The passing down of the moving history via the server is described using a specific example as follows.

Figure 65:
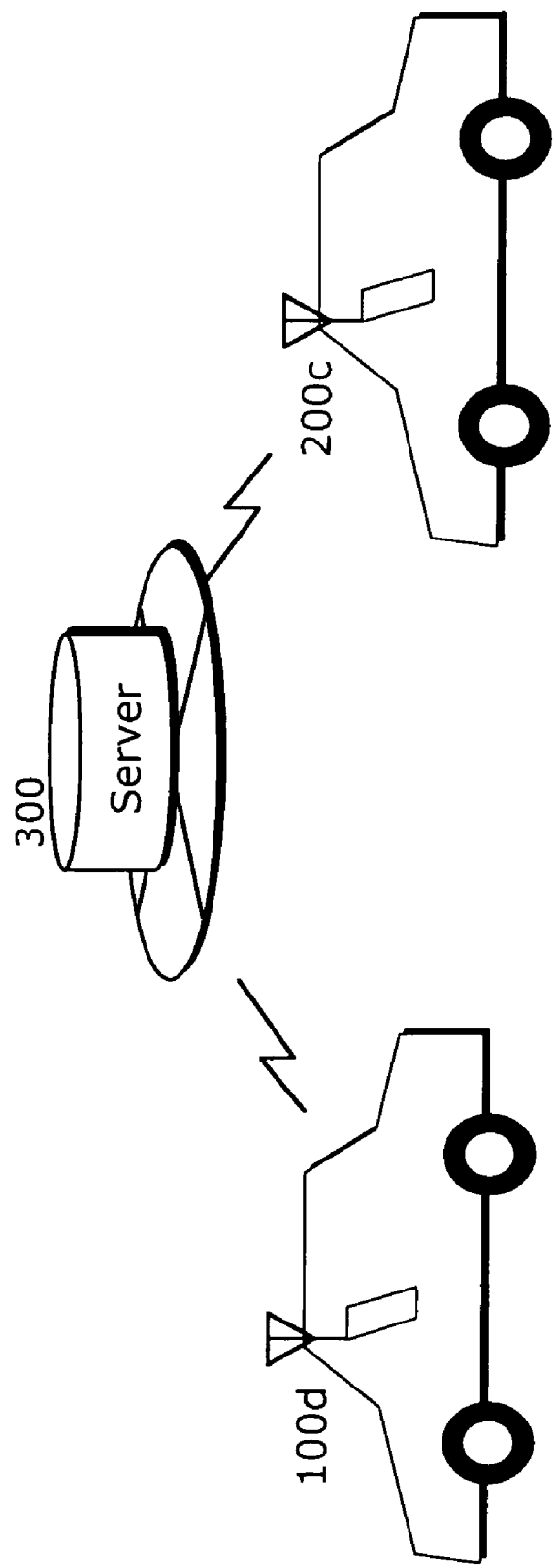
FIG. 65 is a diagram showing the hardware configuration of the moving history conversion apparatus in a variation example.

FIG. 65 is a diagram showing the hardware configuration of an embodiment of the present invention. Here, it is configured with the first navigation apparatus 100d, the second navigation apparatus 200c mounted on a car and the server 300. The first navigation apparatus 100d and the second navigation apparatus 200c can transmit and receive information to and from the server 300 via the communication path. Recent years, due to the emergence of the communication-type Car Navis, the user in a car can also access information obtained through the Internet and the like so as to search for the facility information or obtain the map information. In the present invention, it is also possible to transmit the user's moving history to the server to pass down to another Car Navi, or use the transmitted moving history at another terminal by using communications in this way. However, since the latitude and longitude information to be detected at a predetermined interval becomes large in volume and inappropriate to be transmitted in the format as it is. Therefore, for example, it is transmitted as a series of node IDs or the like as shown in the present invention. This is because transmission of the series of node IDs makes it possible to control the transmission cost. On the one hand, because these IDs are the IDs unique to each Car Navi, they cannot be passed down as they are. Therefore, they can be passed down and used in a new apparatus and the like by converting moving history through the method indicated in this example.

Figure 66:
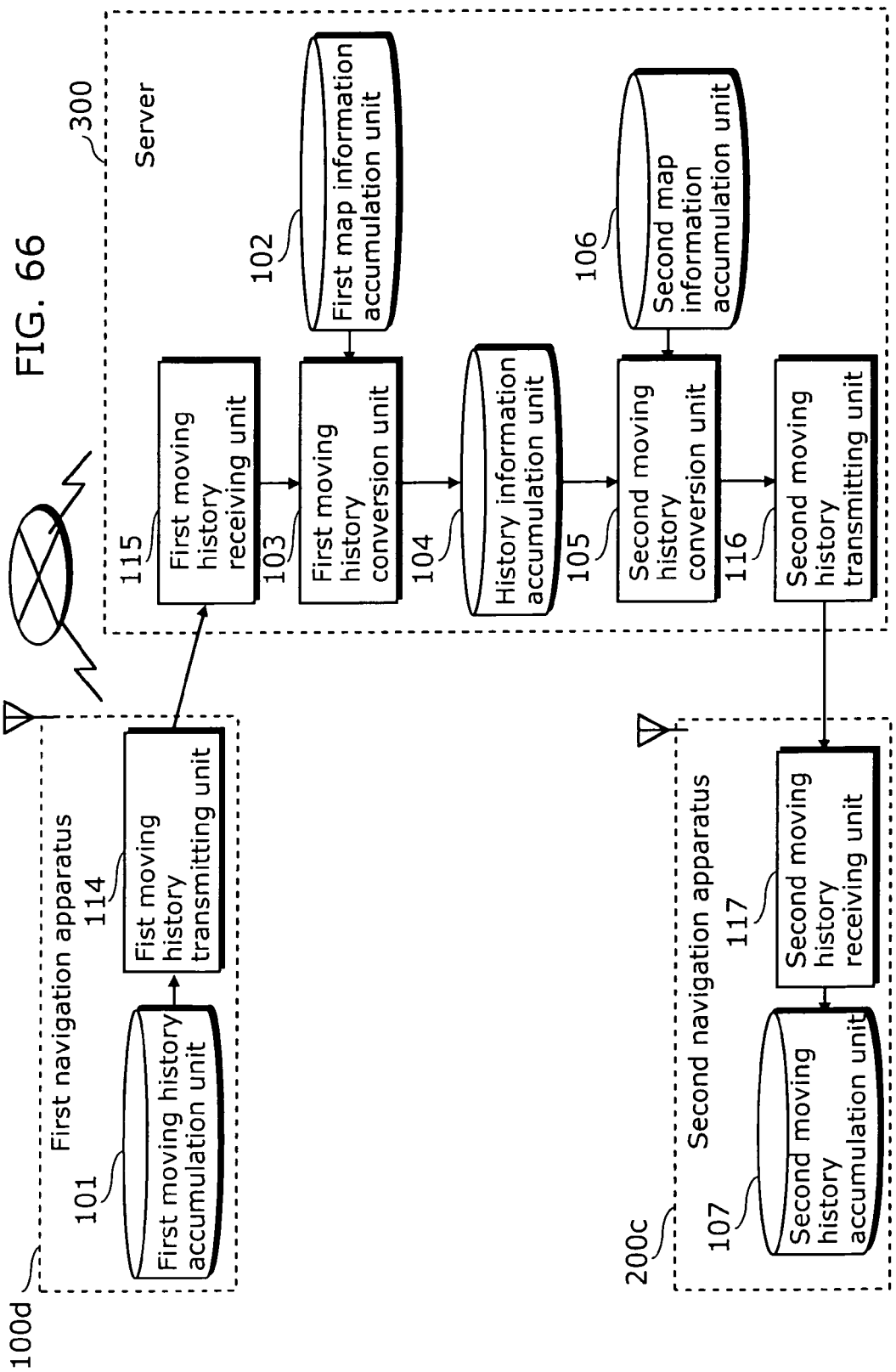
FIG. 66 is a block diagram showing the functions of the moving history conversion apparatus in a variation example.

FIG. 66 is a functional block diagram of the hardware configuration in FIG. 65. The constituent elements which are the same as those in the above-mentioned embodiment are given the same reference numerals.

First, the first navigation apparatus 100d has the first moving history accumulation unit 101 and the first moving history transmitting unit 114. Similar to the above-mentioned embodiment, the first moving history accumulation unit 101 is a process and storage apparatus to accumulate the moving to be detected by the first Car Navi as, for example, history of series of node IDs. The first moving history transmitting unit 114 is a communication interface or the like which transmits this moving history to the server 300. Regarding the communication costs, it is desirable to transmit the moving history as the series of node IDs with less volume.

The server 300 includes a first moving history receiving unit 115, the first moving history conversion unit 103, the first map information accumulation unit 102, the history information accumulation unit 104, the second moving history conversion unit 105, the second map information accumulation unit 106, the second moving history conversion unit 105 and a second moving history transmitting unit 116. The first moving history accumulation receiving unit 115 is a communication interface or the like which receives moving history transmitted from the first moving history transmitting unit 114. The received moving history is the information accumulated as the ID series unique to the first Car Navi. Since the information cannot be passed down to other apparatuses as it is, as described in the above-mentioned embodiment, it is converted into, for example, the latitude and longitude information series based on the first moving history conversion unit 103 and the first map information accumulation unit 102 and is accumulated in the moving history accumulation unit 104. Similar to the above-mentioned embodiment, the latitude and longitude information series are converted based on the map information accumulated in the second map information accumulation unit 106 into the moving history which is available in the second navigation apparatus 200c, and is transmitted to the second navigation apparatus 200c via the second moving history transmitting unit 116. The second navigation apparatus 200c includes a second moving history receiving unit 117 which receives the moving history to be transmitted and the second moving history accumulation unit 107 which accumulates the received moving history. The moving history is passed down to the second navigation apparatus via the server 300.

In this way, the moving history can be converted and passed down via not only the recording medium but also the server using communication and the like in the present invention.

Furthermore, since the first moving history receiving unit 115 and the second moving history transmitting unit 116 included in the server apparatus 300 have the function to accumulate the moving history temporarily, this server apparatus 300 is also one example of the moving history conversion apparatus according to the present invention. In other words, this server apparatus 300 is the moving history conversion apparatus which converts the presentation form of the moving history of the moving object and is an example of the moving history conversion apparatus according to the present invention including: the first map information accumulation unit which accumulates the first map information indicating the map using the first-type IDs which identify the geographical positions; the first moving history accumulation unit which accumulates the first moving history represented as the ID series included in the first map information accumulated in the above-mentioned first map information accumulation unit; the second map information accumulation unit which accumulates the second map information showing the map using the second-type IDs which identify the geographical positions; the second moving history accumulation unit which accumulates the second moving history represented as the ID series included in the second map information accumulated by the above-mentioned second map information accumulation unit; and the conversion unit which converts the ID series included in the first moving history accumulated in the above-mentioned first moving history accumulation unit into the ID series included in the second map information accumulated in the above-mentioned second map information accumulation unit, and accumulates the obtained ID series as the second moving history in the above-mentioned second moving history accumulation unit.

In addition, although the above-mentioned embodiments have been described using the example of the Car Navi, the present invention is not limited to this and, for example, it includes that the history accumulated by mobile phones is passed down to the Car Navi. For example, there is a case that when moving by other's car rather than his/her car, the user wants to accumulate the moving history by his/her mobile phone and pass down it to his/her Car Navi. For example, there is also a case that if a route used when using a taxi is a convenient back street and the like which the user has not known, the user wants to pass down the history to his/her Car Navi and use it later. Possibly, there is a case that the user accumulates a route to go to ski with friends by his/her mobile phone or the like and passes down it to his/her Car Navi. Therefore, moving history accumulated by the mobile phone and the like may be passed down to the Car Navi using the method described in the above-mentioned embodiment and the variation. The specific example is described as follows.

Figure 67:
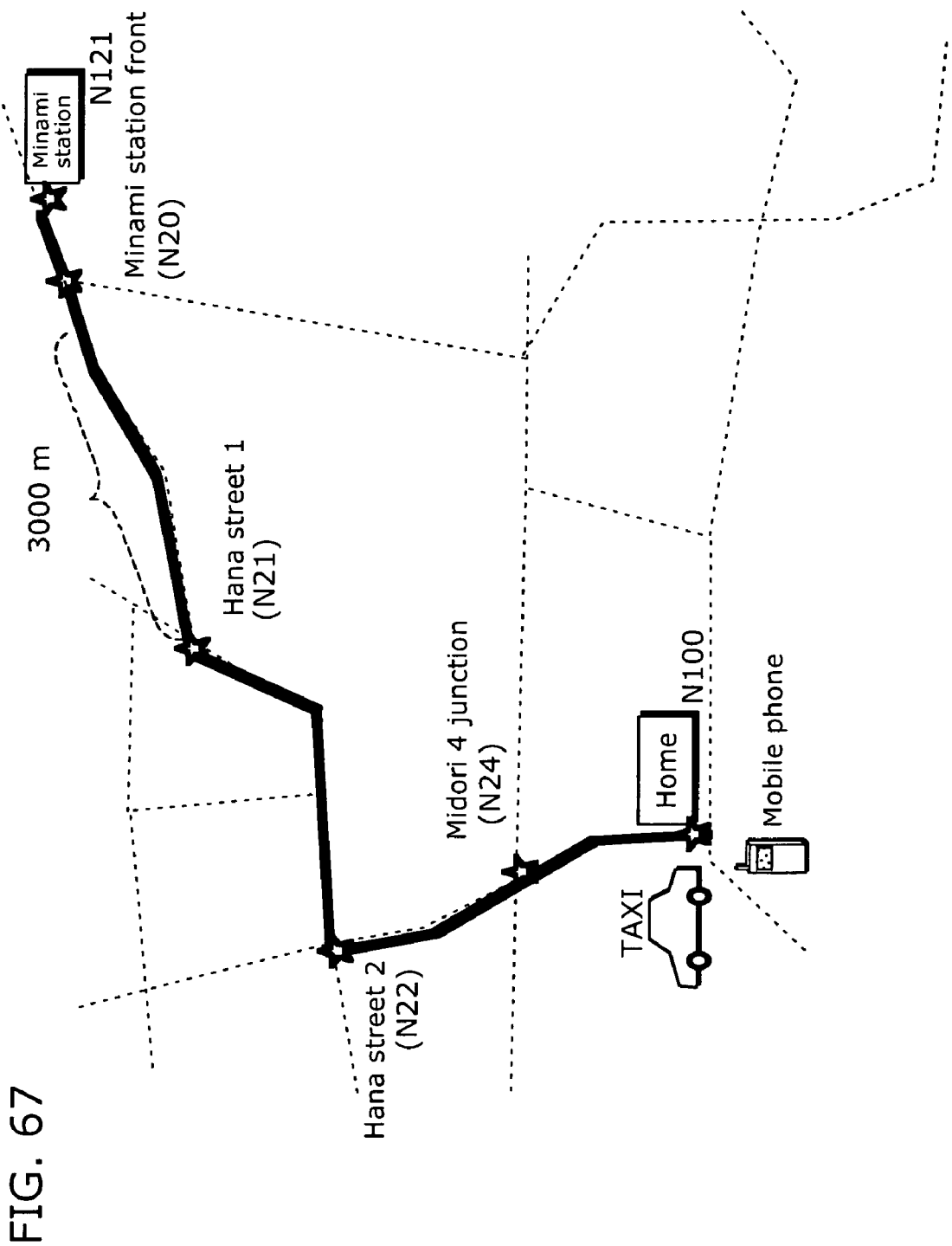
FIG. 67 is a diagram showing an representation example of the moving history.

FIG. 67 is a diagram showing the example where the history accumulated by a mobile phone and the like is passed down to the Car Navi. Here, the history where the user left the starting point "Minami station" and reached the destination "Home" using a taxi is indicated as bold black lines. During this time, the user is assumed to detect the position information by his/her mobile phone and accumulate moving history. The node "Minami station (N121)", "Minami station front (N20)", "Hana street 1 (N21)"₁ "Hana street 2 (N22)", "Midori 4 junction (N24)" and "Home (N100)" detected along with the user's moving are detected. FIG. 68 is a diagram indicating the moving history accumulated in the mobile phone. As shown in the upper table of FIG. 68, in the history ID "001", the history accumulated by the mobile phone has been accumulated the history indicating that the user left "home" and moved to "Minami book store" and the like. In addition, the moving history from "Minami station" to "Home" indicated in FIG. 67 has been accumulated as the history ID "011".

This format of the moving history in a mobile phone and the format of the moving history of the user's car's Car Navi are not always common. Therefore, this history accumulated by the mobile phone and the like may be passed down to the Car Navi by using the method described in the above-mentioned embodiments and variations. There is also a case that in this way, as for moving by other's car rather than moving by the user's car, the user accumulates the moving history by the mobile phone to pass down, to his/her car, the information of a convenient back street and the like which only a taxi driver knows, and passes down it to his/her car later. The conversion method indicated in the present invention is effective also in this situation.

It is troublesome for the user to select a record of moving by car from among the records of the moving history accumulated in a mobile phone. Therefore, for example, such selection can be automated by using an average speed and the like. For example, in the history ID "011" as shown in FIG. 68, the passage time of "Minami station front (N20)" is "23:30" and the passage time of the next "Hana street (N21)" is "23:35", and the difference is 5 minutes. In addition, assuming that the distance between "Minami station front" and "Hana street" is 3000 m as indicated in FIG. 67. Accordingly, the average moving speed can be calculated based on this distance between the nodes and the passage time. In this case, the result is "3000 (meters)÷5 (minutes)=600 meters per minute" (36 kilometers per hour), exceeding 80 kilometers per minute which is the average walking speed in general. Therefore, it is judged as moving by car. Accordingly, as shown in the lower table of FIG. 68, from the plural records of the moving history indicated in the upper table of FIG. 68, only the history ID "011" judged as moving by car may be passed down to the Car Navi.

In addition, the relationships between the claims and the corresponding embodiments are described as follows.

One example of the first map information accumulation unit in the claim is the first map information accumulation unit 102 in the embodiments. Likewise, one example of the first moving accumulation unit in the claim is the first moving history accumulation unit 101 or the first moving history receiving unit 115. One example of the second map information accumulation unit in the claim is the second moving history accumulation unit 106. One example of the second moving accumulation unit in the claim is the second moving history storage unit 107 or the second moving history transmitting unit 116. One example of the conversion unit in the claim is configured with the first moving history conversion unit 103 or 103a as well as the history information accumulation unit 104 and the second moving history conversion unit 105 or 105a. One example of the unconverted history accumulation unit in the claim is the unconverted history accumulation unit 119. One example of the reconversion unit in the claim is the second moving history reconversion unit 120. One example of the moving history obtainment unit in the claim is the second moving history obtainment unit 118.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The present invention can be used as a moving history conversion apparatus which converts the presentation form of the moving history of a moving object. For example, this apparatus can be used to convert moving history accumulated in a car navigation system into moving history which is available in the different-type car navigation systems, and to convert moving history obtained by using a mobile phone in the moving object communication system into moving history which is available in other moving object communication systems.

What is claimed is:

1. A moving history conversion apparatus which converts a representation format of moving history of a mobile object, said apparatus comprising:
- a first map information accumulation unit operable to accumulate first map information which represents a map using a series of first-type IDs for identifying geographical positions;
- a first moving history accumulation unit operable to accumulate first moving history to which time information indicating a time when the mobile object has passed through a point that is associated with the first-type ID is attached and which is represented as the series of first-type IDs included in the first map information accumulated in said first map information accumulation unit, the series of first-type IDs representing a starting point, a route, and a destination of the mobile object;
- a second map information accumulation unit operable to accumulate second map information which represents a map using a series of second-type IDs for identifying geographical positions;
- a second moving history accumulation unit operable to accumulate second moving history represented as the series of second-type IDs included in the second map information accumulated in said second map information accumulation unit; and
- a conversion unit operable to convert the series of first-type IDs included in the first moving history accumulated in said first moving history accumulation unit into the series of second-type IDs included in the second map information accumulated in said second map information accumulation unit, and to accumulate the series of second-type IDs obtained through the conversion into said second moving history accumulation unit as the second moving history to which the time information indicating the time when the mobile object passed through the point that is associated with the first-type ID is attached, and as the series of second-type IDs representing the starting point, the route, and the destination of the mobile object, wherein each first-type ID is for identifying a respective point in the first map information, the first map information includes a plurality of latitude and longitude information records indicating a latitude and a longitude of each point of the respective first-type IDs, each second-type ID is for identifying a respective point in the second map information, the second map information includes a plurality of latitude and longitude information records indicating a latitude and a longitude of each point of the respective second-type IDs, said conversion unit is operable to perform the conversion by replacing the first-type IDs with the second-type IDs which identify a point same or close in latitude and longitude to a point identified by the first-type ID, with reference to latitude and longitude information included in the first map information and the second map information, said conversion unit is operable to convert the series of first-type IDs included in the first map history into the plurality of latitude and longitude information records, with reference to the latitude and longitude information included in the first map information, and to replace the series of latitude and longitude information records obtained through the conversion with the series of second-type series IDs, based on the second-type IDs included in the second map information and the latitude and longitude information associated with the first-type IDs, and said conversion unit is operable to interpolate the time information by estimating the passage time at a latitude and longitude different from the latitude and longitude indicated by the plurality of latitude and longitude information records, based on the plurality of latitude and longitude information records converted from the series of first-type IDs and the time information which are included in the first moving history, and to replace the plurality of latitude and longitude information records with the series of second-type IDs, based on the interpolated time information.

2. The moving history conversion apparatus according to claim 1, further comprising:
- an unconverted history accumulation unit operable to accumulate the plurality of latitude and longitude information records as unconverted history in the case where the series of second-type IDs are present and are to be candidates which are replaced with the plurality of latitude and longitude information records; and
- a reconversion unit operable to determine one of the series of second type IDs, with reference to the second moving history or the second map information, and to replace the plurality of latitude and longitude information records accumulated in said unconverted history accumulation unit with the candidate series of second-type IDs.

3. The moving history conversion apparatus according to claim 2, further comprising:
- a moving history obtainment unit operable to obtain a moving history of the mobile object and accumulate the obtained moving history into said second moving history accumulation unit as the second moving history, wherein said reconversion unit is operable to determine, as a series of second-type IDs, a moving history which is close to the second moving history from among the series of second-type IDs, the second moving history being accumulated into said second moving history accumulation unit by said moving history obtainment unit.

4. The moving history conversion apparatus according to claim 2, wherein the first moving history further includes first traffic information obtainment point information identifying a first traffic information obtainment point, said conversion unit is operable to accumulate the traffic information obtainment point information into said unconverted history accumulation unit together with the plurality of latitude and longitude information records, the second map information further includes second traffic information obtainment point information identifying a second traffic information obtainment point, and said reconversion unit is operable to judge the sameness between the first traffic information obtainment point information accumulated in said unconverted history accumulation unit and the second traffic information obtainment point information included in the second map information, and determine, as the series of second-type IDs, traffic information obtainment point information with a high degree of sameness from among the series of second-type IDs.

5. The moving history conversion apparatus according to claim 2, wherein
the first moving history further includes passage information indicating, on a first-type ID basis, whether or not the mobile object passed the series of first-type IDs on a preset route,
said conversion unit is operable to accumulate the passage information into the unconverted history accumulation unit along with the plurality of latitude and longitude information records, and
said reconversion unit is operable to determine the series of second-type IDs from among the series of second-type IDs to be selected when a destination is set, in the case where the passage information accumulated in said unconverted history accumulation unit indicates that the mobile object passed.

6. The moving history conversion apparatus according to claim 1,
wherein said conversion unit includes a table in which respective first-type IDs and second-type IDs having the same or close corresponding geographical positions are placed in association with each other, and is operable to perform the conversion with reference to the table.

7. The moving history conversion apparatus according to claim 1, wherein
the first map information represents communication base station area information identifying a position of a first communication base station as a first-type ID, the first communication base station being operated by a first communication service company,
the second map information represents communication base station area information identifying a position of a second communication base station as a second-type ID, the second communication base station being operated by a second communication service company, and
the first moving history is represented as the series of first-type IDs included in the first map information associated with the series of communication base station areas through which the mobile object passed.

8. A moving history conversion method for converting a representation format of moving history of a mobile object, said method comprising:
converting a series of first-type IDs representing a starting point, a route, and a destination of the mobile object included in first moving history into a series of second-type IDs included in second map information, the first moving history, to which time information indicating a time when the mobile object has passed through a point that is associated with the first-type ID is attached, being represented as the series of first-type IDs included in first map information; and
accumulating the series of second-type IDs obtained through said converting as second moving history to which the time information indicating the time when the mobile object passed through the point that is associated with the first-type ID is attached, the series of second-type IDs representing the starting point, the route, and the destination of the mobile object, wherein
each first-type ID is for identifying a respective point in the first map information,
the first map information includes a plurality of latitude and longitude information records indicating a latitude and a longitude of each point of the respective first-type IDs,
each second-type ID is for identifying a respective point in the second map information,
the second map information includes a plurality of latitude and longitude information records indicating a latitude and a longitude of each point of the respective second-type IDs, and
said converting comprises:
replacing the first-type IDs with the second-type IDs which identify a point same or close in latitude and longitude to a point identified by the first-type ID, with reference to latitude and longitude information included in the first map information and the second map information;
converting the series of first-type IDs included in the first map history into the plurality of latitude and longitude information records, with reference to the latitude and longitude information included in the first map information, and replacing the series of latitude and longitude information records obtained through the conversion with the series of second-type series IDs, based on the second-type IDs included in the second map information and the latitude and longitude information associated with the first-type IDs; and
interpolating the time information by estimating the passage time at a latitude and longitude different from the latitude and longitude indicated by the plurality of latitude and longitude information records, based on the plurality of latitude and longitude information records converted from the series of first-type IDs and the time information which are included in the first moving history, and replacing the plurality of latitude and longitude information records with the series of second-type IDs, based on the interpolated time information.

9. A program for a moving history conversion apparatus which converts a representation format of moving history of a mobile object, said program causing a computer to execute a moving history conversion method, said method comprising:
converting a series of first-type IDs representing a starting point, a route, and a destination of the mobile object included in first moving history into a series of second-type IDs included in second map information, the first moving history, to which time information indicating a time when the mobile object has passed through a point that is associated with the first-type ID is attached, being represented as the series of first-type IDs included in the first map information; and
accumulating the series of second-type IDs obtained through said converting as second moving history to which the time information indicating the time when the mobile object passed through the point that is associated with the first-type ID is attached, the series of second-type IDs representing the starting point, the route, and the destination of the mobile object, wherein
each first-type ID is for identifying a respective point in the first map information,
the first map information includes a plurality of latitude and longitude information records indicating a latitude and a longitude of each point of the respective first-type IDs,
each second-type ID is for identifying a respective point in the second map information,
the second map information includes a plurality of latitude and longitude information records indicating a latitude and a longitude of each point of the respective second-type IDs, and
said converting comprises:

replacing the first-type IDs with the second-type IDs which identify a point same or close in latitude and longitude to a point identified by the first-type ID, with reference to latitude and longitude information included in the first map information and the second map information;

converting the series of first-type IDs included in the first map history into the plurality of latitude and longitude information records, with reference to the latitude and longitude information included in the first map information, and replacing the series of latitude and longitude information records obtained through the conversion with the series of second-type series IDs, based on the second-type IDs included in the second map information and the latitude and longitude information associated with the first-type IDs; and interpolating the time information by estimating the passage time at a latitude and longitude different from the latitude and longitude indicated by the plurality of latitude and longitude information records, based on the plurality of latitude and longitude information records converted from the series of first-type IDs and the time information which are included in the first moving history, and replacing the plurality of latitude and longitude information records with the series of second-type IDs, based on the interpolated time information.

10. The moving history conversion apparatus according to claim 1, further comprising:

a moving history deleting unit operable to delete the moving history, wherein said moving history deleting unit is operable to delete the first moving history from said first moving history accumulation unit after the conversion has been performed by said conversion unit.

11. The moving history conversion apparatus according to claim 1, wherein moving histories of a plurality of users are accumulated separately, said moving history conversion apparatus further comprising:

an authentication unit operable to authenticate the plurality of users, and said conversion unit is operable to convert only the moving history of a user authenticated by said authentication unit.

12. The moving history conversion apparatus according to claim 1, wherein a mode of transportation is specified based on the passage time, and said conversion unit is operable to convert moving history corresponding to the specified mode of transportation.

13. The moving history conversion apparatus according to claim 1, wherein said conversion unit is operable to estimate the time based on the latitude and longitude prior to and subsequent to the latitude and longitude, out of the plurality of latitude and longitude information records.

14. The moving history conversion apparatus according to claim 1, wherein said conversion unit is operable to calculate a distance of a route from the latitude and longitude to a latitude and longitude different from the latitude and longitude based on the plurality of latitude and longitude information records, and to estimate the time by adding a time proportional to the calculated distance.

15. The moving history conversion apparatus according to claim 1, wherein said conversion unit is operable to vary an interval of the conversion of the series of first-type IDs included in the first moving history accumulated in said first moving history accumulation unit into the series of second-type IDs included in the second map information accumulated in said second map information accumulation unit.

16. The moving history conversion apparatus according to claim 1, wherein the first moving history accumulation unit is operable to accumulate the first moving history to which the time information indicating the time when the mobile object has passed through the point that is associated with the first-type ID and traffic information are attached, and wherein said conversion unit operable to accumulate the series of second-type IDs obtained through the conversion into said second moving history accumulation unit as the second moving history to which the time information indicating the time when the mobile object passed through the point that is associated with the first-type ID and the traffic information are attached, and as the series of second-type IDs representing the starting point, the route, and the destination of the mobile object.

17. The moving history conversion apparatus according to claim 1, wherein the first moving history accumulation unit is operable to accumulate the first moving history to which the time information indicating the time when the mobile object has passed through the point that is associated with the first-type ID and information related to a wrong route taken are attached, and wherein said conversion unit operable to accumulate the series of second-type IDs obtained through the conversion into said second moving history accumulation unit as the second moving history to which the time information indicating the time when the mobile object passed through the point that is associated with the first-type ID and the information related to a wrong route taken are attached, and as the series of second-type IDs representing the starting point, the route, and the destination of the mobile object.

18. The moving history conversion apparatus according to claim 1, wherein the first moving history accumulation unit is operable to accumulate the first moving history to which the time information indicating the time when the mobile object has passed through the point that is associated with the first-type ID and points registered by a user are attached, and wherein said conversion unit operable to accumulate the series of second-type IDs obtained through the conversion into said second moving history accumulation unit as the second moving history to which the time information indicating the time when the mobile object passed through the point that is associated with the first-type ID and the registered points are attached, and as the series of second-type IDs representing the starting point, the route, and the destination of the mobile object.

* * * * *